US005837914A

United States Patent [19]

Schwartz et al.

[11] Patent Number: 5,837,914

[45] Date of Patent: Nov. 17, 1998

[54] ELECTRONIC CARILLON SYSTEM UTILIZING INTERPOLATED FRACTIONAL ADDRESS DSP ALGORITHM

[75] Inventors: Gregory L. Schwartz, Spinnerstown; Mark Hofmeister, Collegeville, both of Pa.

[73] Assignee: Schulmerich Carillons, Inc., Sellersville, Pa.

[21] Appl. No.: 701,696

[22] Filed: Aug. 22, 1996

[51] Int. Cl.$^{6}$ ................................ G01H 1/06; G01H 7/00

[52] U.S. Cl. ................................ 84/622; 84/603; 84/633

[58] Field of Search ............................ 84/601–603, 622, 84/633

[56] References Cited

U.S. PATENT DOCUMENTS

| | | | |
|---|---|---|---|
| 4,159,491 | 6/1979 | Beach | 360/12 |
| 4,245,336 | 1/1981 | Stietenroth | 368/7 |
| 4,271,495 | 6/1981 | Scherzinger et al. | 368/75 |
| 4,279,185 | 7/1981 | Alonso | 84/603 |
| 4,368,989 | 1/1983 | Kawashima | 368/74 |
| 4,385,841 | 5/1983 | Kramer | 368/29 |
| 4,622,877 | 11/1986 | Strong | 84/604 |
| 4,715,257 | 12/1987 | Hoshiai et al. | 84/603 |
| 4,719,833 | 1/1988 | Katoh et al. | 84/603 |
| 4,805,511 | 2/1989 | Schwartz | 84/1.22 |
| 5,092,216 | 3/1992 | Wadhams | 84/602 |
| 5,195,064 | 3/1993 | Hegarty et al. | 368/272 |
| 5,220,117 | 6/1993 | Yamada et al. | 84/600 |
| 5,262,581 | 11/1993 | Sharp | 84/603 |
| 5,296,642 | 3/1994 | Konishi | 84/609 |
| 5,331,111 | 7/1994 | O'Connell | 84/602 |
| 5,432,296 | 7/1995 | Takeuchi et al. . | |
| 5,471,006 | 11/1995 | Schwartz et al. . | |
| 5,508,469 | 4/1996 | Kunimoto et al. | 84/603 |
| 5,546,466 | 8/1996 | Ishiguro et al. . | |
| 5,596,159 | 1/1997 | O'Connell | 84/622 |
| 5,633,985 | 5/1997 | Severson et al. . | |

OTHER PUBLICATIONS

The MIDI Manufacturers Association, Los Angeles, CA, "The Complete MIDI 1.0 Detailed Specification", version 96.1.

*Primary Examiner*—William M. Shoop, Jr.
*Assistant Examiner*—Jeffrey W. Donels
*Attorney, Agent, or Firm*—Woodcock Washburn Kurtz Mackiewicz & Norris LLP

[57] ABSTRACT

A DSP-based electronic carillon system is disclosed. The system comprises a digital signal processor (DSP), memory for storing program code for controlling the operation of the DSP in carrying out pre-programmed algorithms, and an output circuit for converting the output of the DSP into audible sound. DSP algorithms are also disclosed.

12 Claims, 55 Drawing Sheets

SUB 'error_handler(err_value)'

SUB 'assign_ toll_note(note_num,note_velo)'

SUB 'assign_swing_note(note_num,swing_cmd)'

SUB 'misc_funcs()'

SUB '_uart_transmit()'

SUB 'update_toll_chans'

ELECTRONIC CARILLON SYSTEM UTILIZING INTERPOLATED FRACTIONAL ADDRESS DSP ALGORITHM

FIELD OF THE INVENTION

The present invention relates generally to electronic carillons, and more particularly to a digital signal processor (DSP) algorithm for use in a DSP-based electronic carillon system.

BACKGROUND OF THE INVENTION

An electronic carillon system is a system that synthesizes or reproduces bell sounds. Such a system is capable of synthesizing or reproducing the sound of a single bell strike, a single swinging bell, a number of bells swinging in or out of sync with one another, and musical compositions. Electronic carillon systems are most often found in churches, but they also can be advantageously employed in government buildings, universities, department stores, etc. Typical applications include announcing the time of day and playing music. Further background information relating to electronic carillons may be found in U.S. Pat. No. 5,471,006, Nov. 28, 1995, "Electronic Carillon System and Sequencer Module Therefor," and in U.S. Pat. No. 4,805,511, Feb. 21, 1989, "Electronic Bell-Tone Generating System," both of which are assigned to Schulmerich Carillons, Inc., the assignee of the present invention.

SUMMARY OF THE INVENTION

Objects of the present invention are to provide an improved electronic carillon system having greater versatility than the prior tone generator-based system, and to provide algorithms for operating a DSP-based electronic carillon system. An electronic carillon system in accordance with the present invention comprises a DSP, memory means for memorizing program code for controlling the operation of the DSP in carrying out pre-programmed algorithms, and output means for converting the output of the DSP into audible sound. In presently preferred embodiments of the invention, the output means comprises a codec and at least one loudspeaker. Moreover, the DSP operates, in accordance with the pre-programmed algorithms, so as to perform the functions of receiving input data from the memory means and calculating pitch-shifted output data on the basis of the input data. In addition, the DSP may be programmed to scale the output data for volume and velocity as described below.

Other features and advantages of the invention are described below.

Figure 2A:
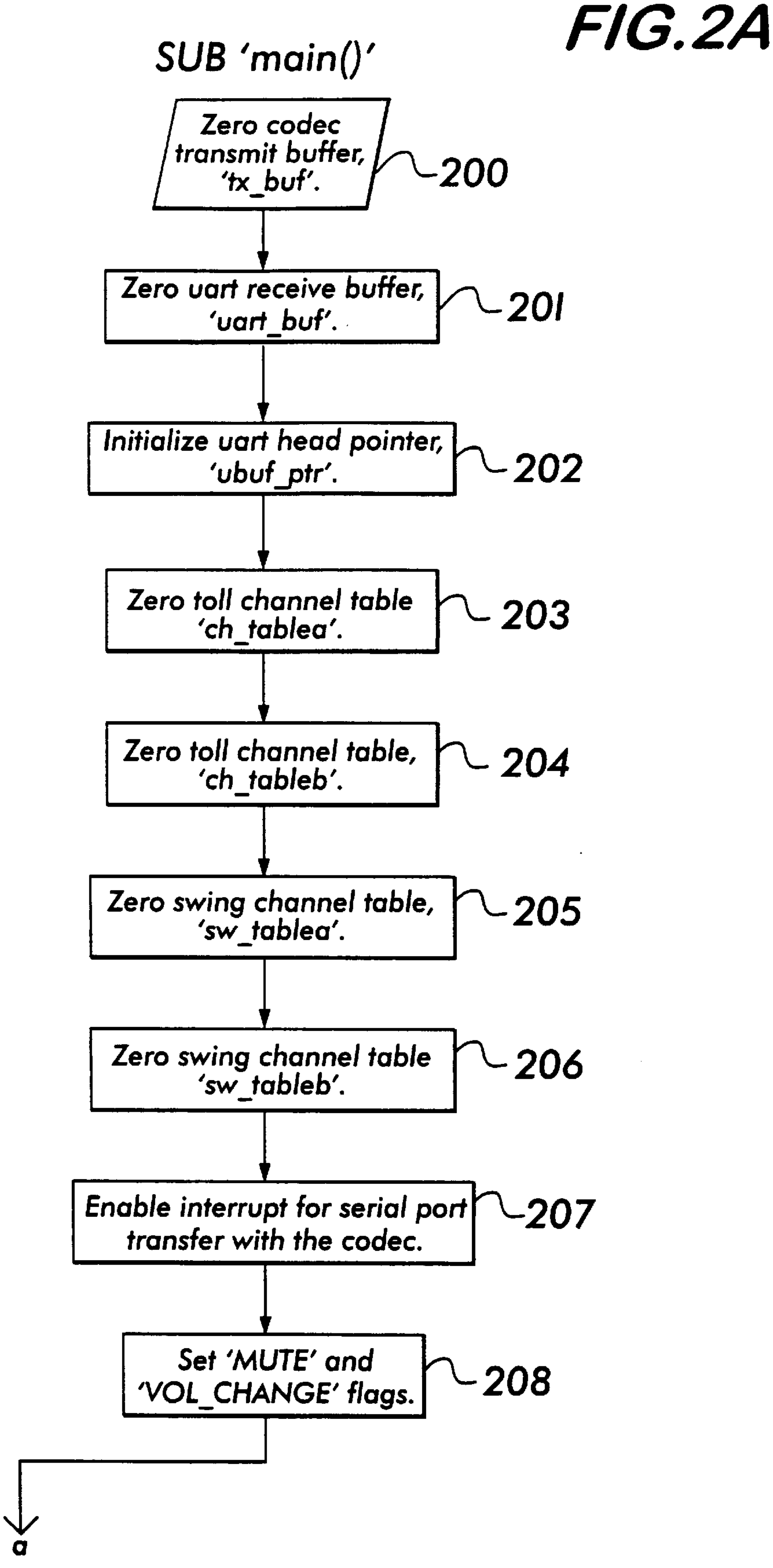
Figure 2B:
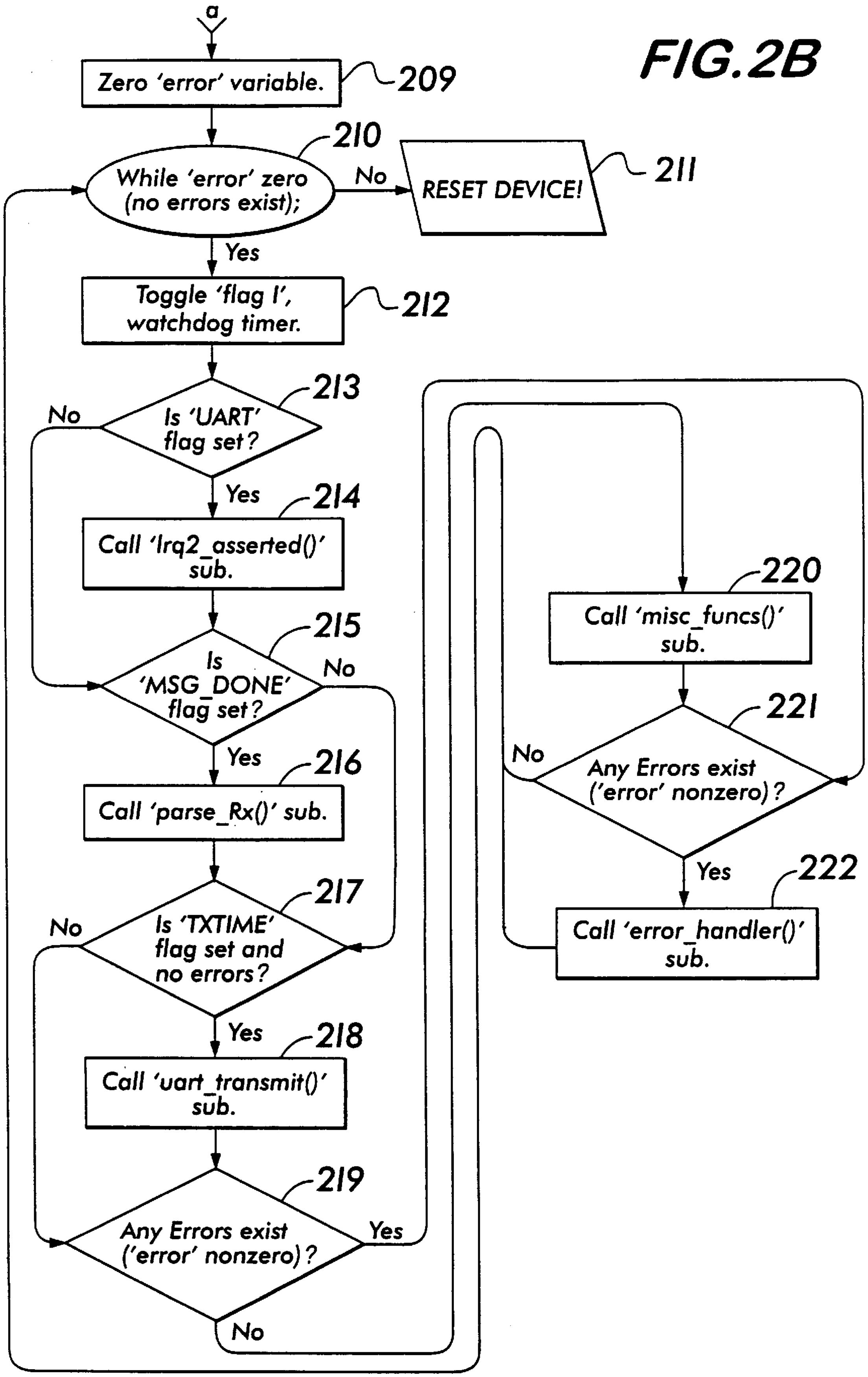

The remaining drawings depict flowcharts of various program elements of the presently preferred embodiment. In particular:

FIGS. 2A and 2B depict a "main()" subroutine.

Figure 3:
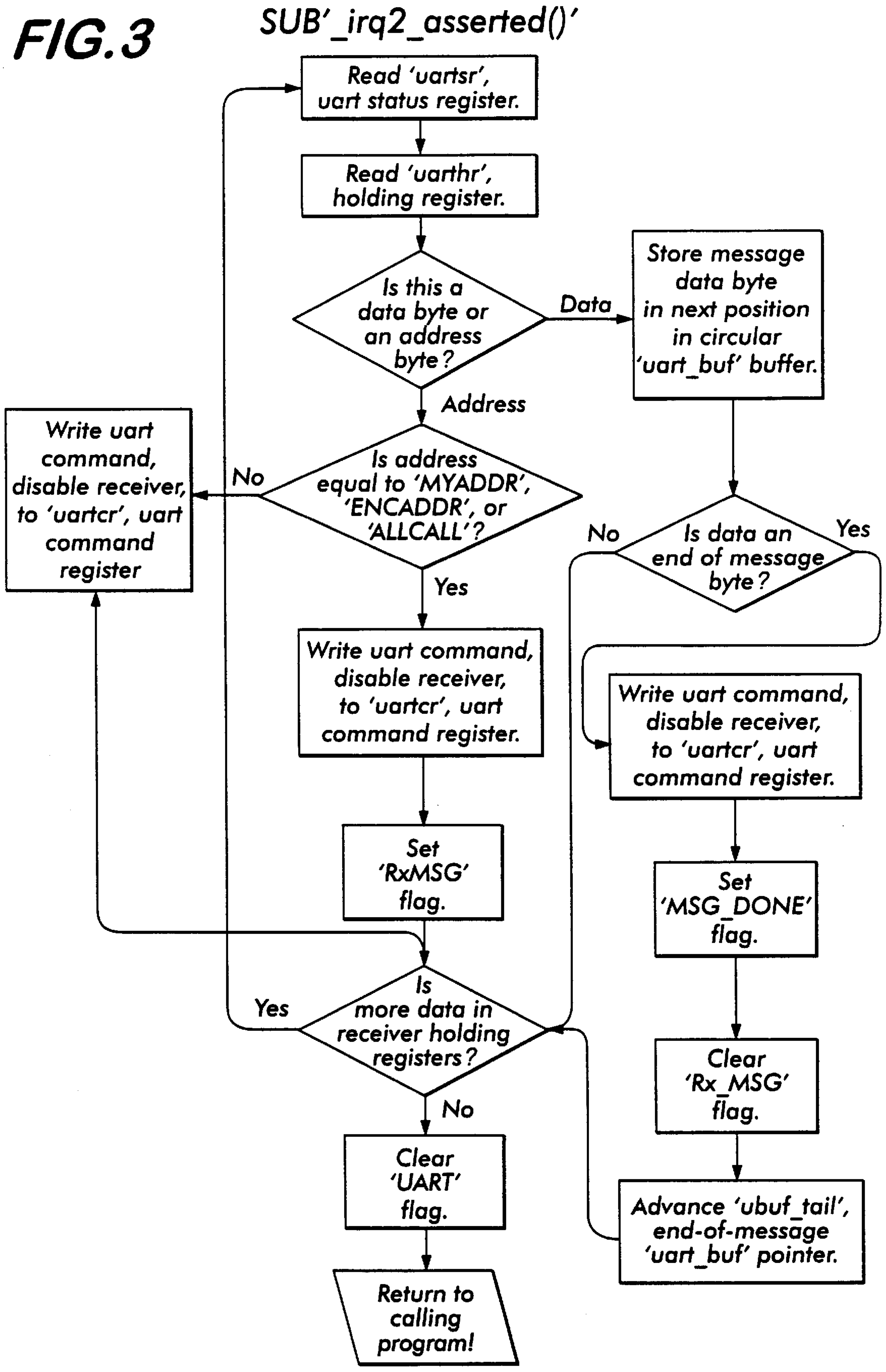

FIG. 3 depicts an "__irq2__asserted()" subroutine.

Figure 4:
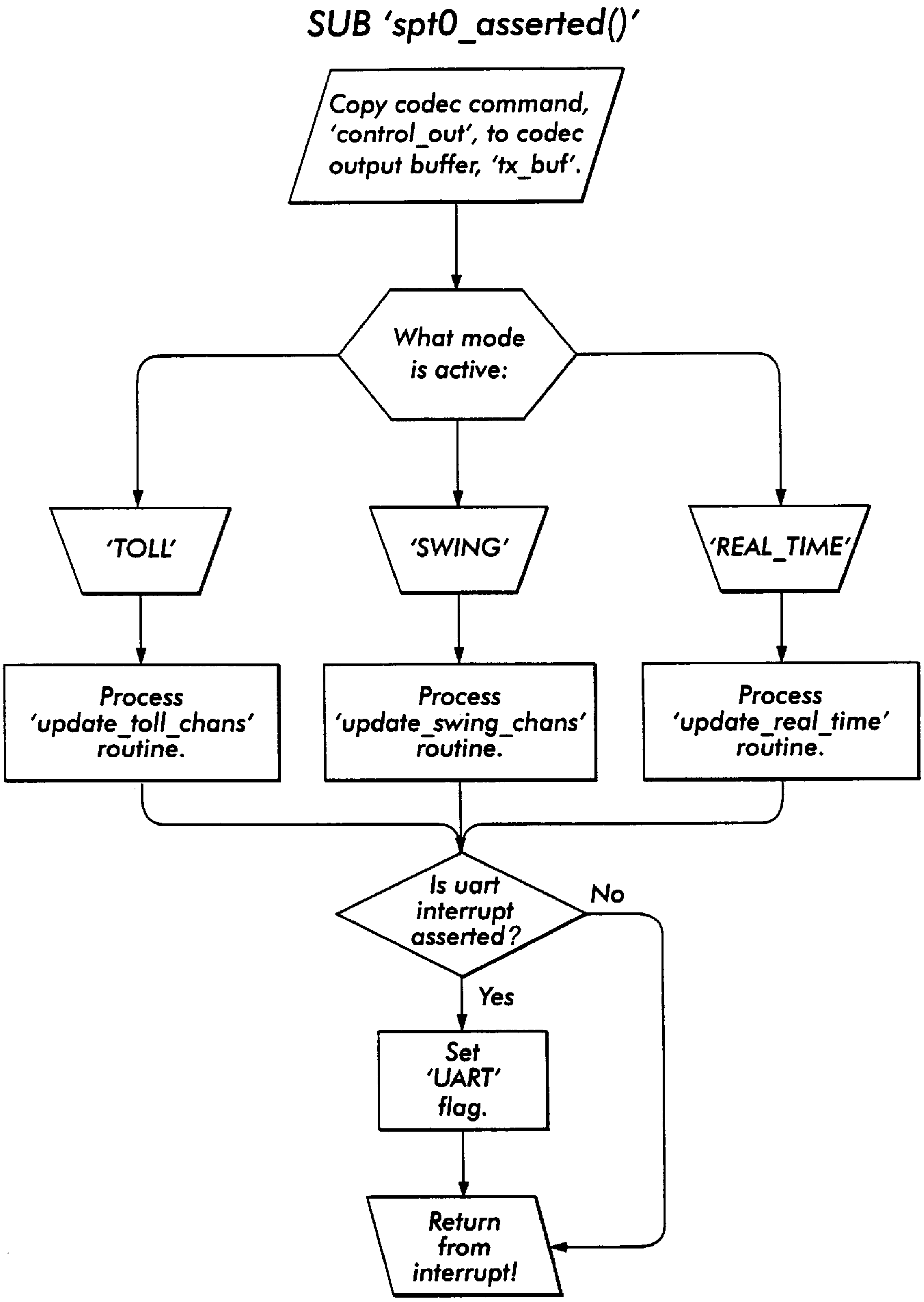

FIG. 4 depicts an "spt0__asserted()" subroutine.

FIGS. 5 and 5A–5K depict a "parse__Rx()" subroutine.

Figure 6:
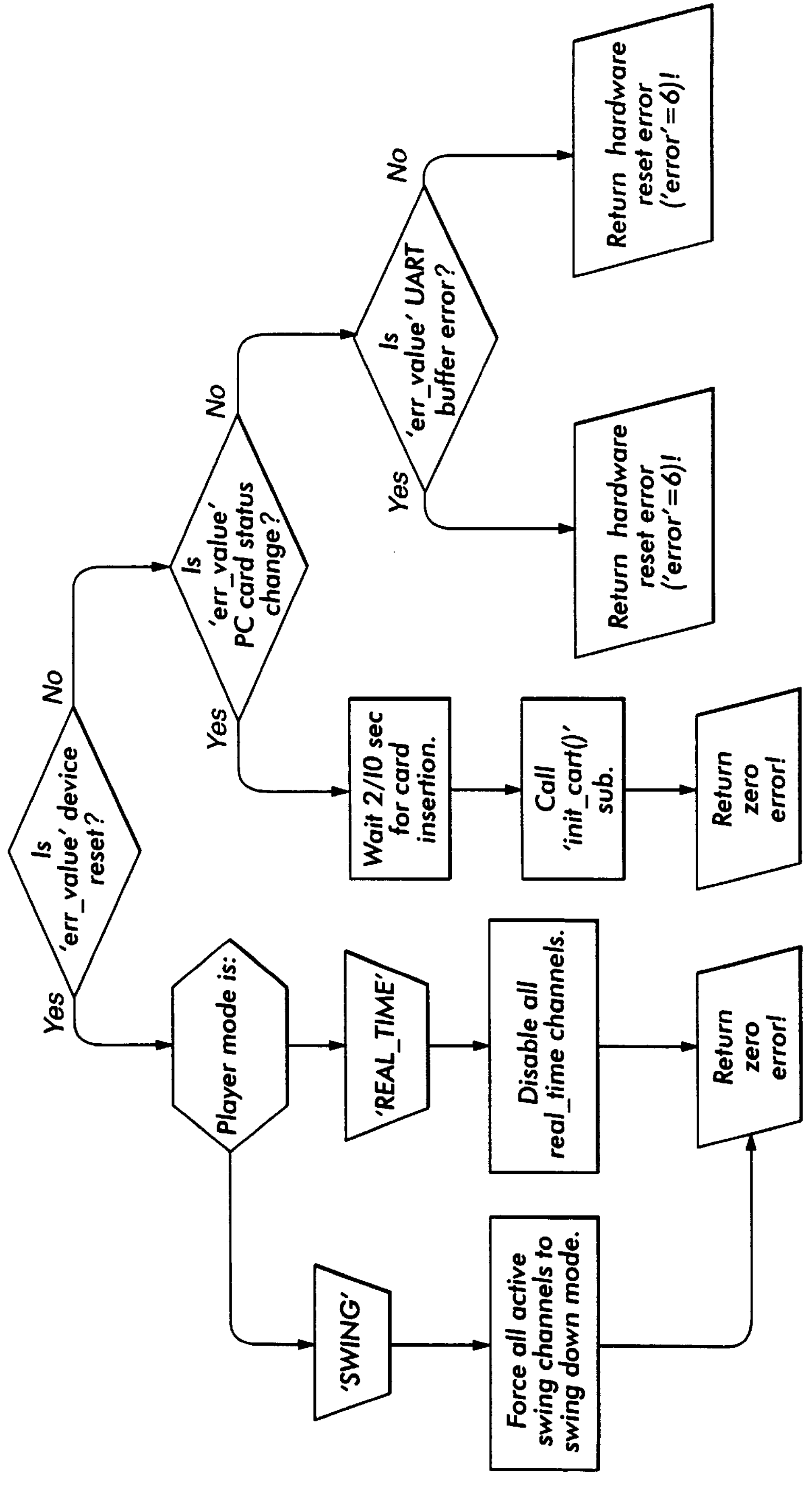
Figure 7A:
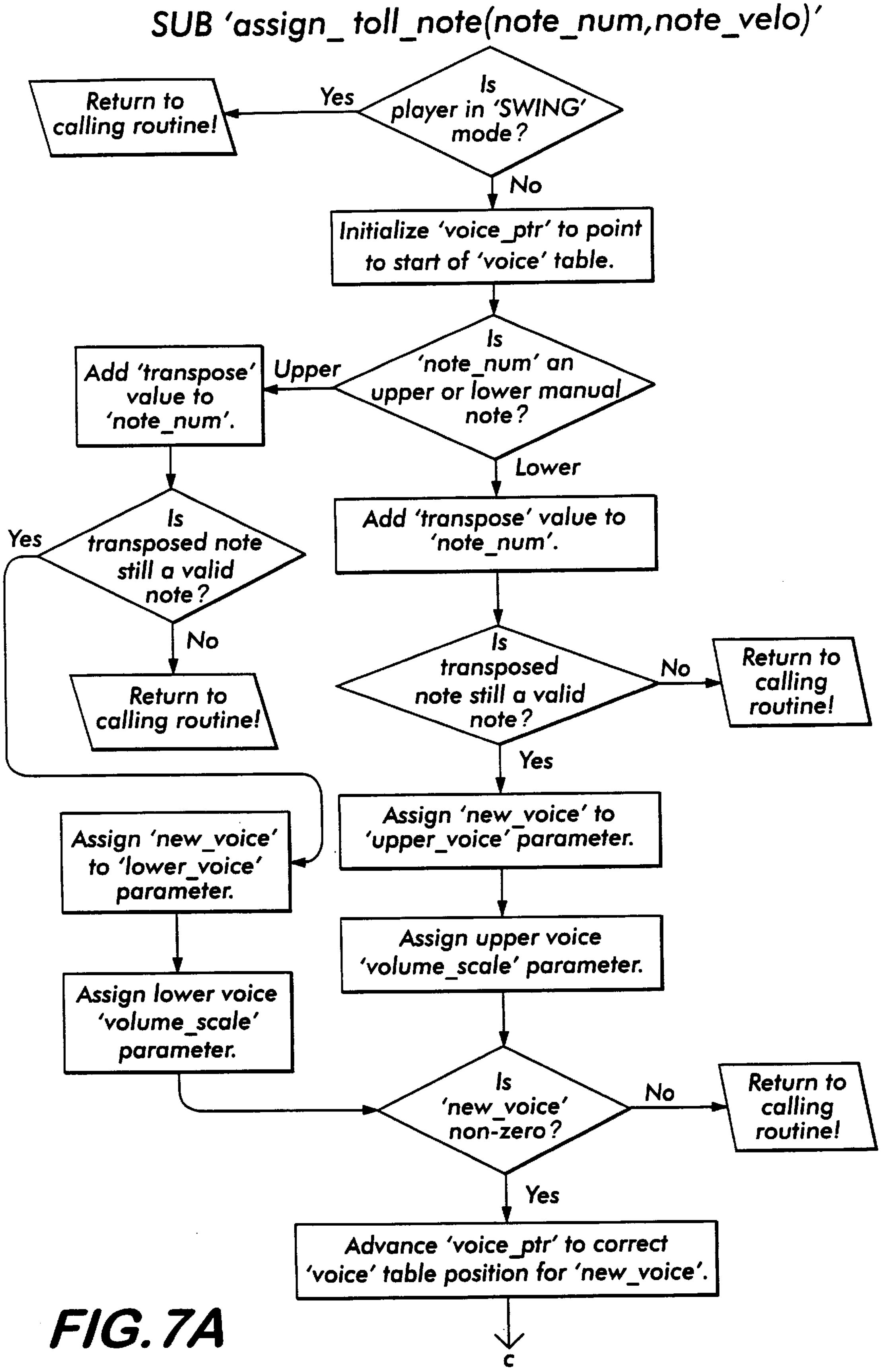
Figure 7B:
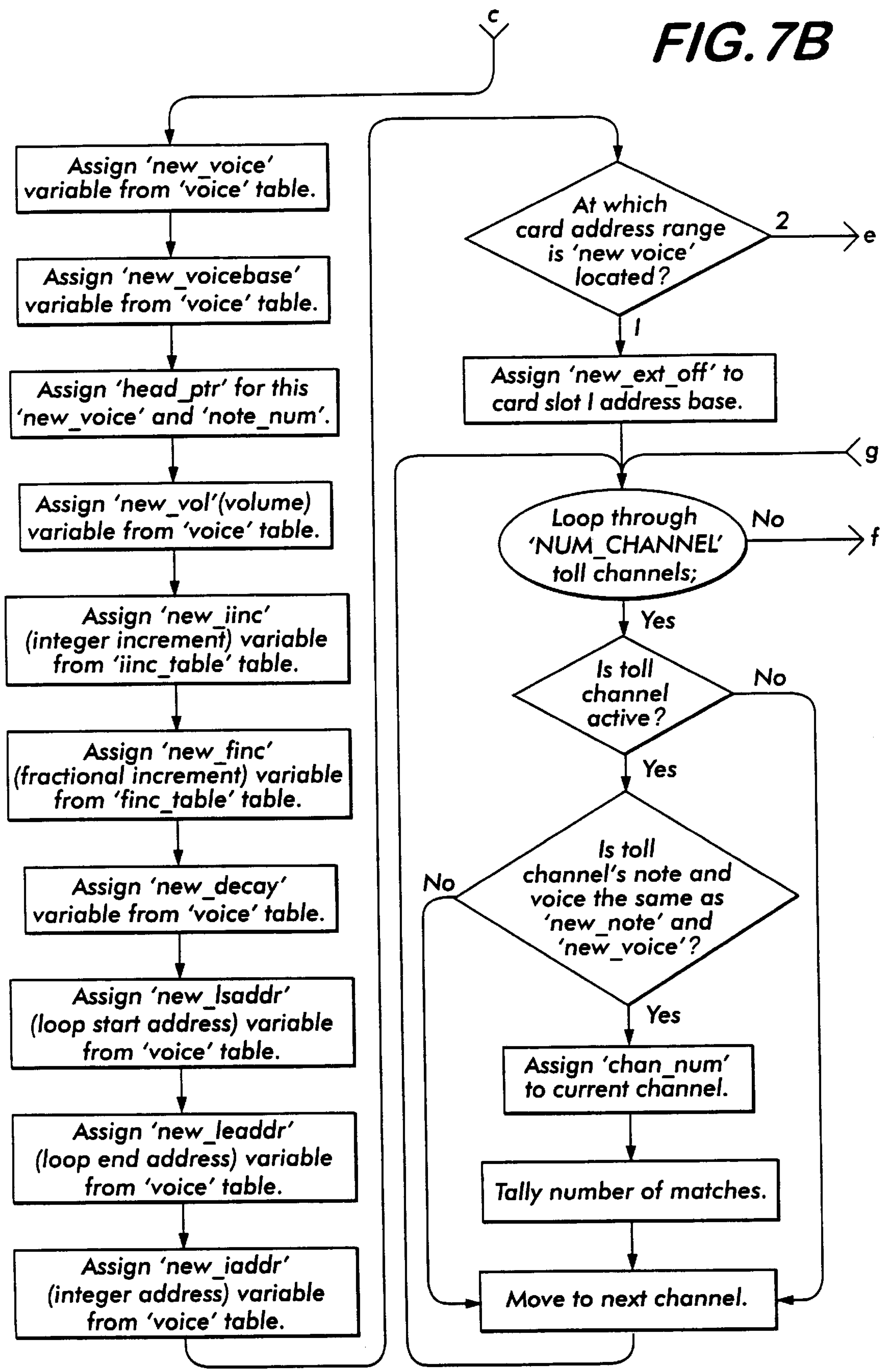
Figure 7C:
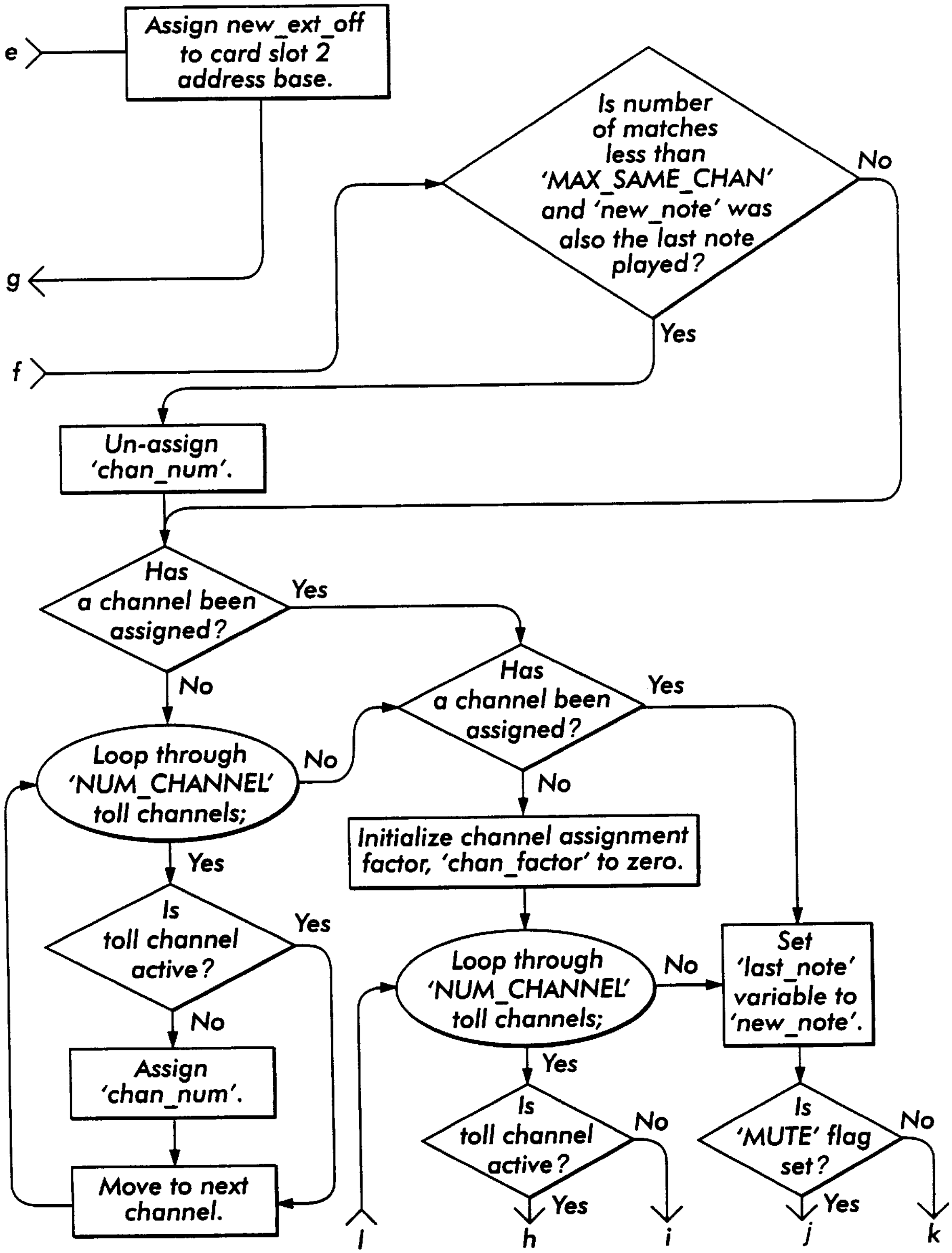
Figure 7D:
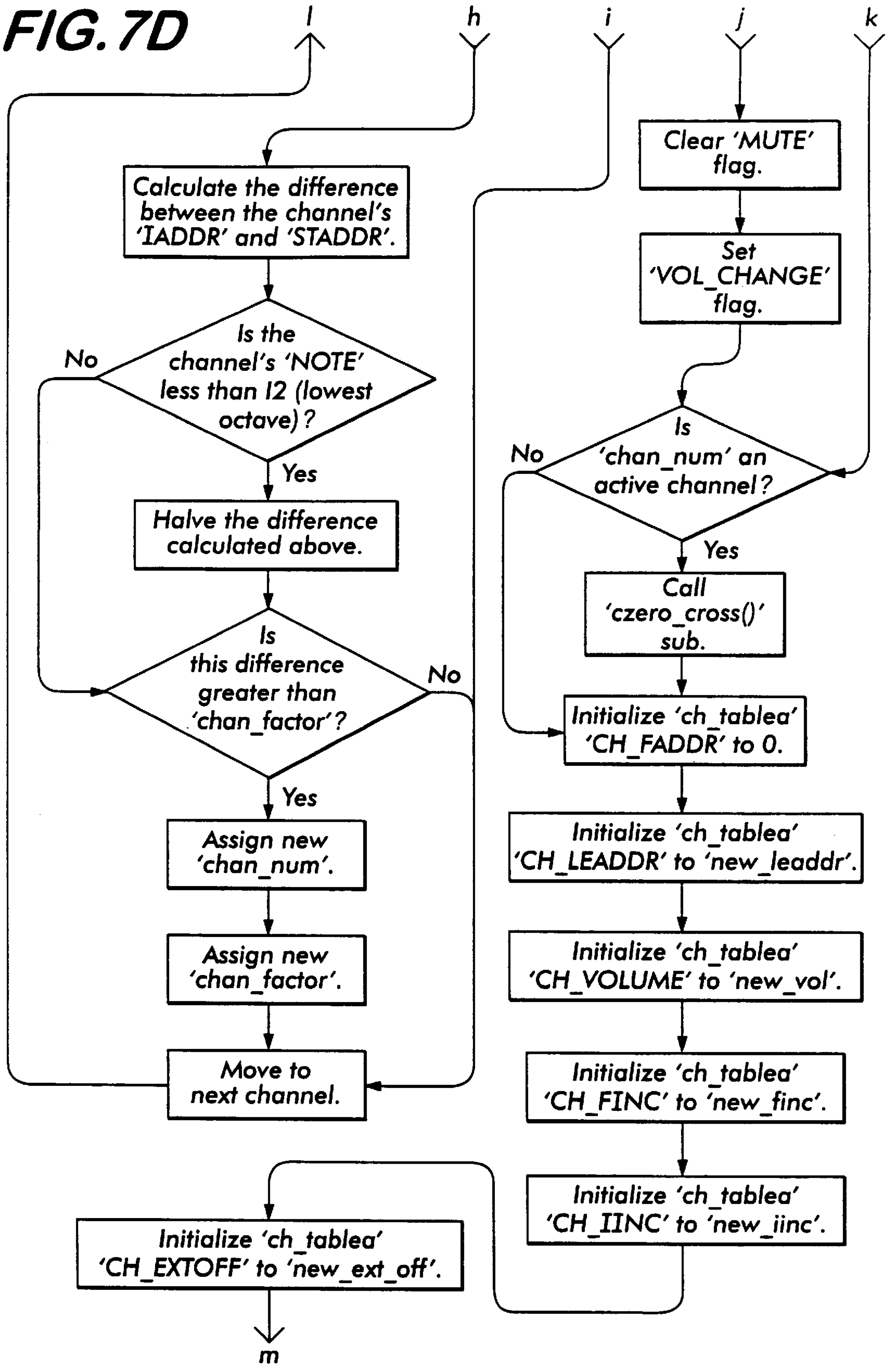
Figure 7E:
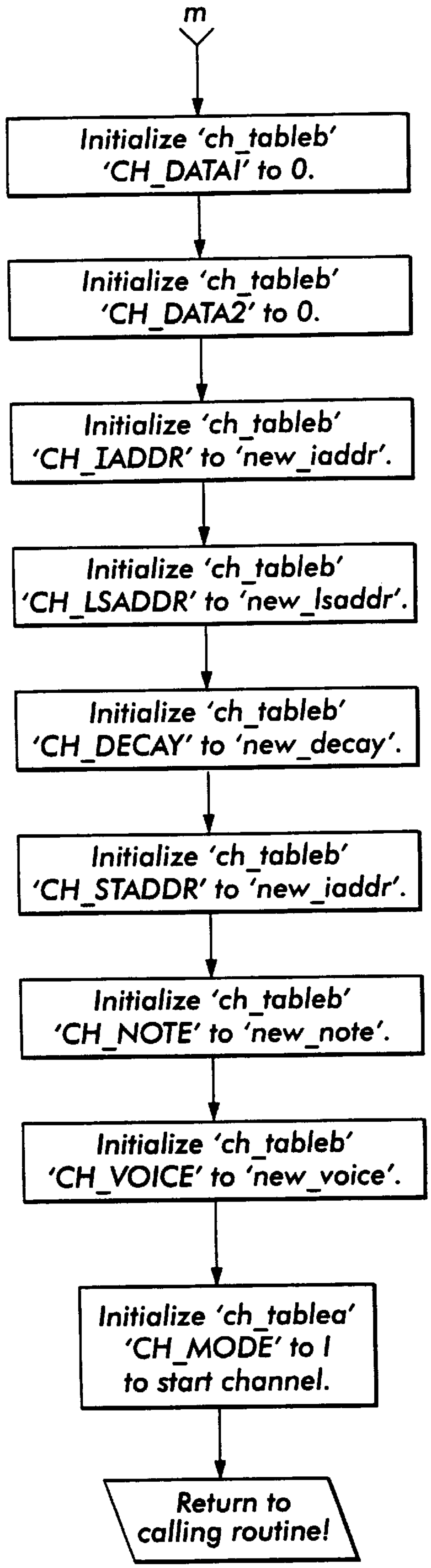
Figure 8A:
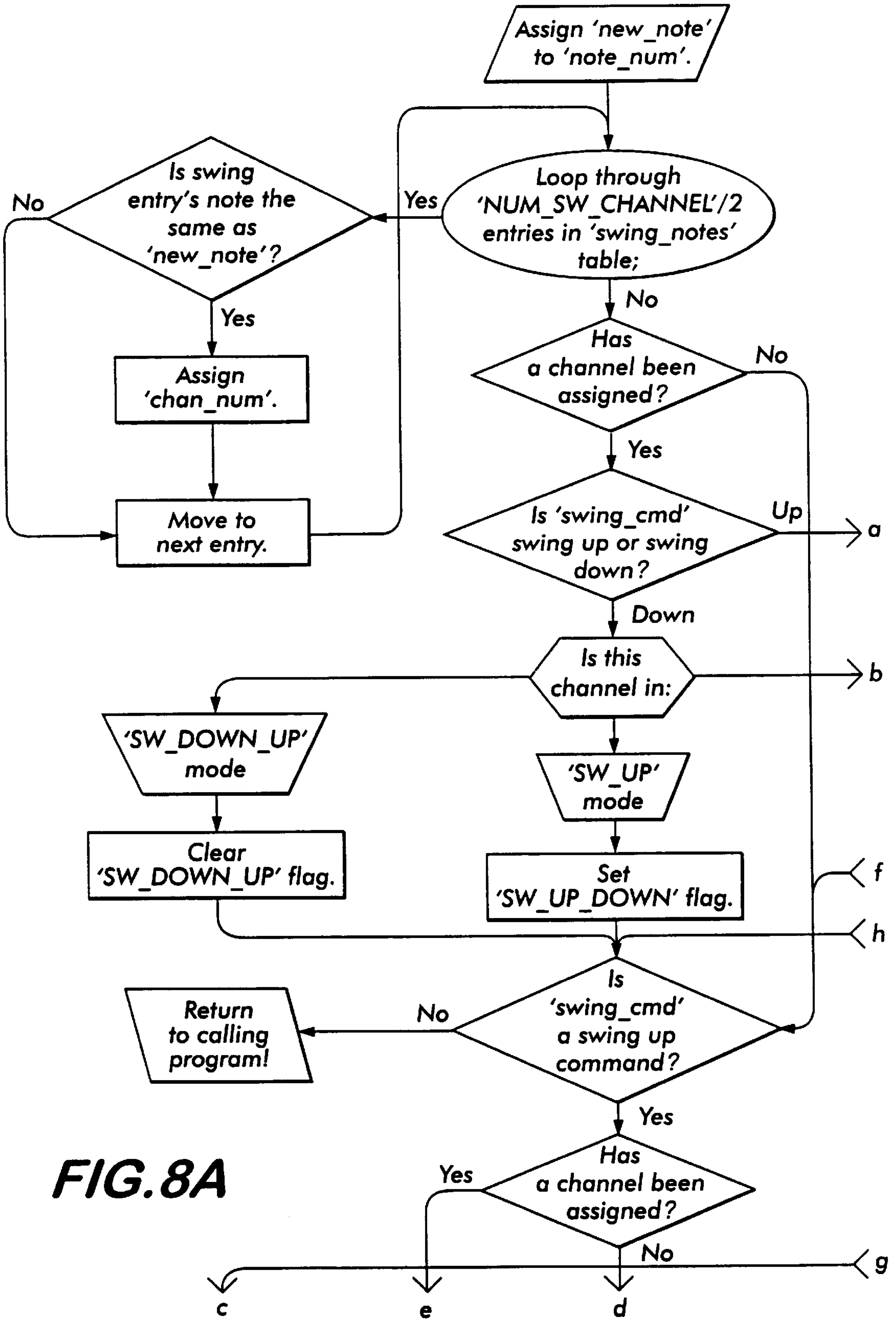
Figure 8B:
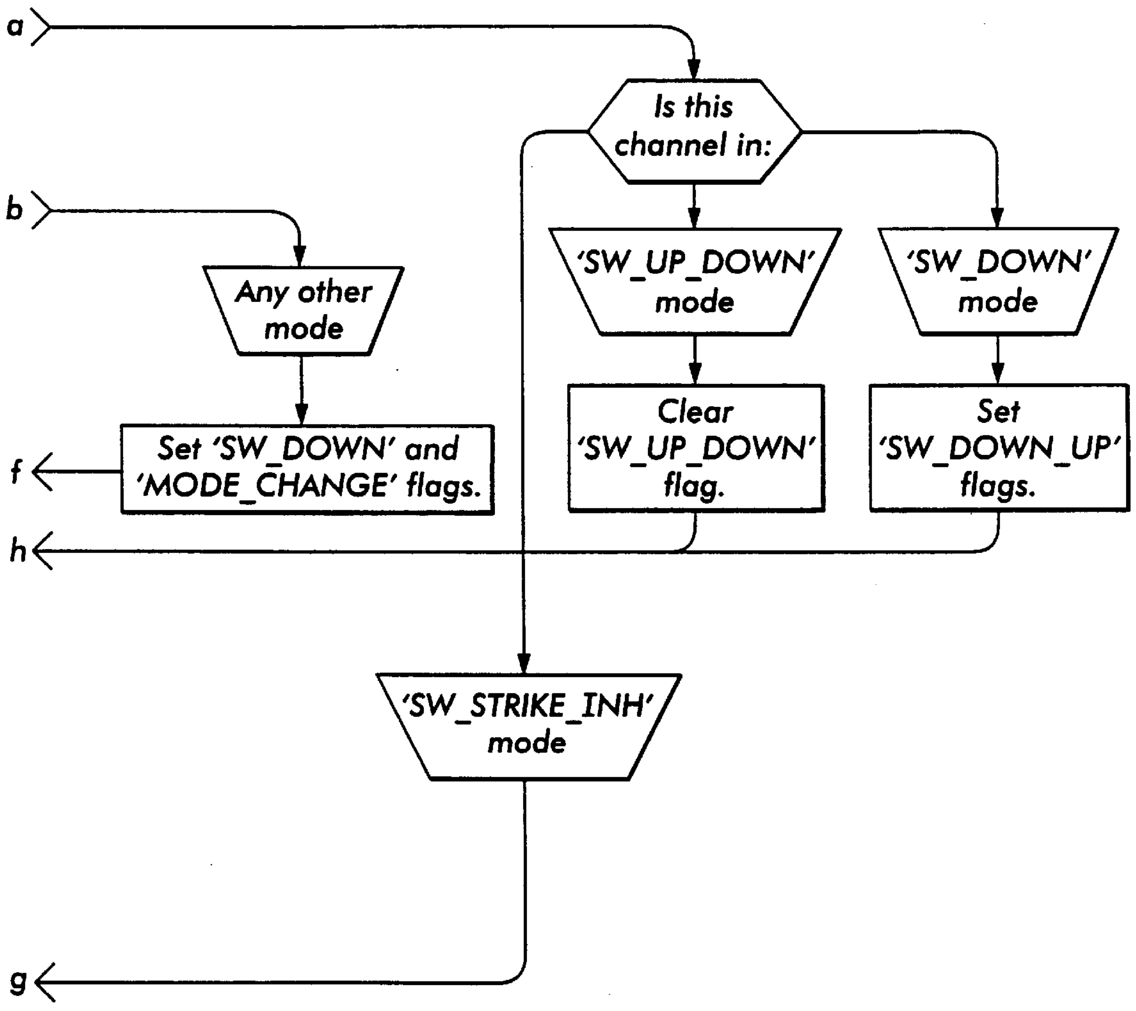
Figure 8C:
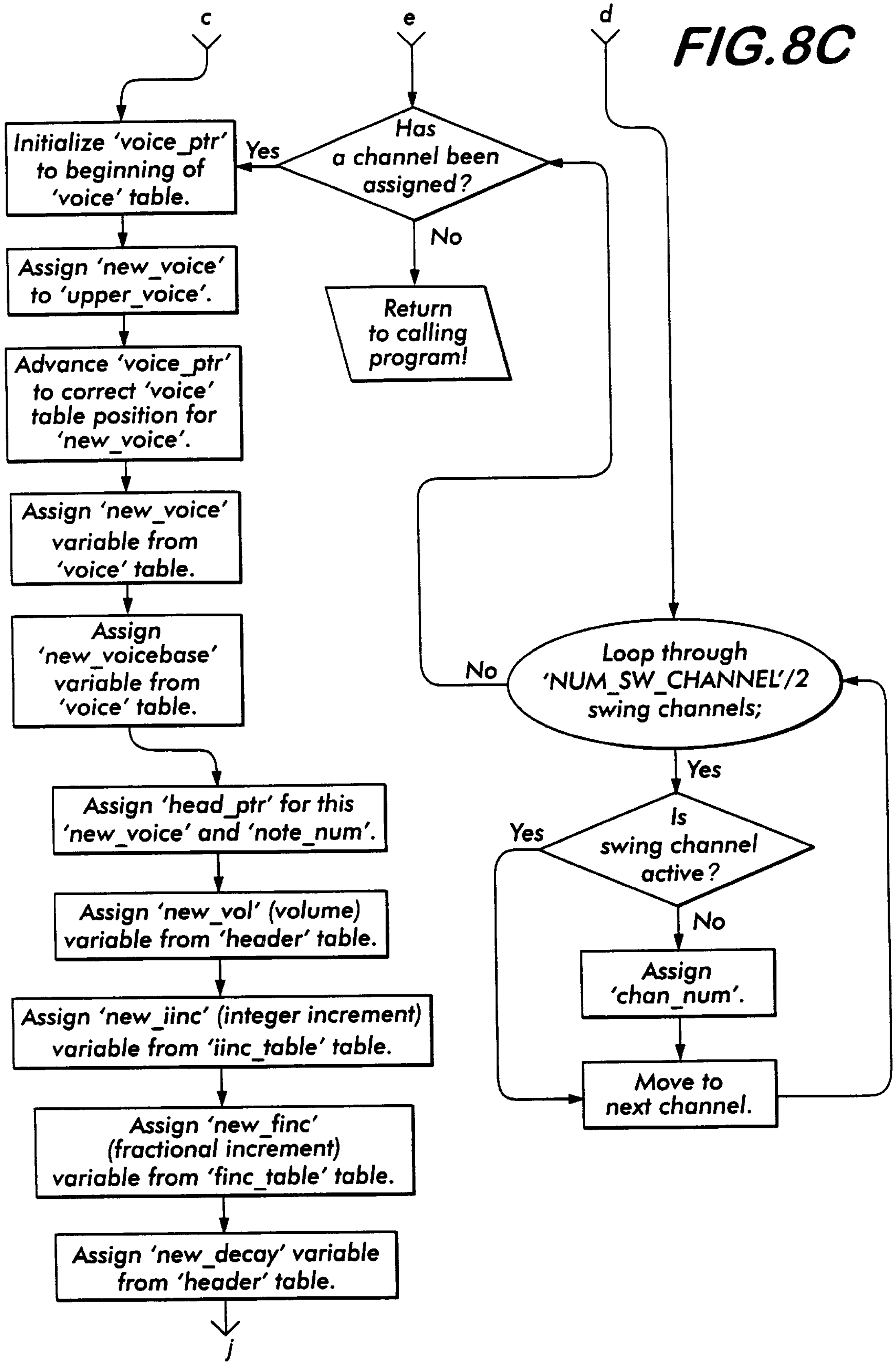
Figure 8D:
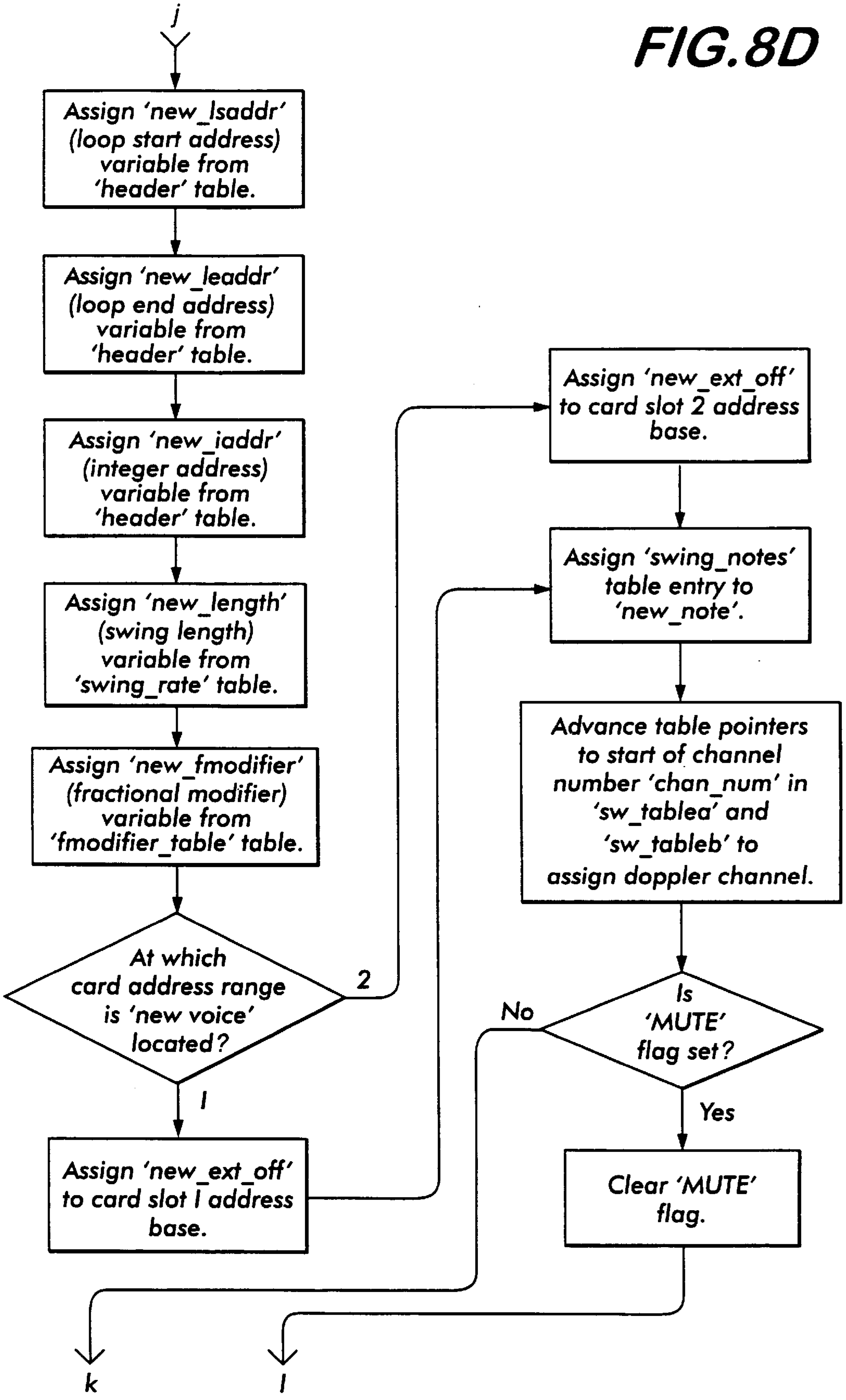
Figure 8E:
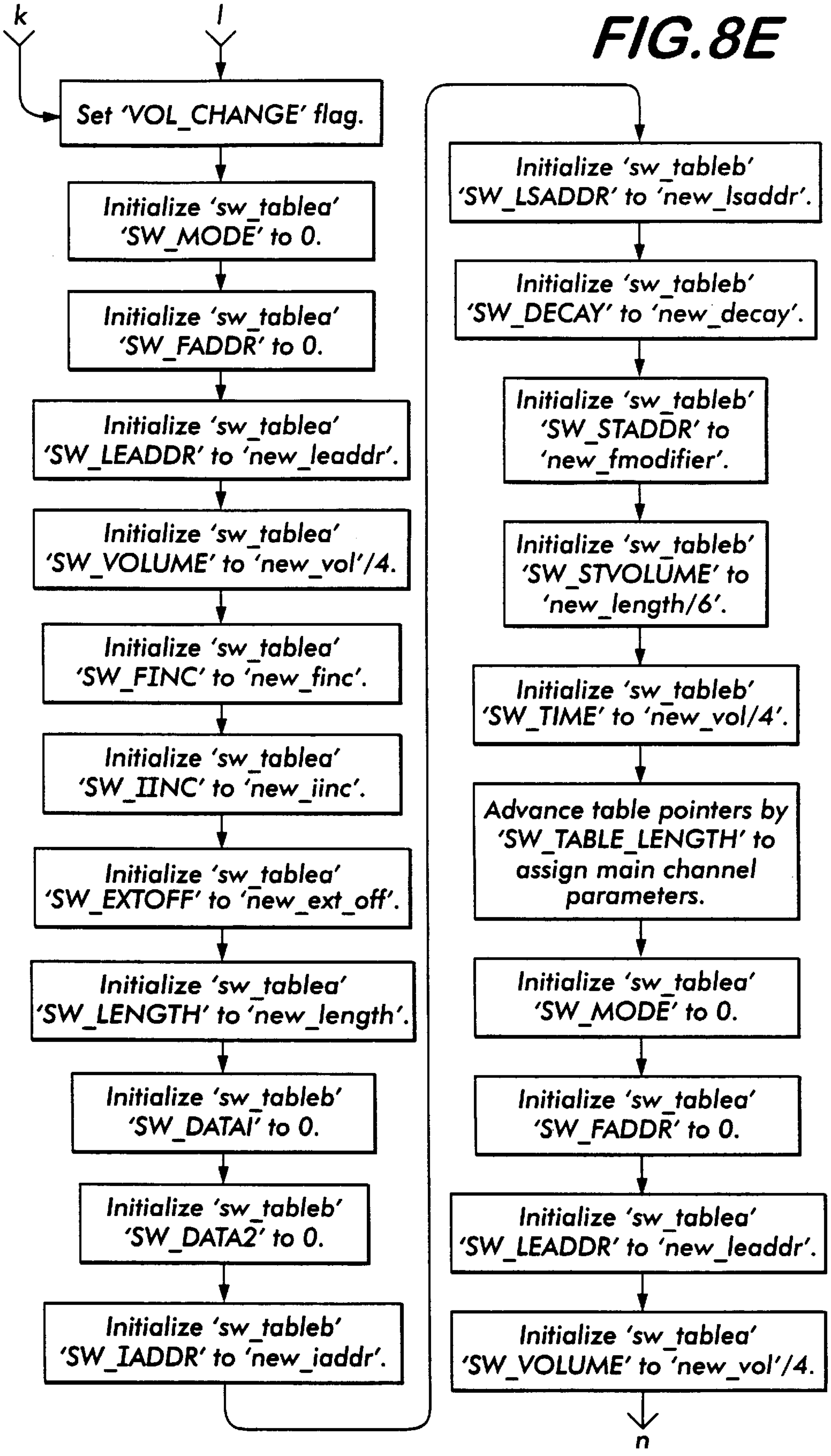
Figure 8F:
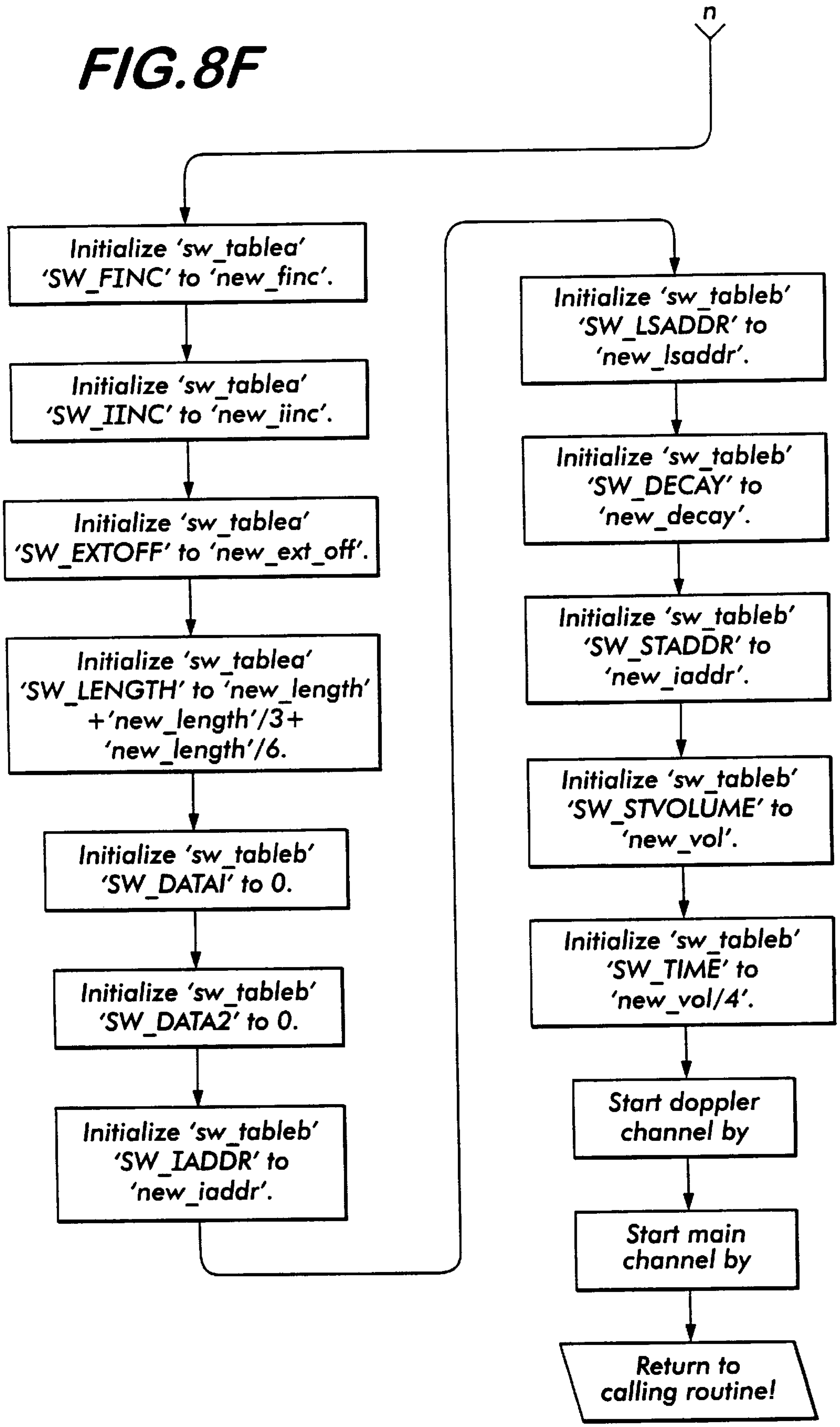

FIG. 6 depicts an "error__handler()" subroutine.

FIGS. 7 and 7A–7E depict an "assign__toll__note()" subroutine.

FIG. 8 and 8A–8F depict "assign__swing__note()".

Figure 9:
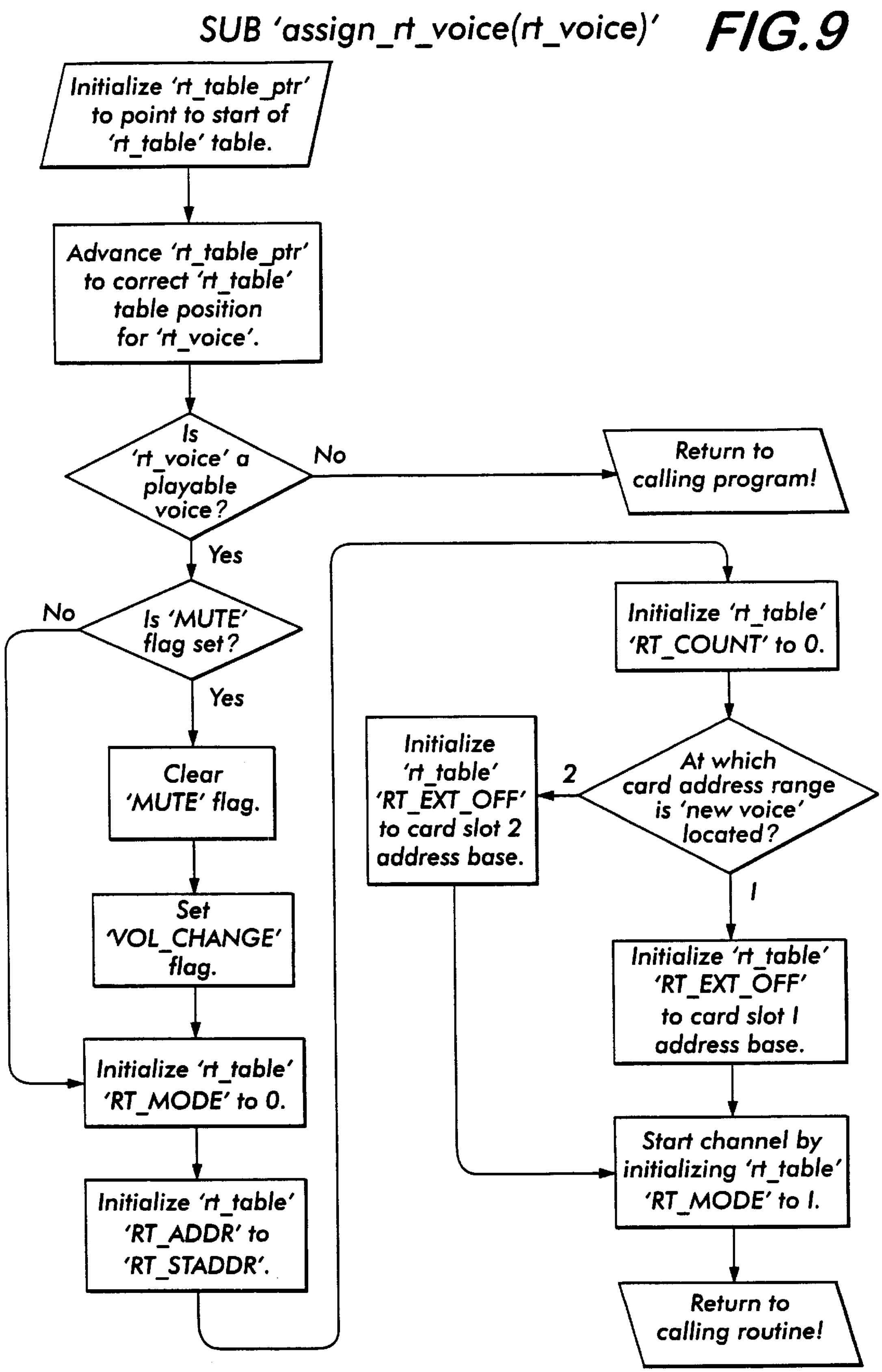

FIG. 9 depicts "assign__rt__voice()".

Figure 10:
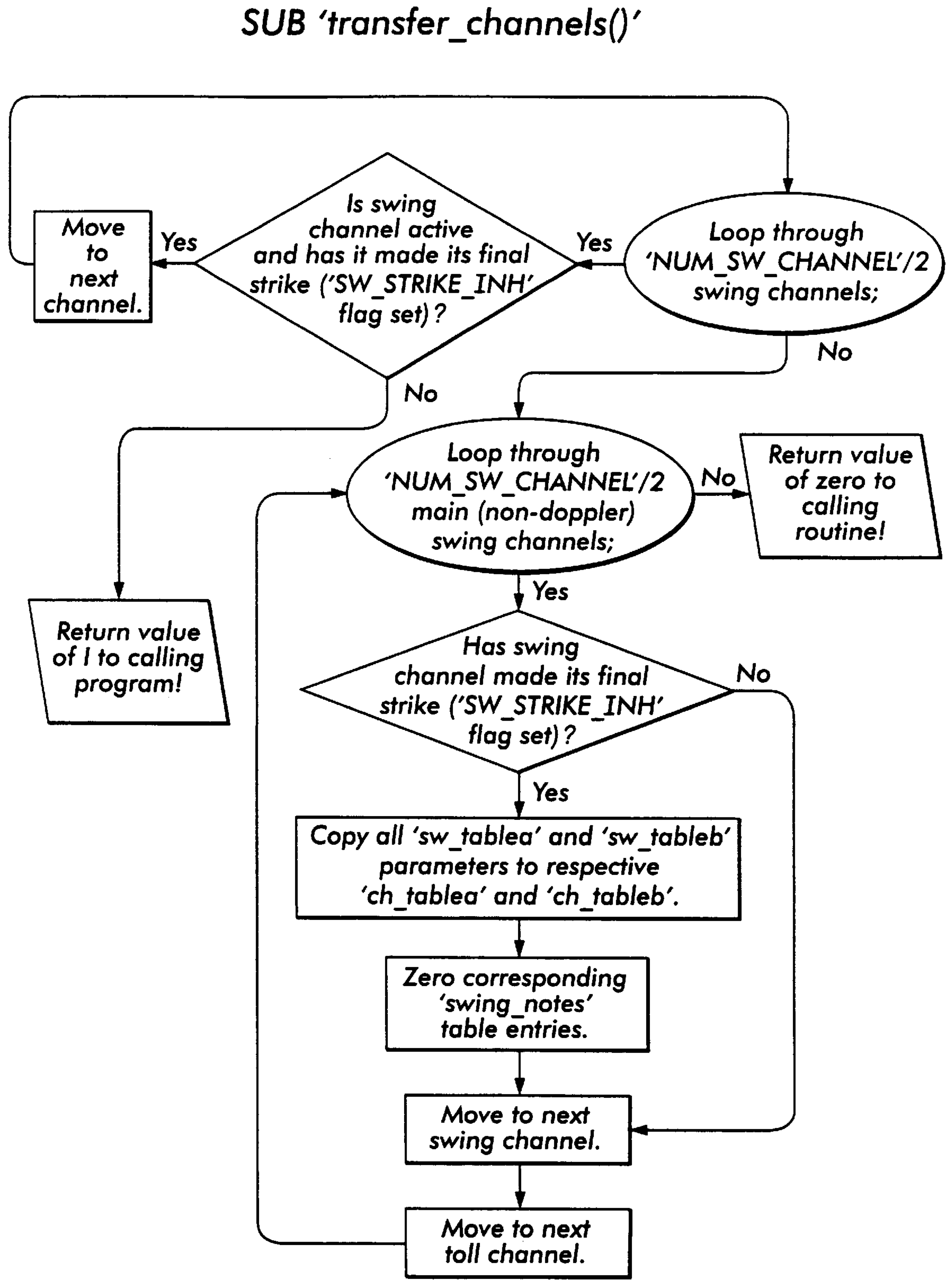

FIG. 10 depicts a "transfer__channels" subroutine.

Figure 11:
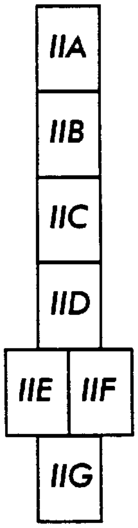
Figure 16:
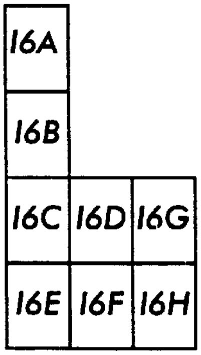
Figure 17:
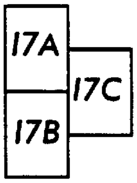
Figure 11A:
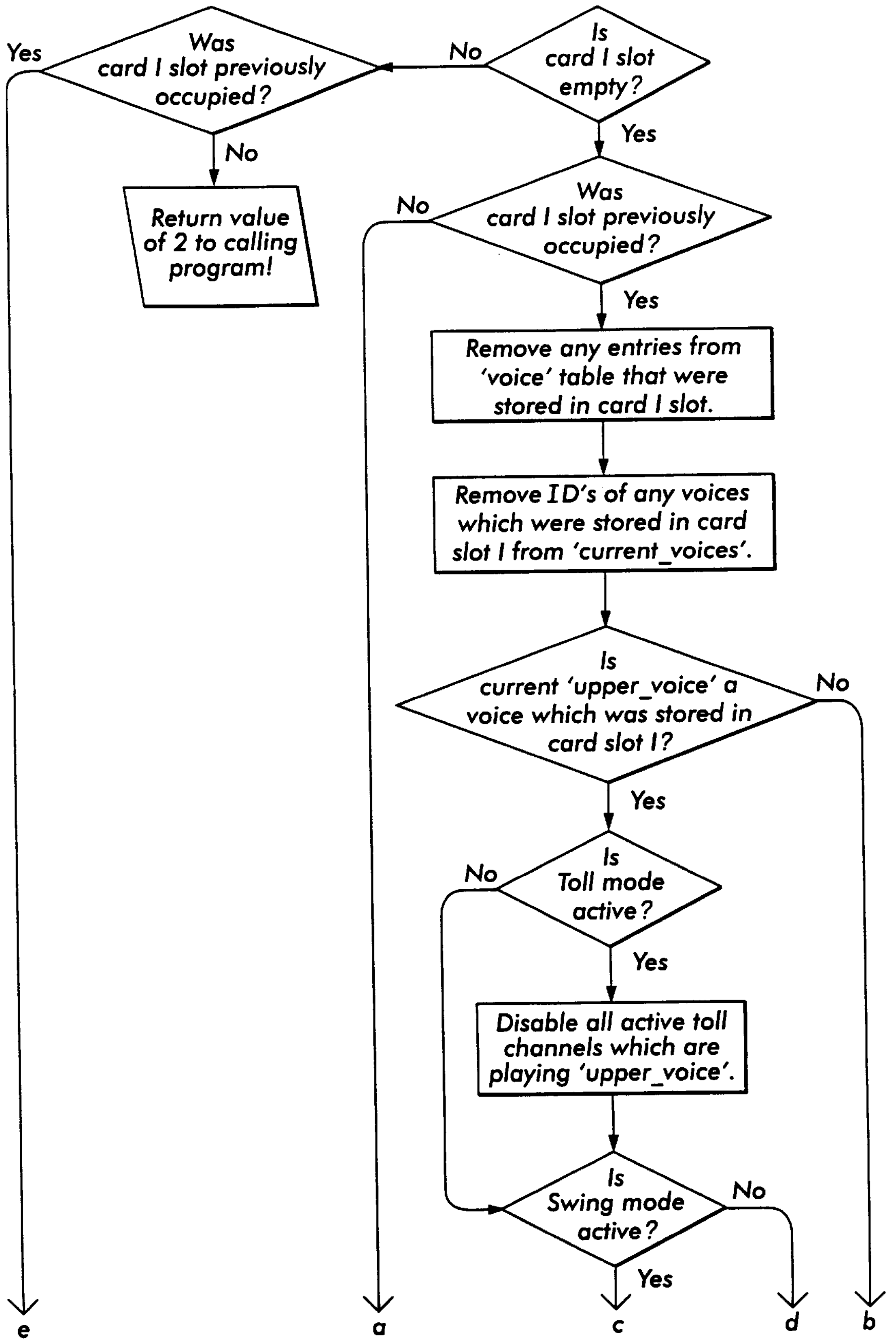
Figure 11B:
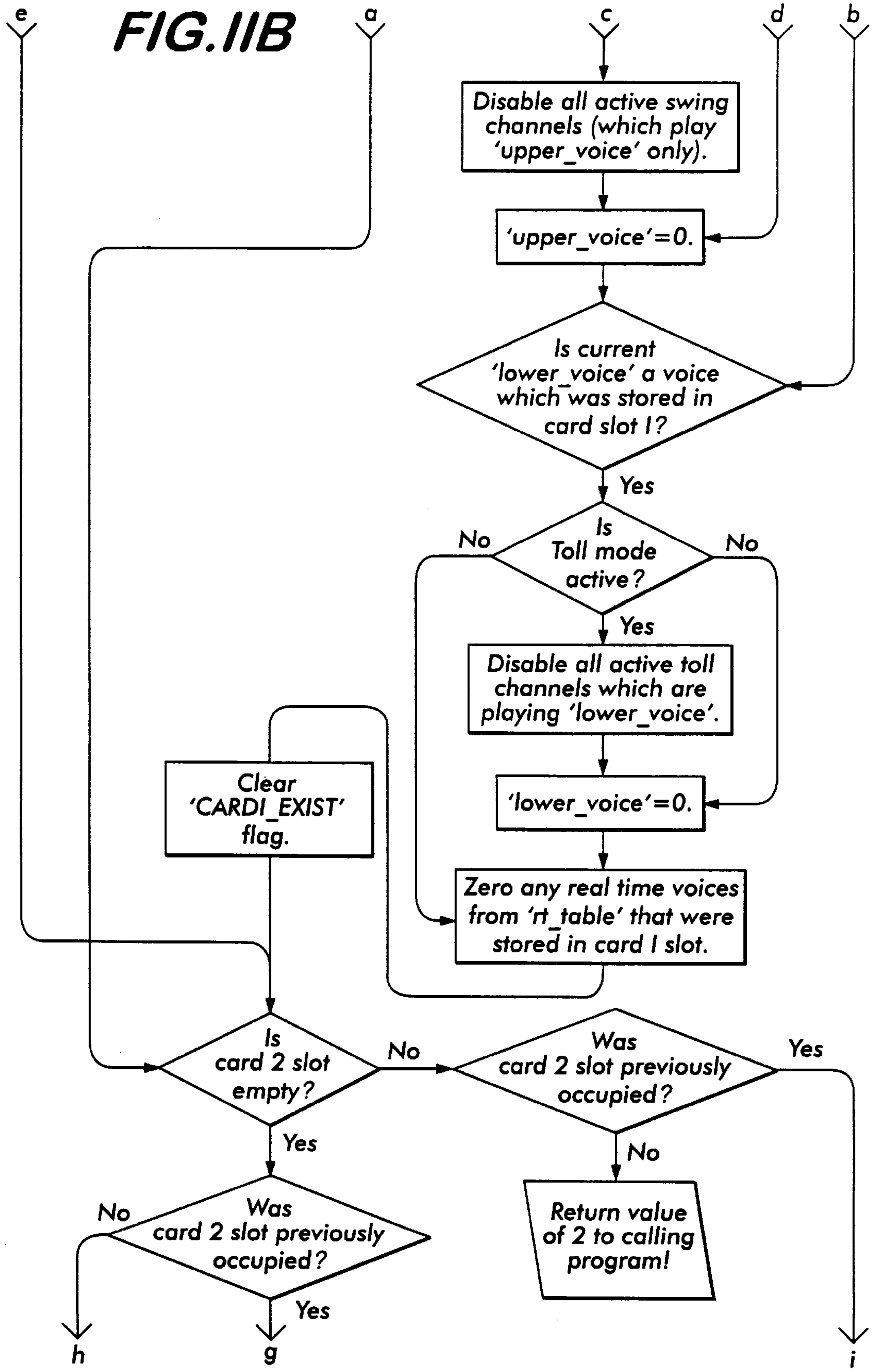
Figure 11C:
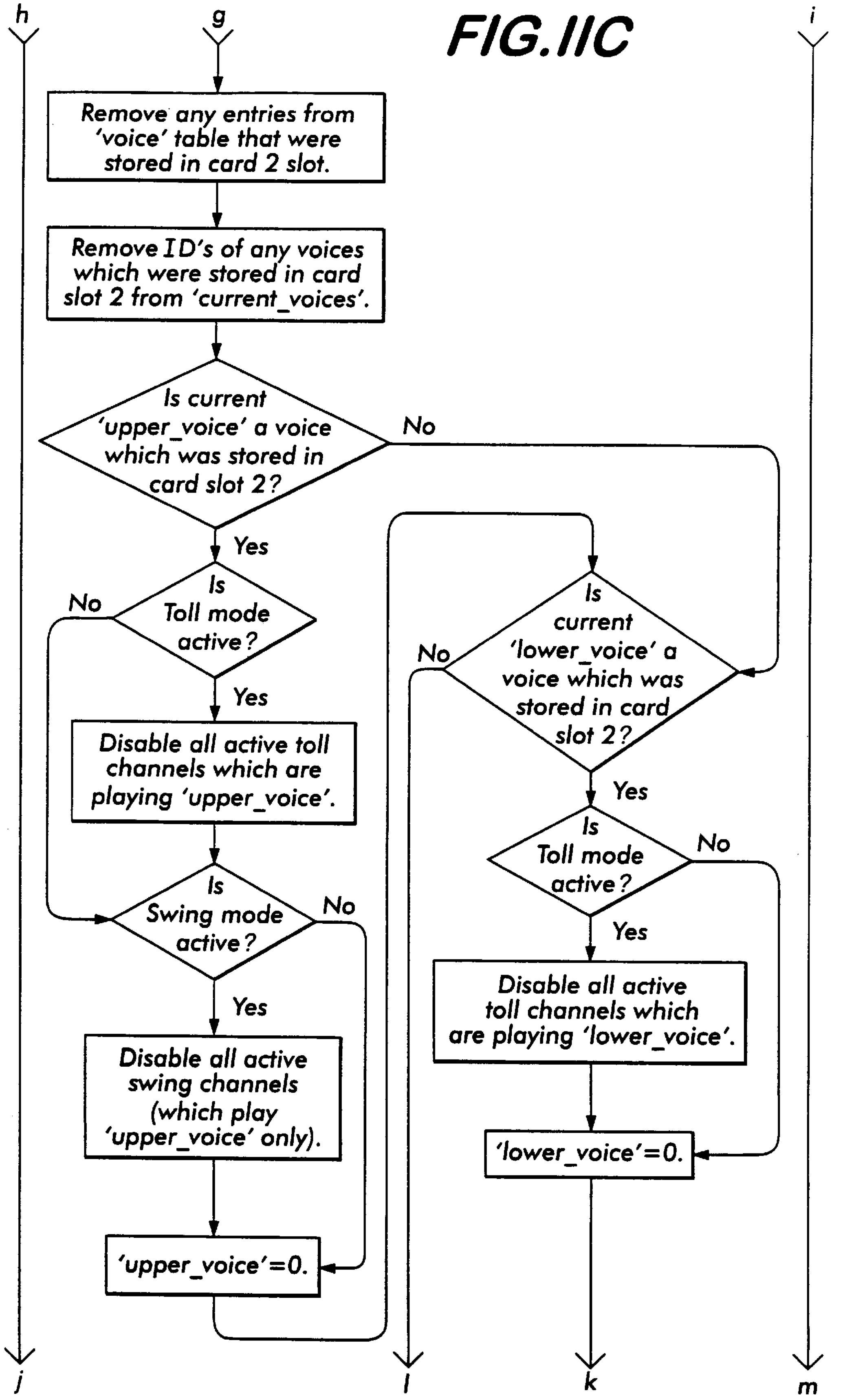
Figure 11D:
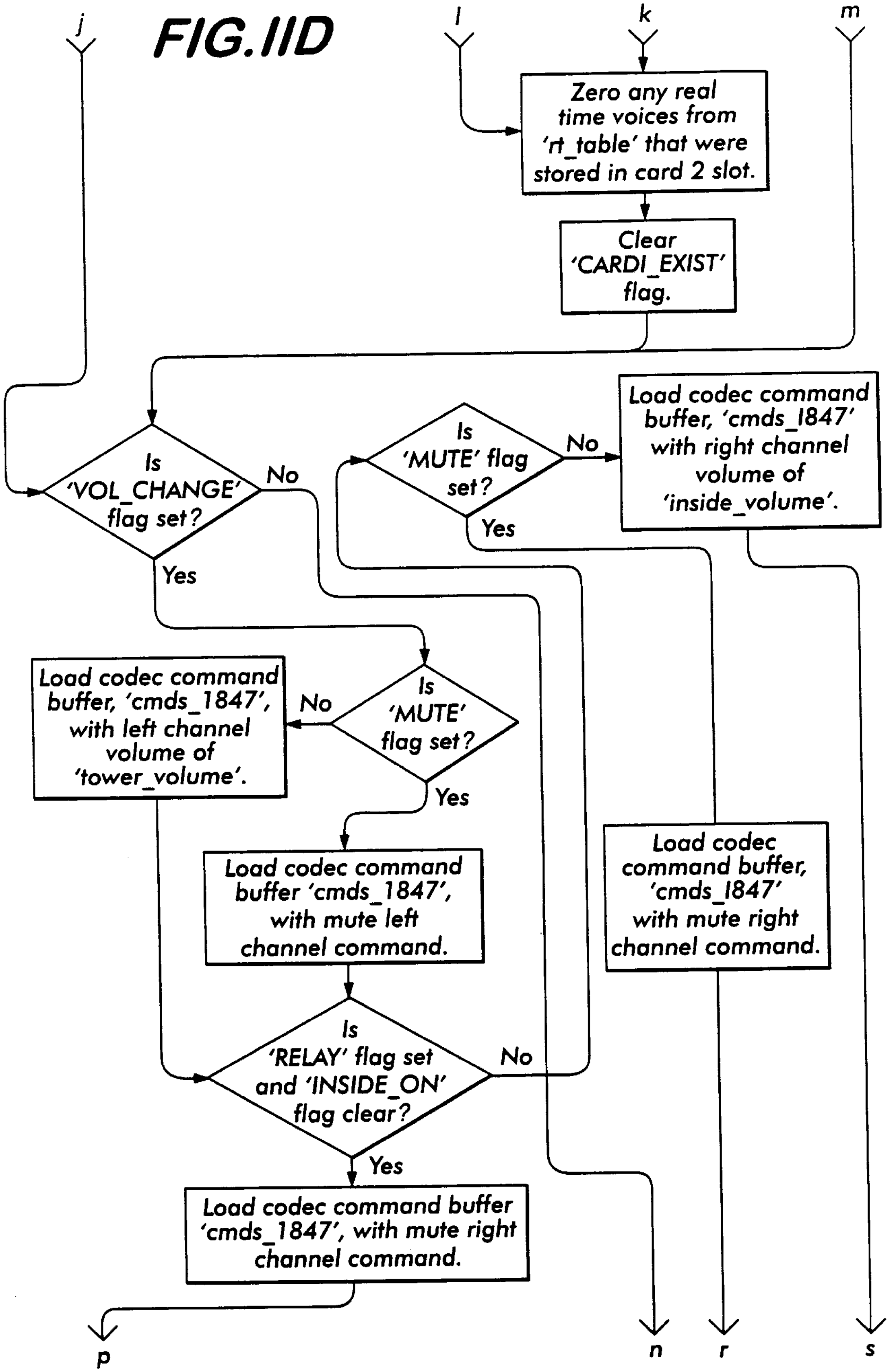
Figure 11E:
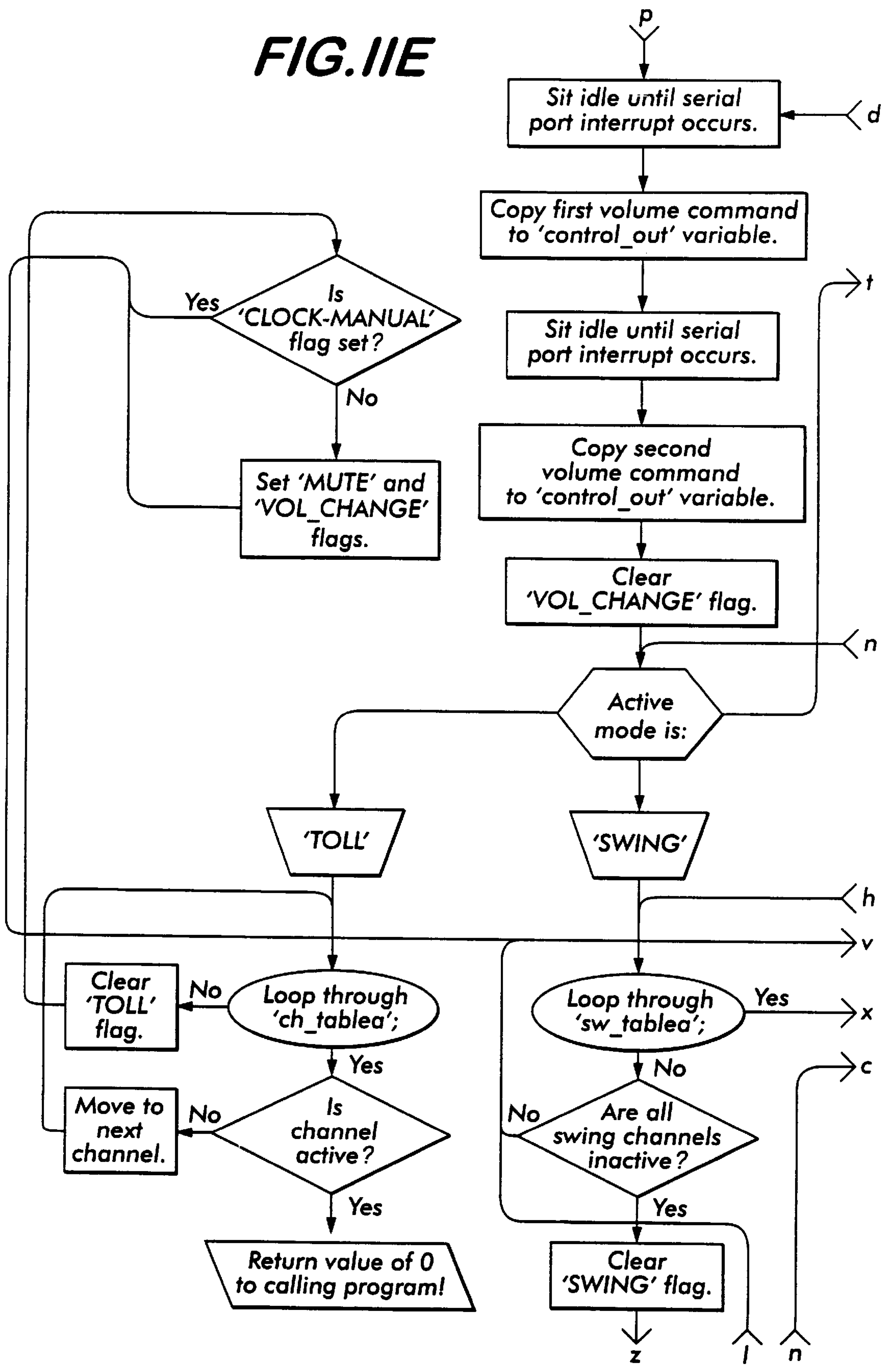
Figure 11F:
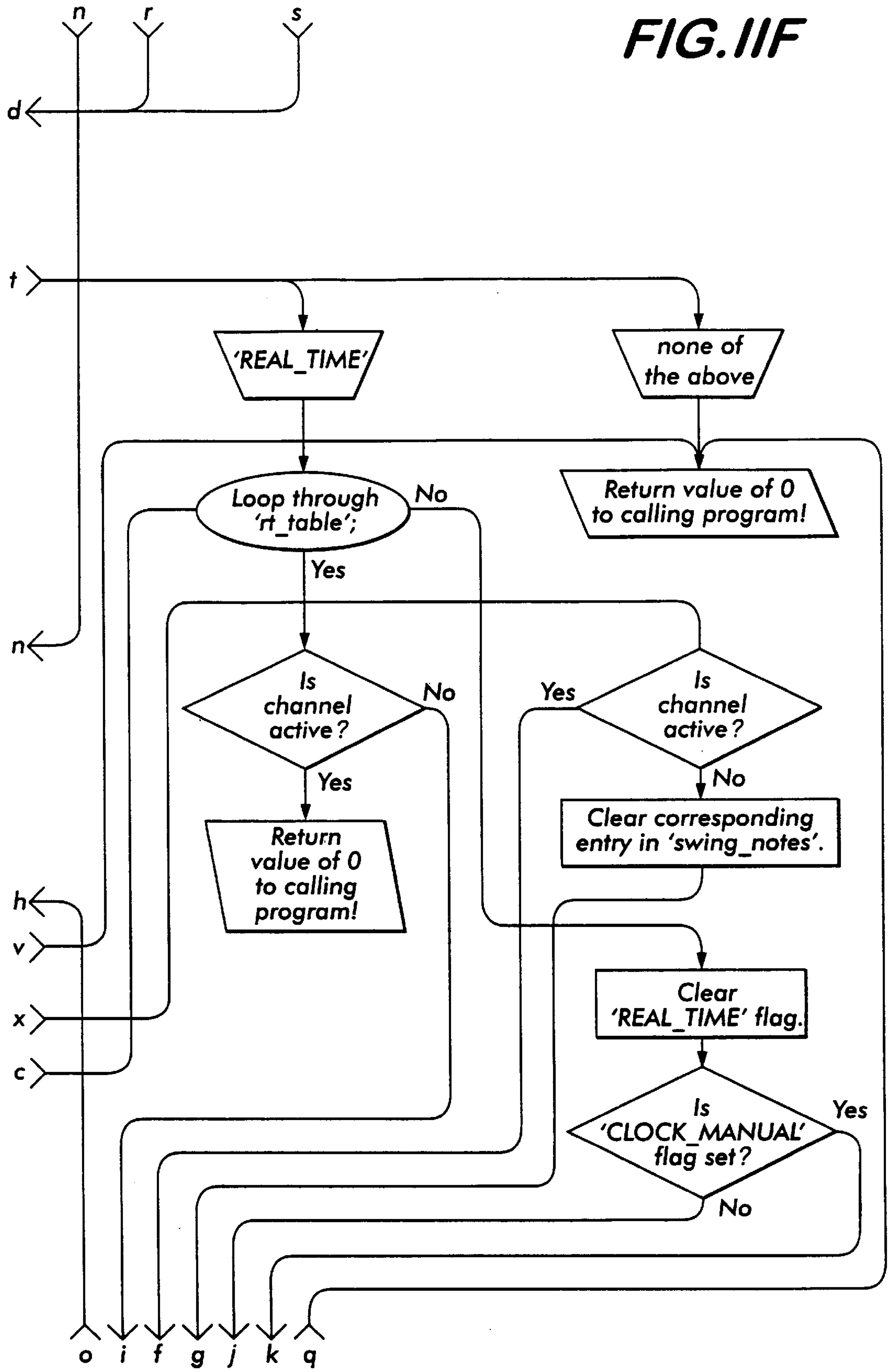
Figure 11G:
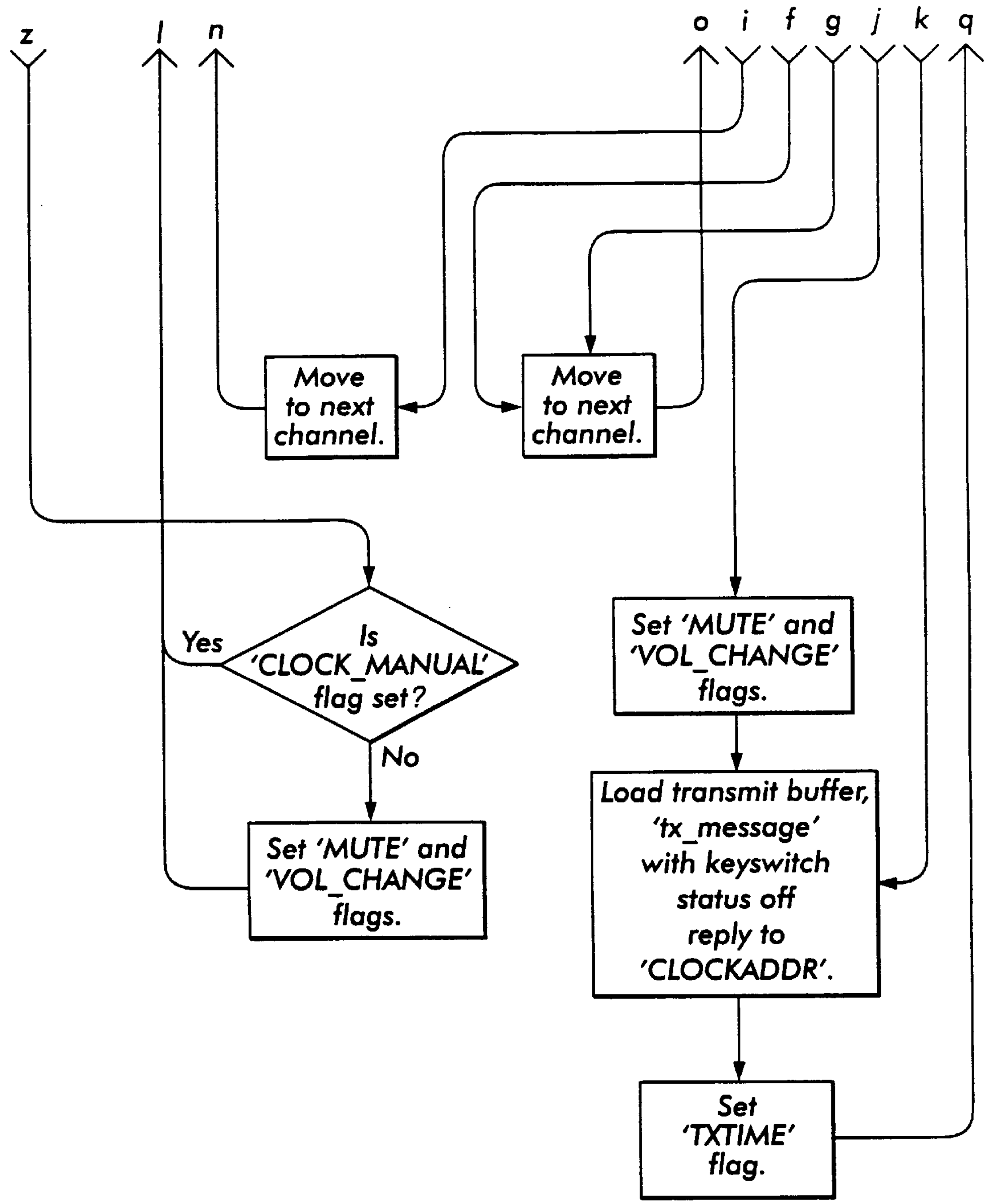

FIGS. 11 and 11–11G depict a "misc__funcs" subroutine.

Figure 12:
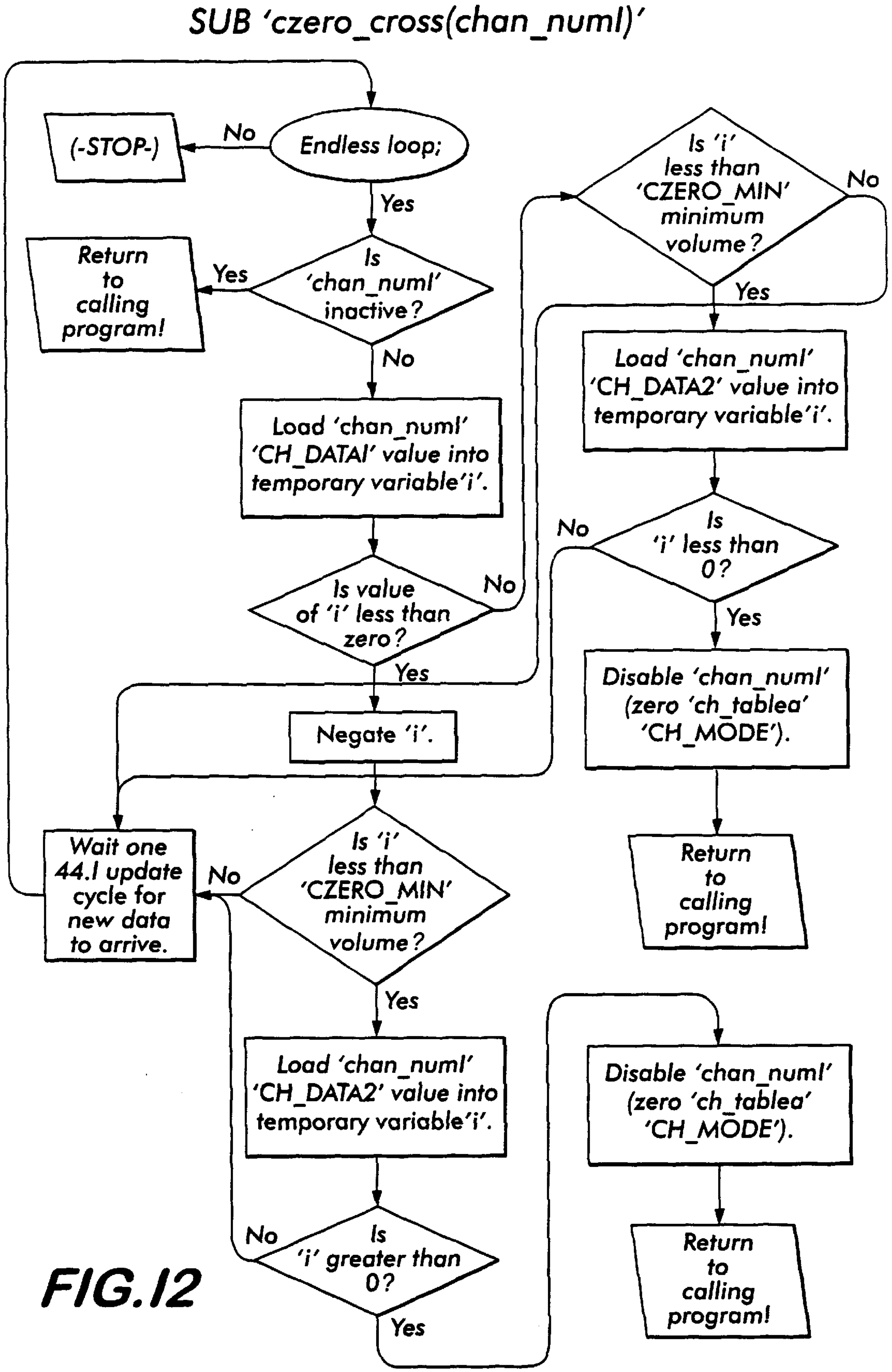

FIG. 12 depicts a "czero__cross()" subroutine.

Figure 13A:
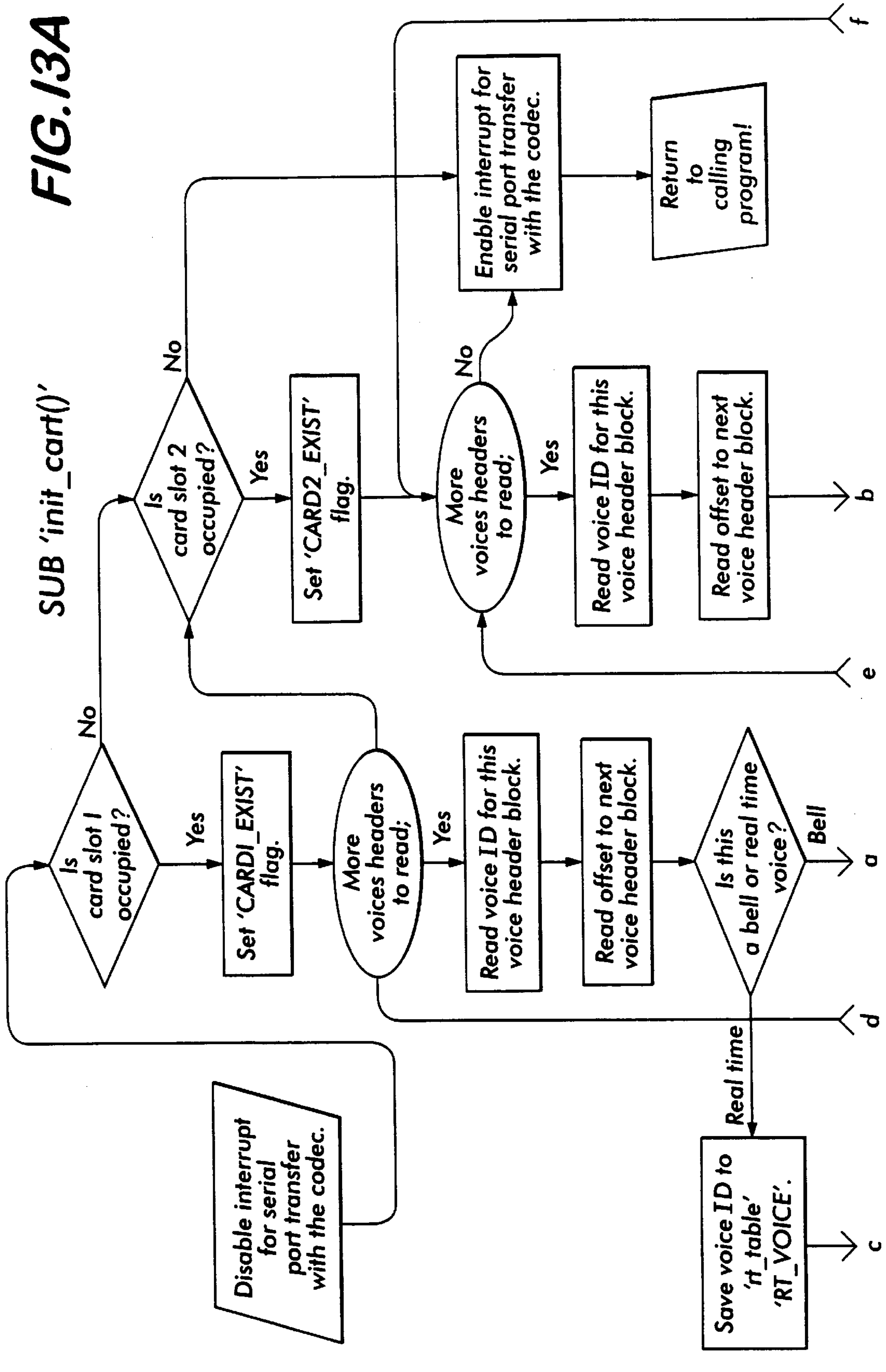
Figure 13B:
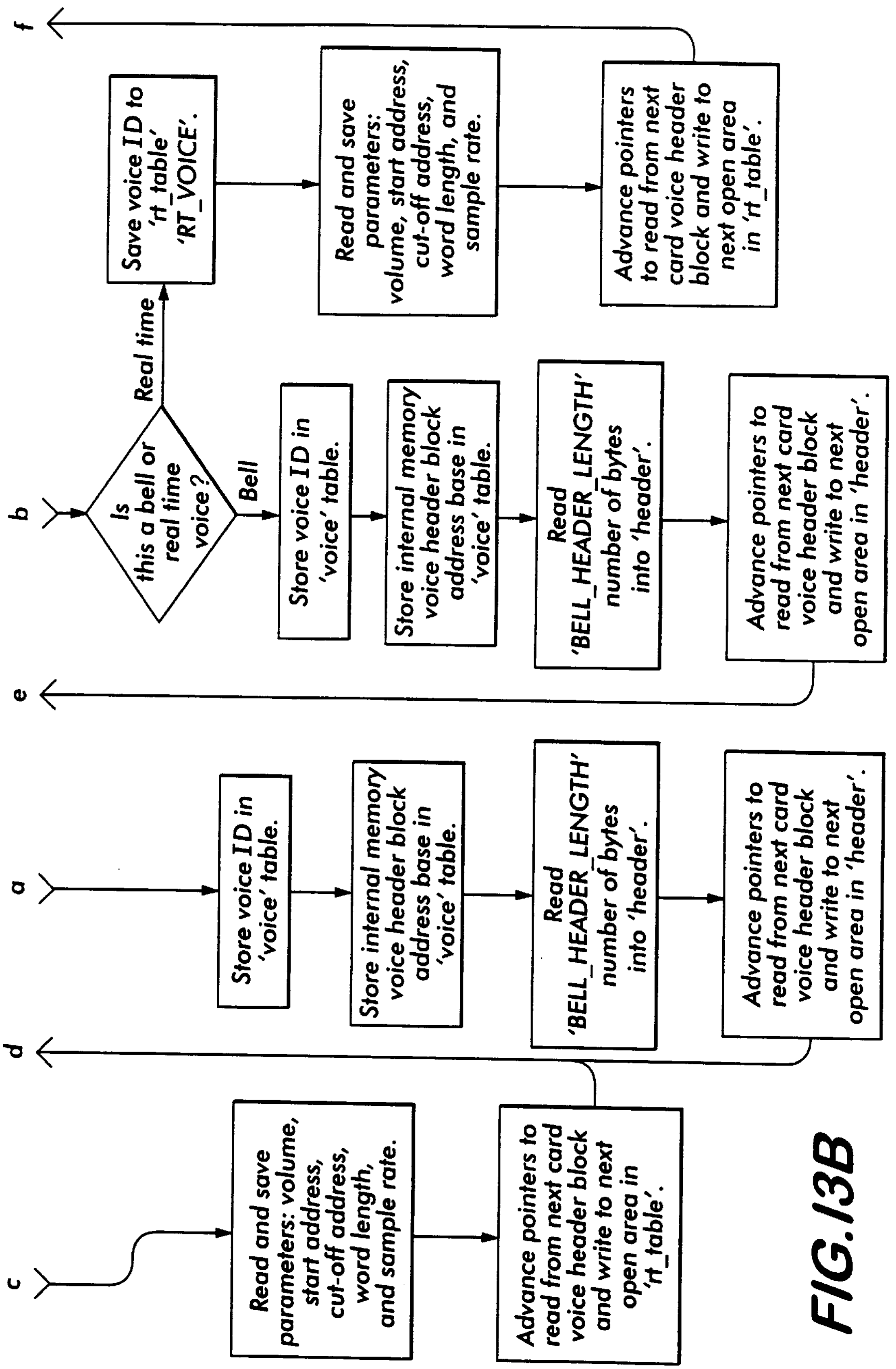

FIGS. 13A and 13B depict "init__card()".

Figure 14:
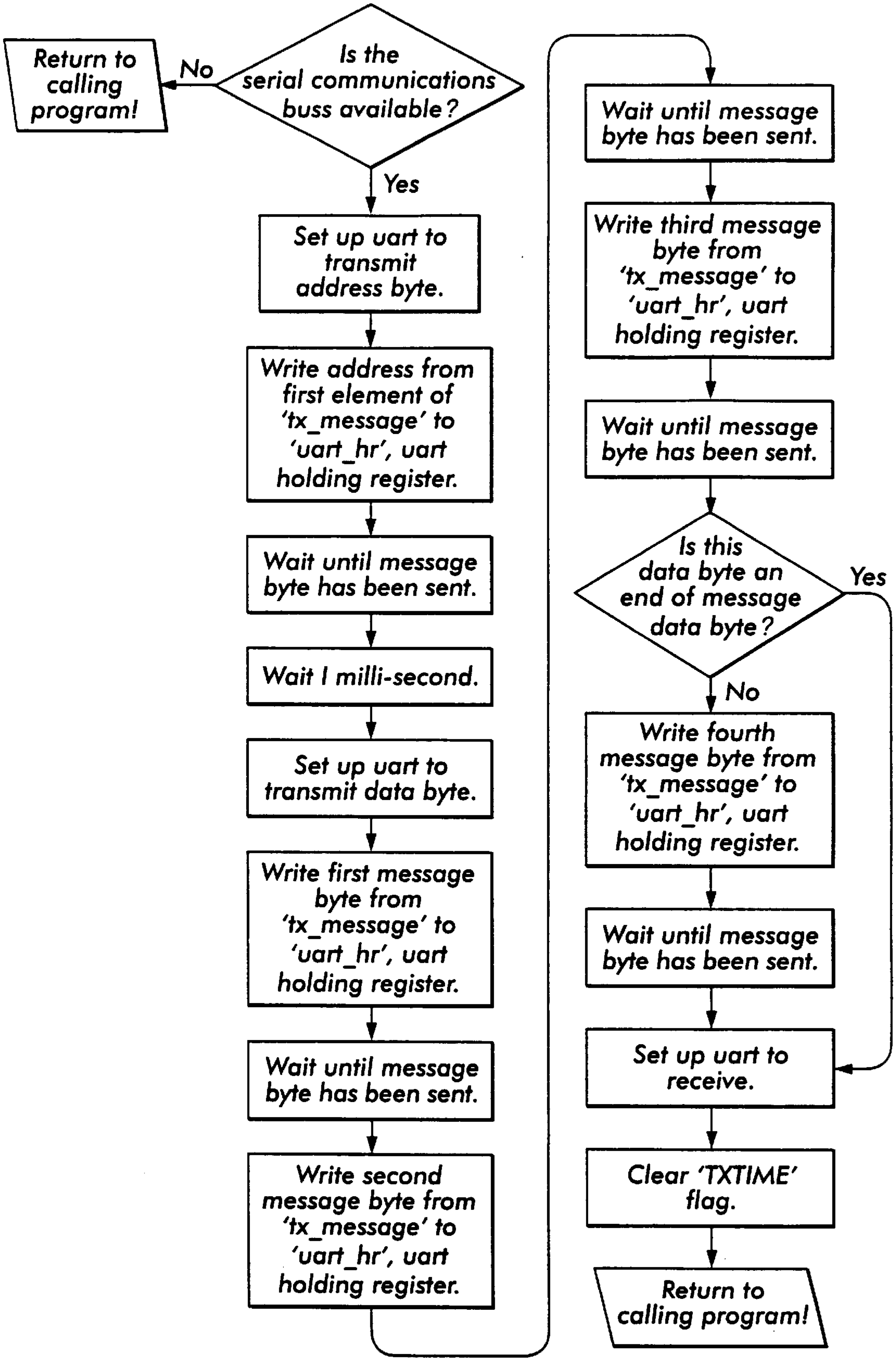

FIG. 14 depicts "__uart__transmit()".

Figure 15A:
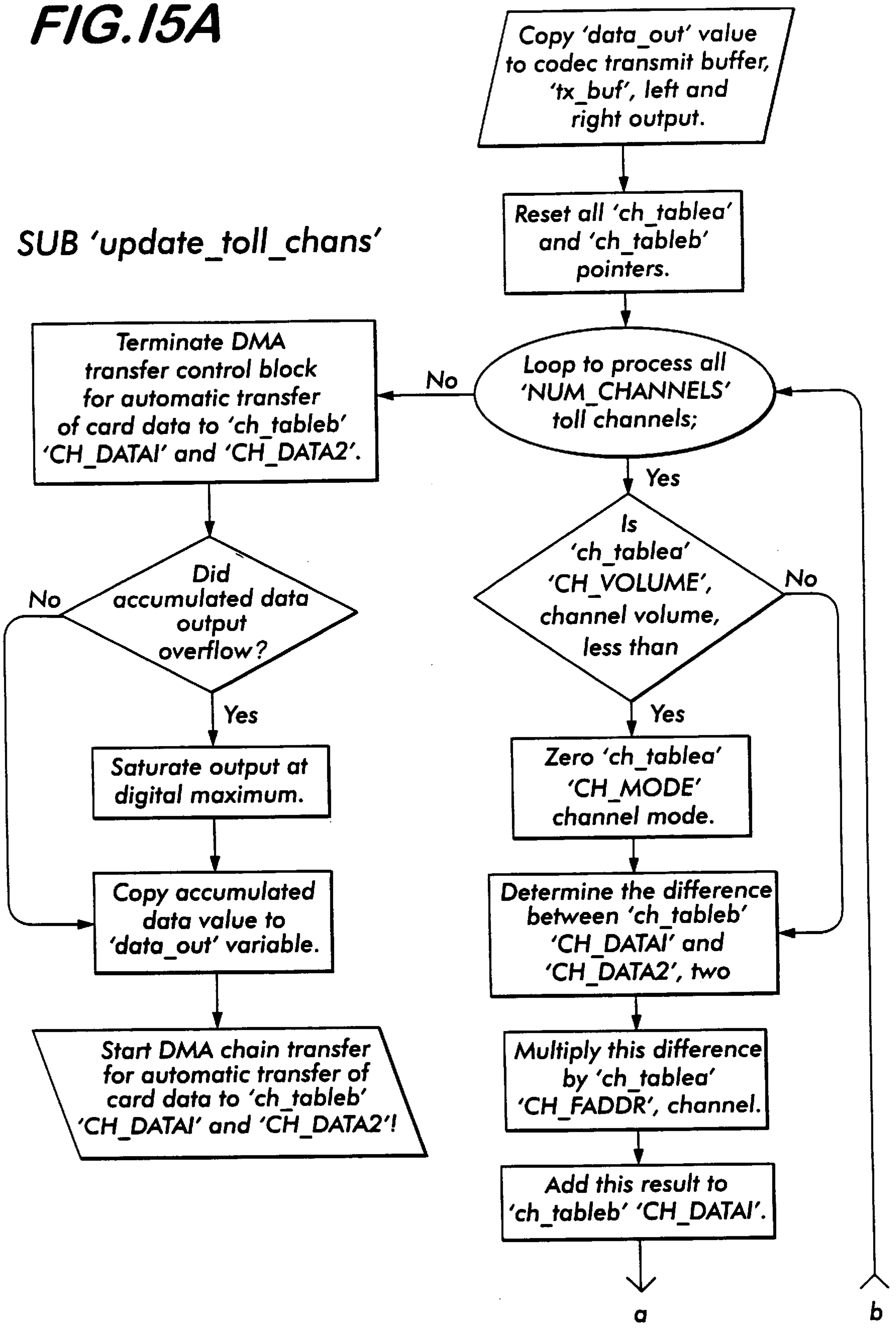
Figure 15B:
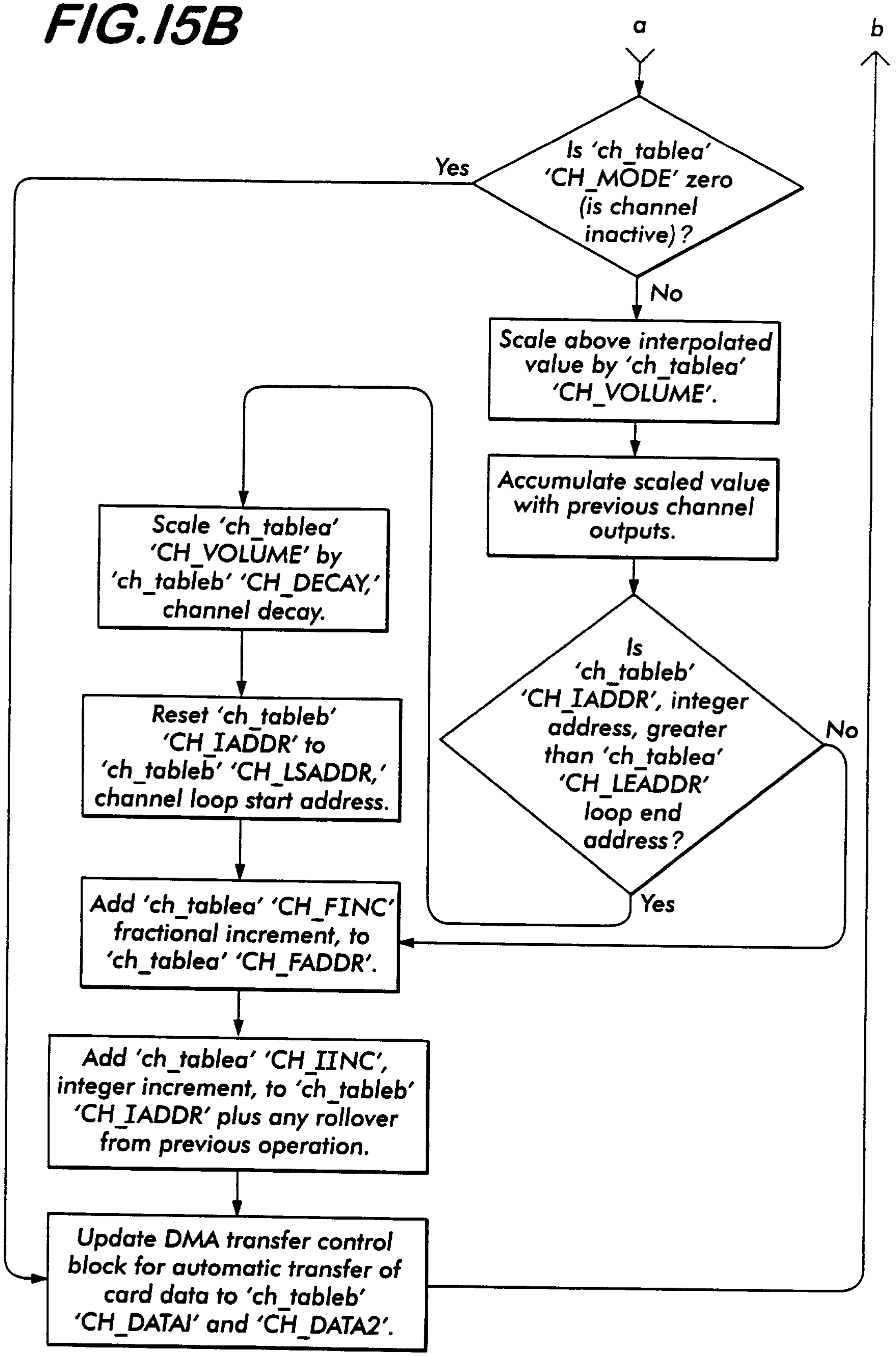
Figure 16A:
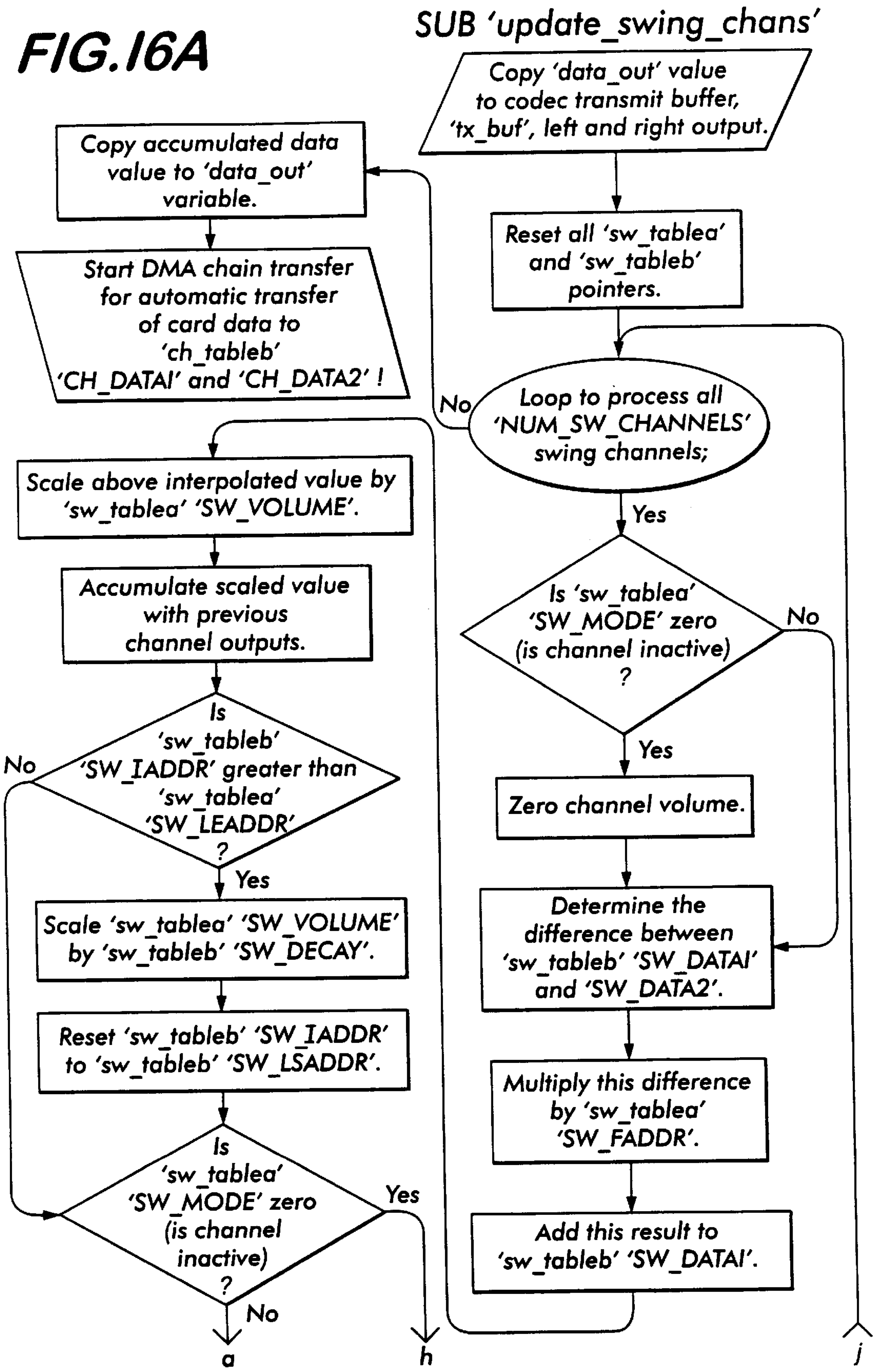
Figure 16B:
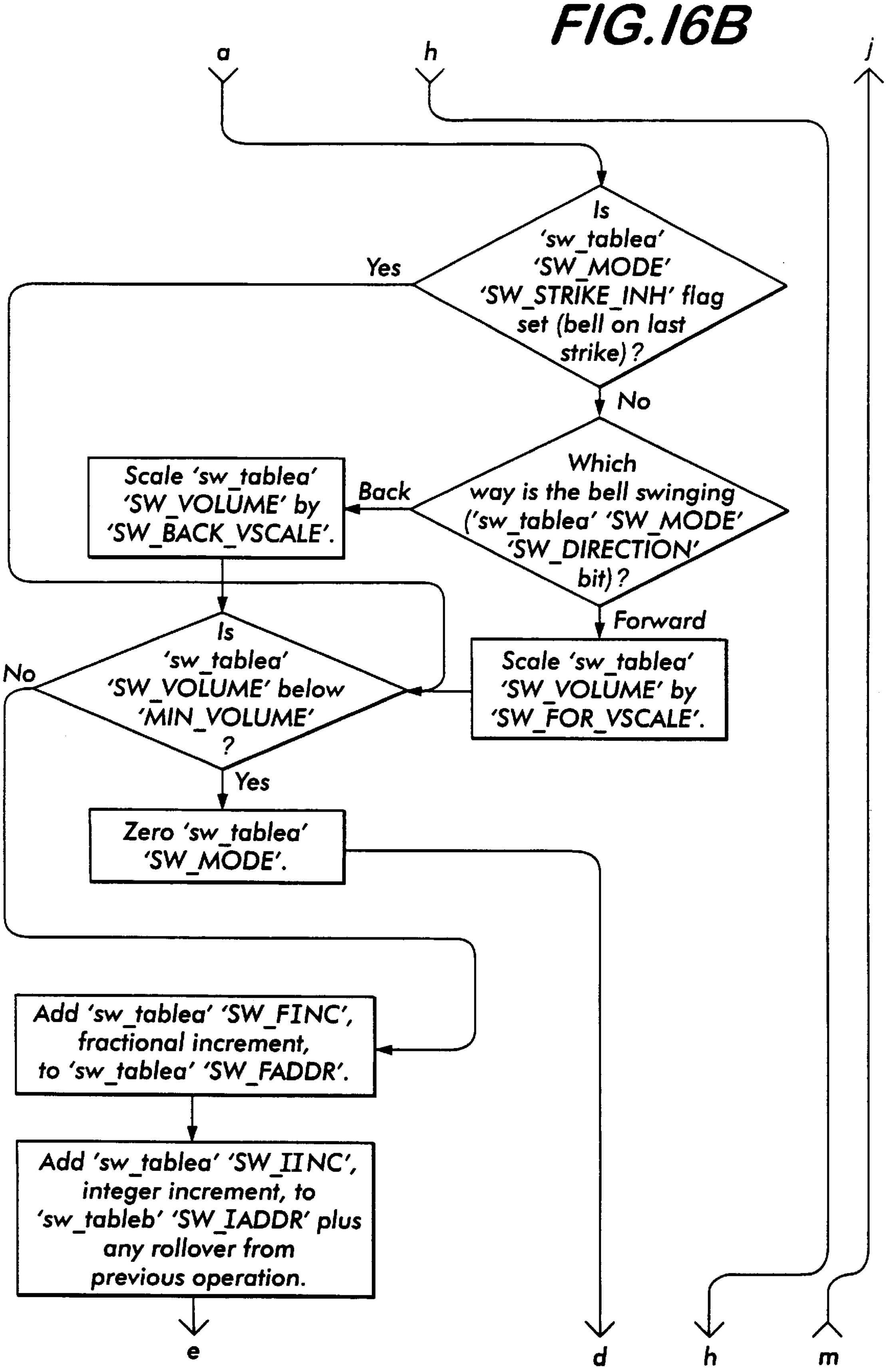
Figure 16C:
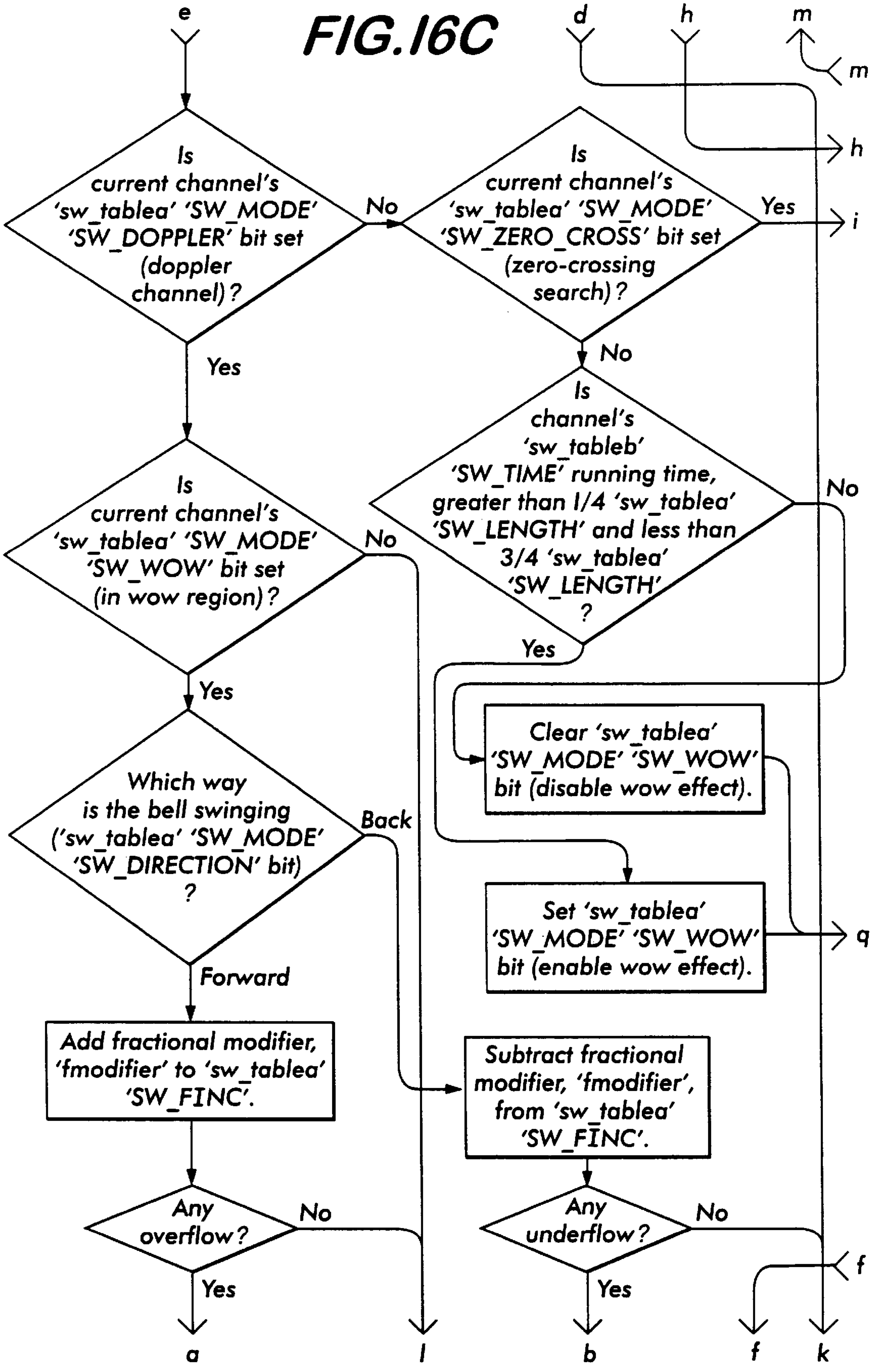
Figure 16D:
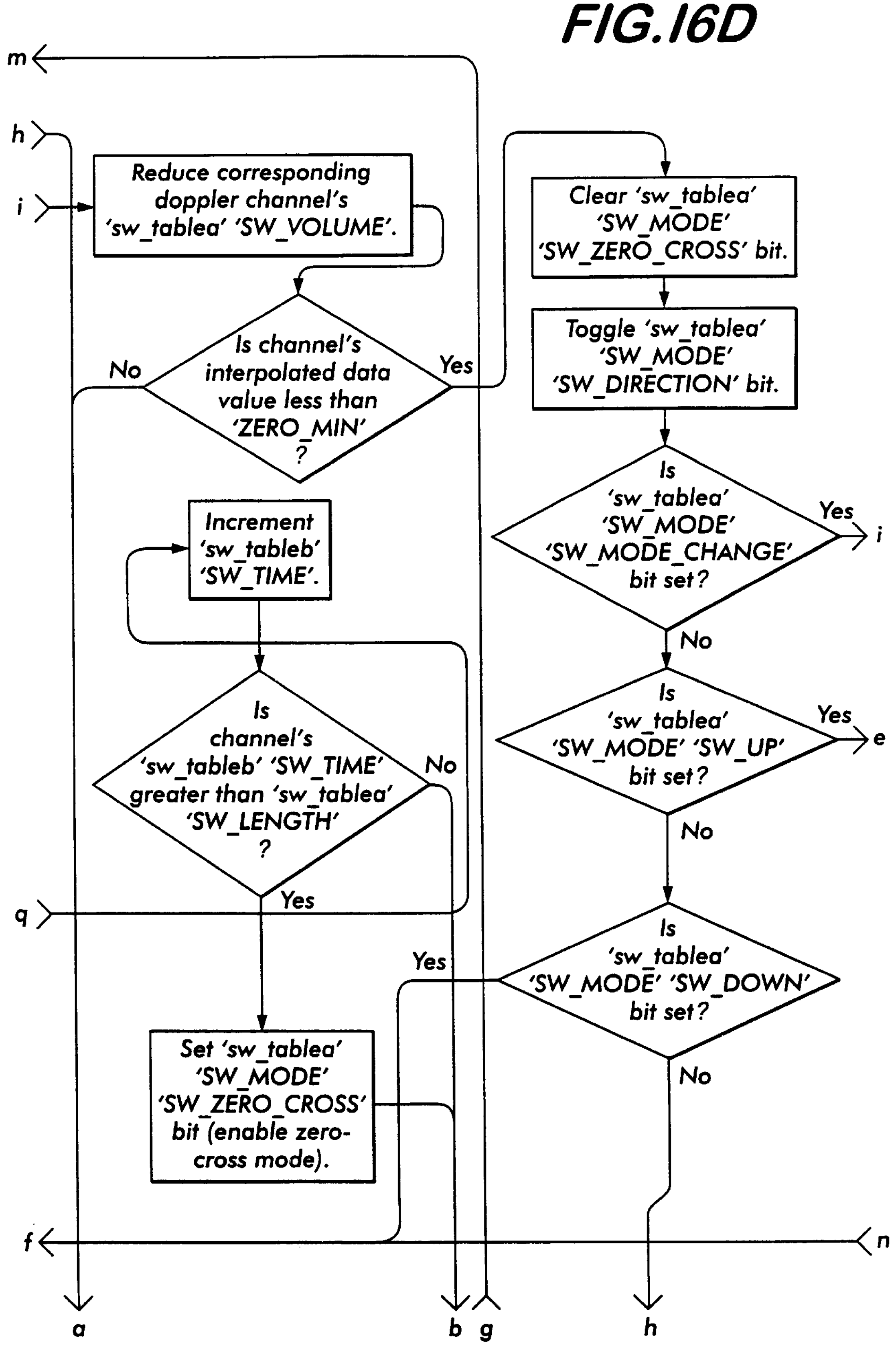
Figure 16E:
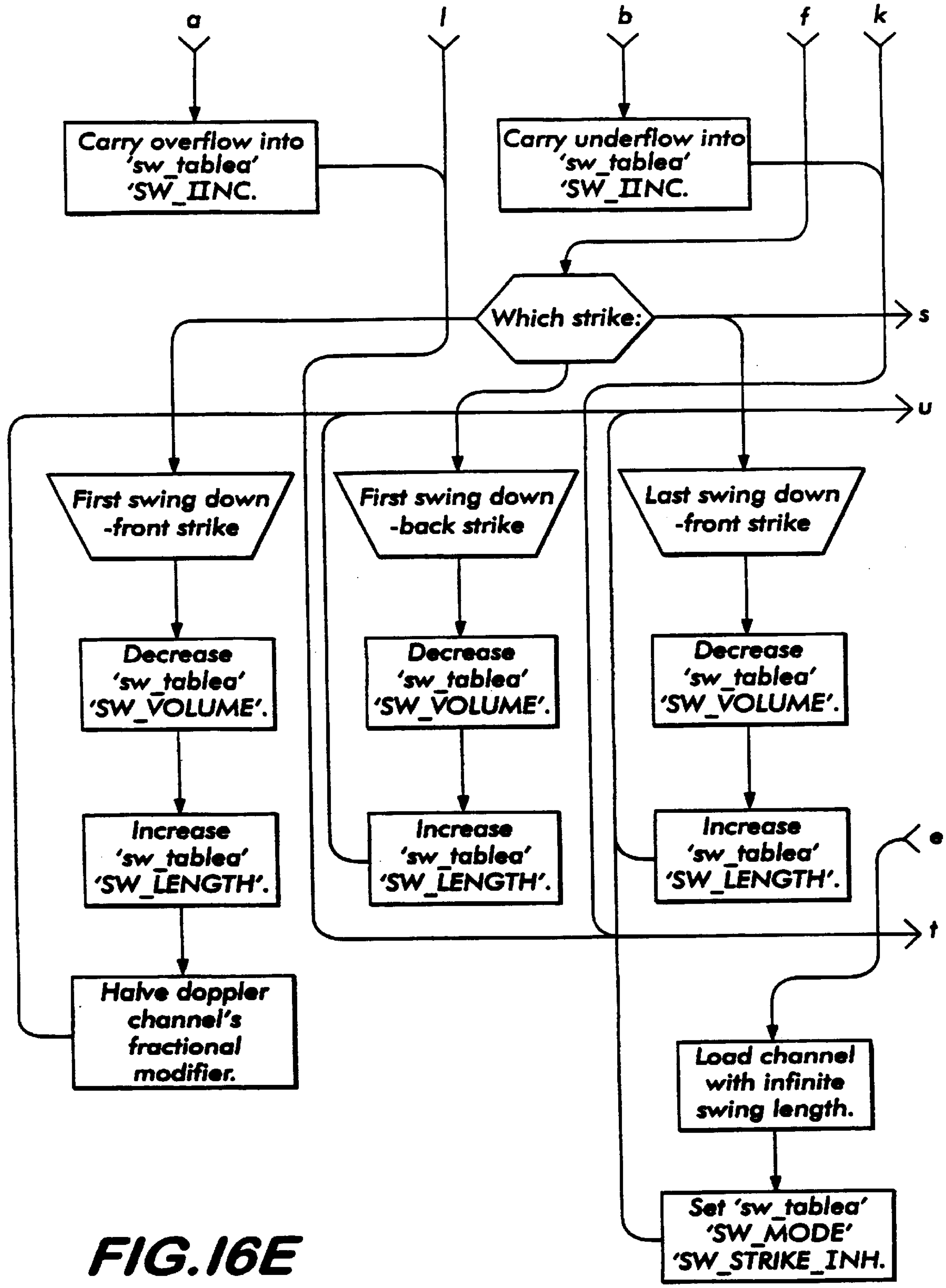
Figure 16F:
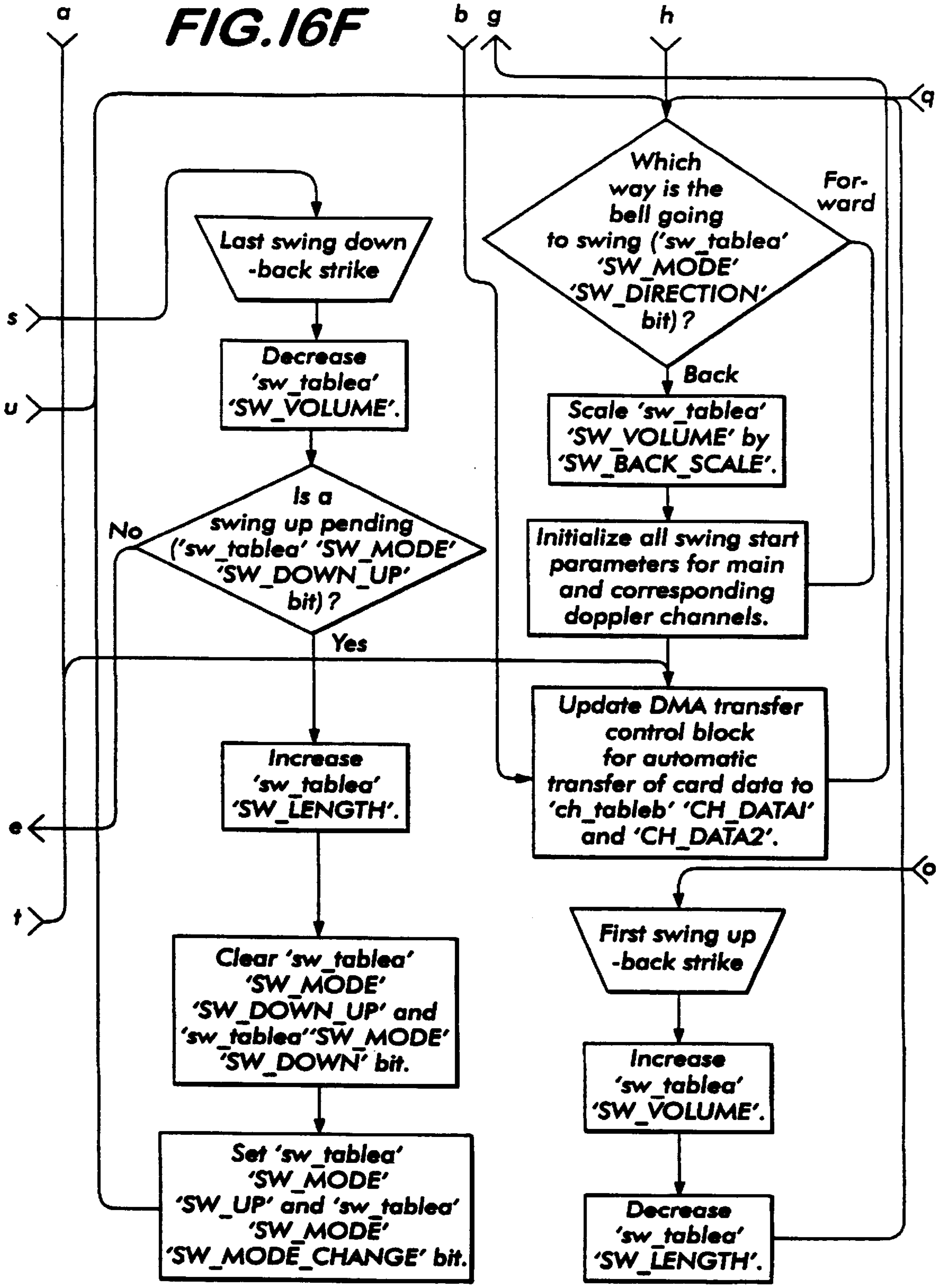
Figure 16G:
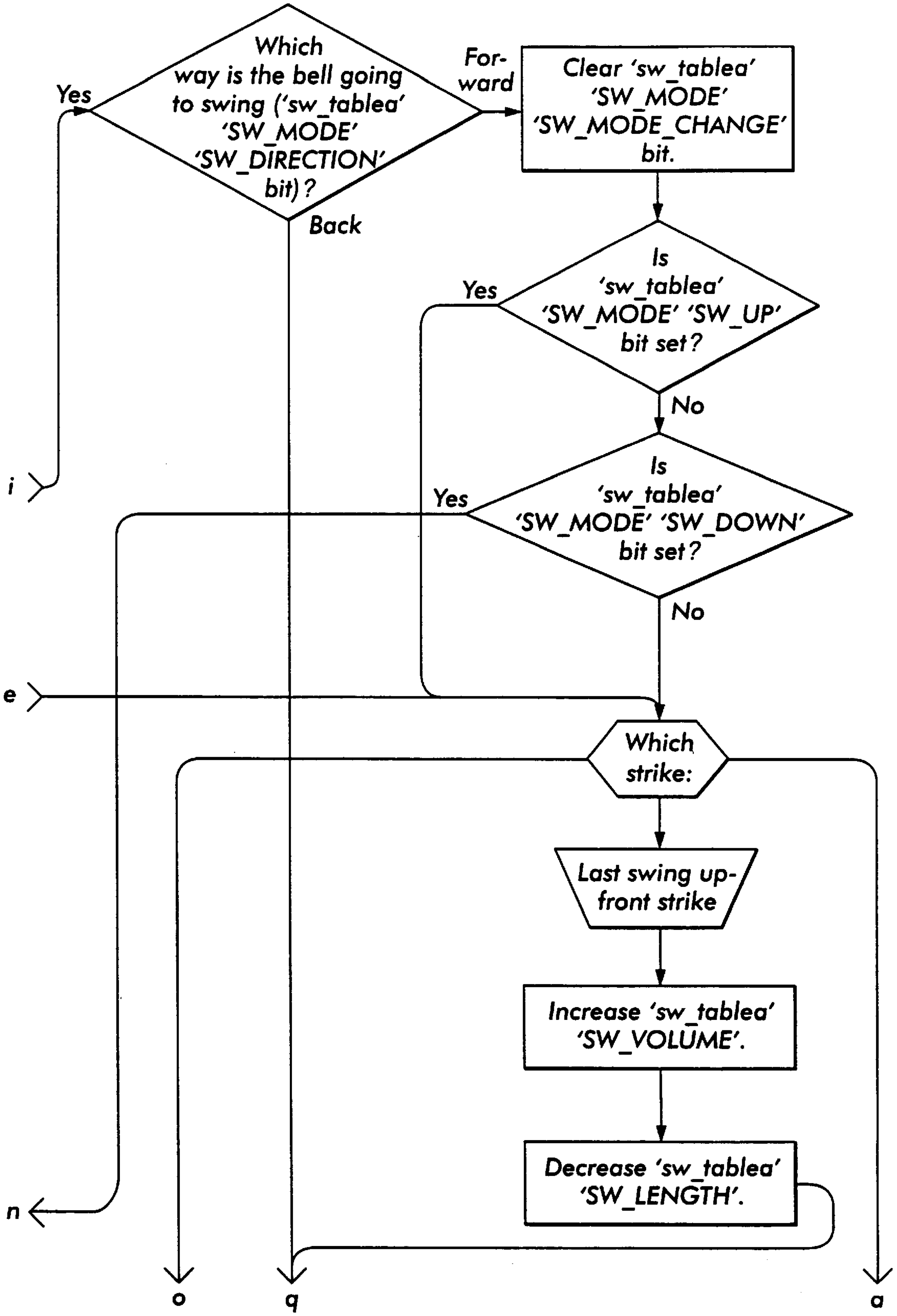
Figure 16H:
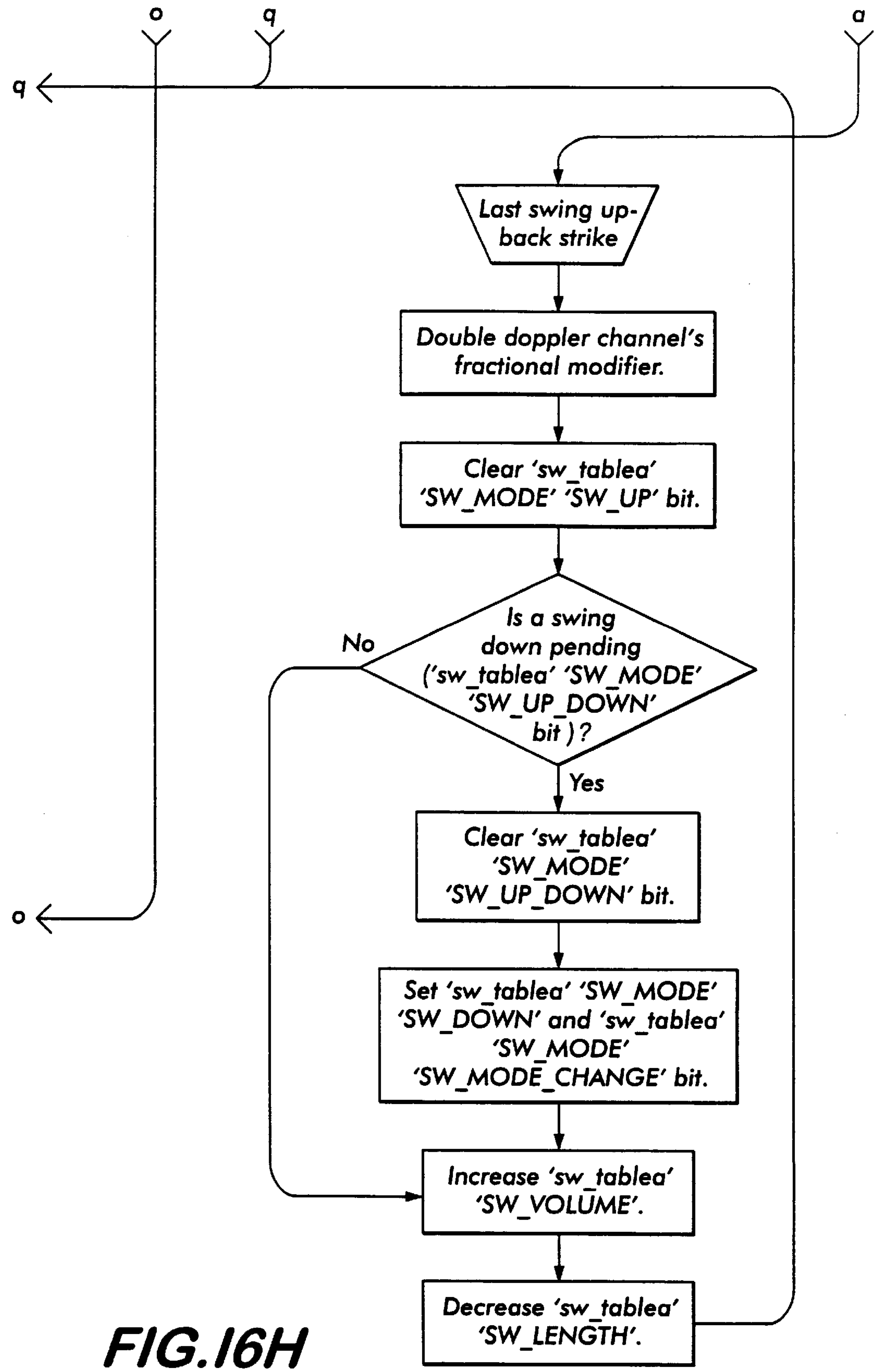

FIGS. 15A and 15B depict "update__toll__chans()".

FIGS. 16 and 16A–16H depict an "update__swing__chans" subroutine.

Figure 17A:
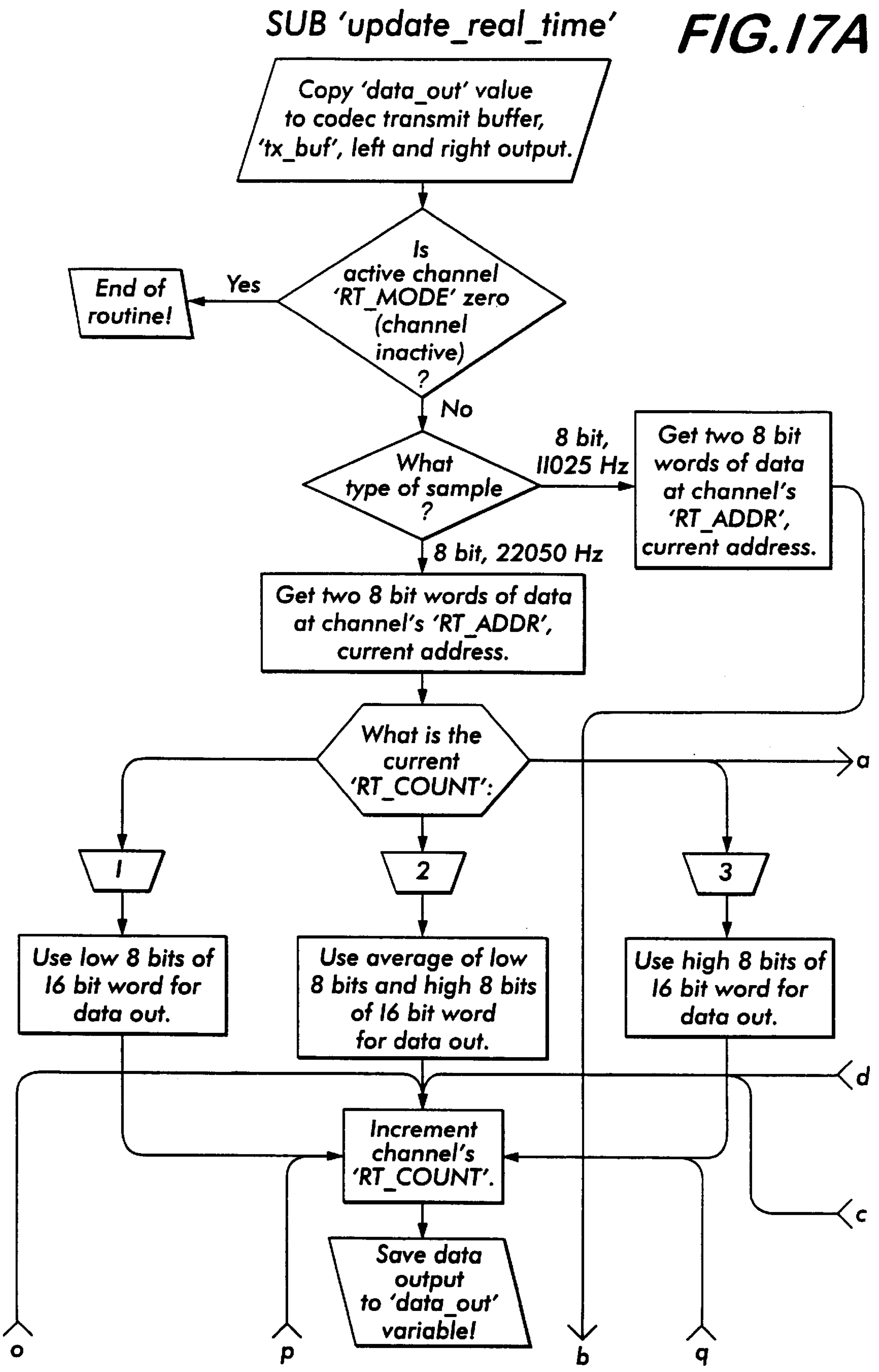
Figure 17B:
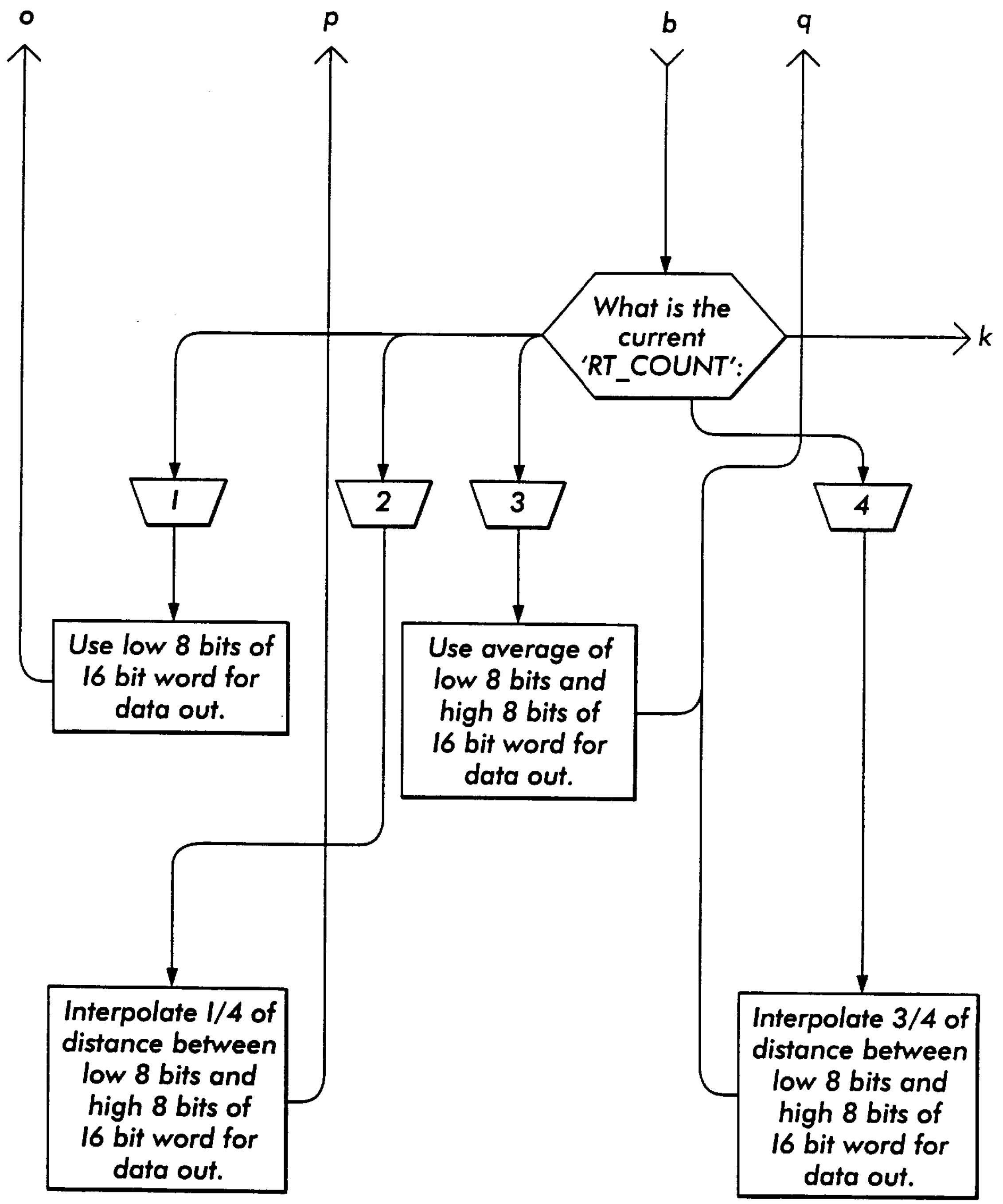
Figure 17C:
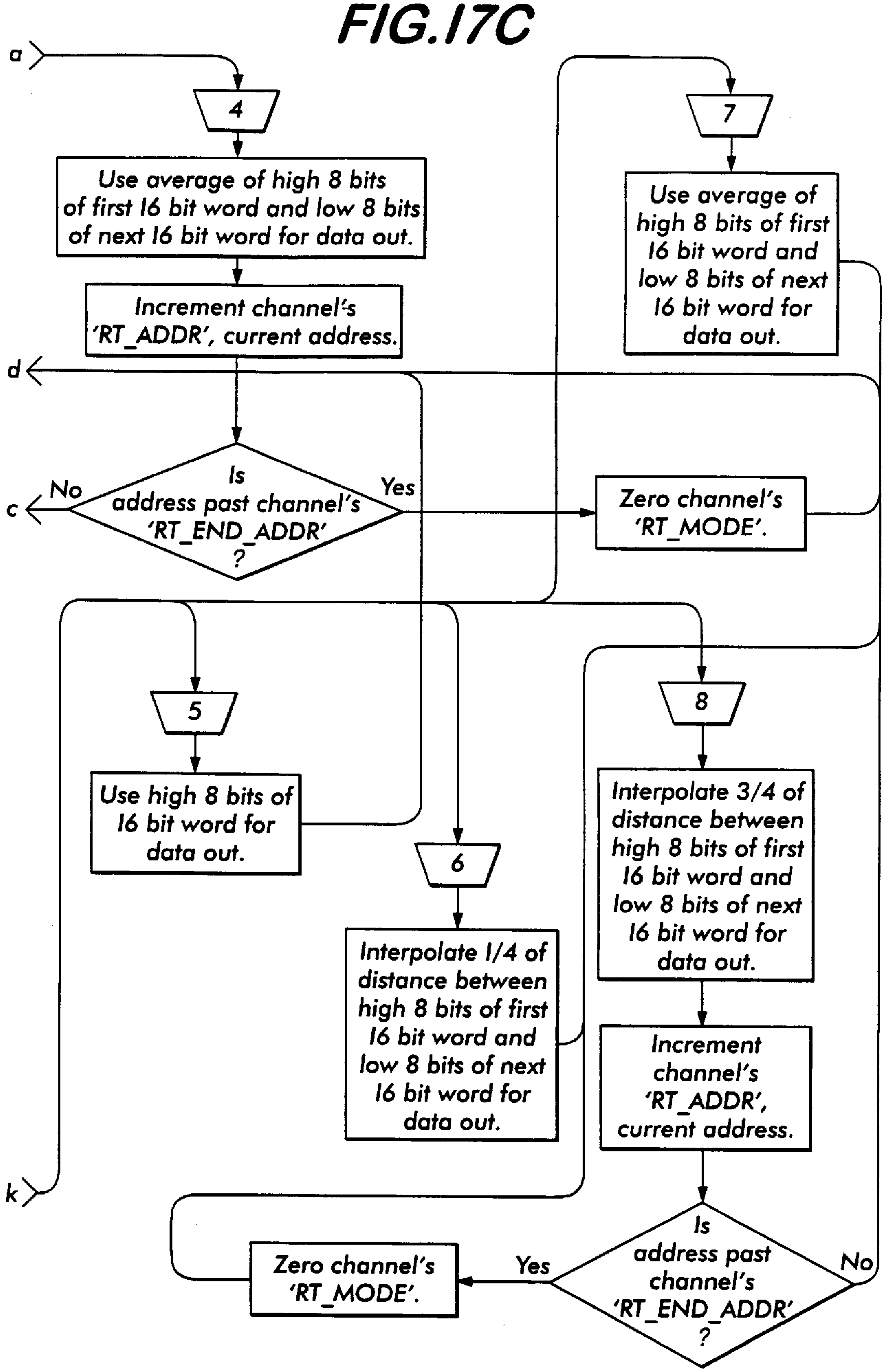

FIGS. 17A–17C depict an "update__real__time" subroutine.

DETAILED DESCRIPTION OF PREFERRED EMBODIMENTS

Overview

Figure 1:
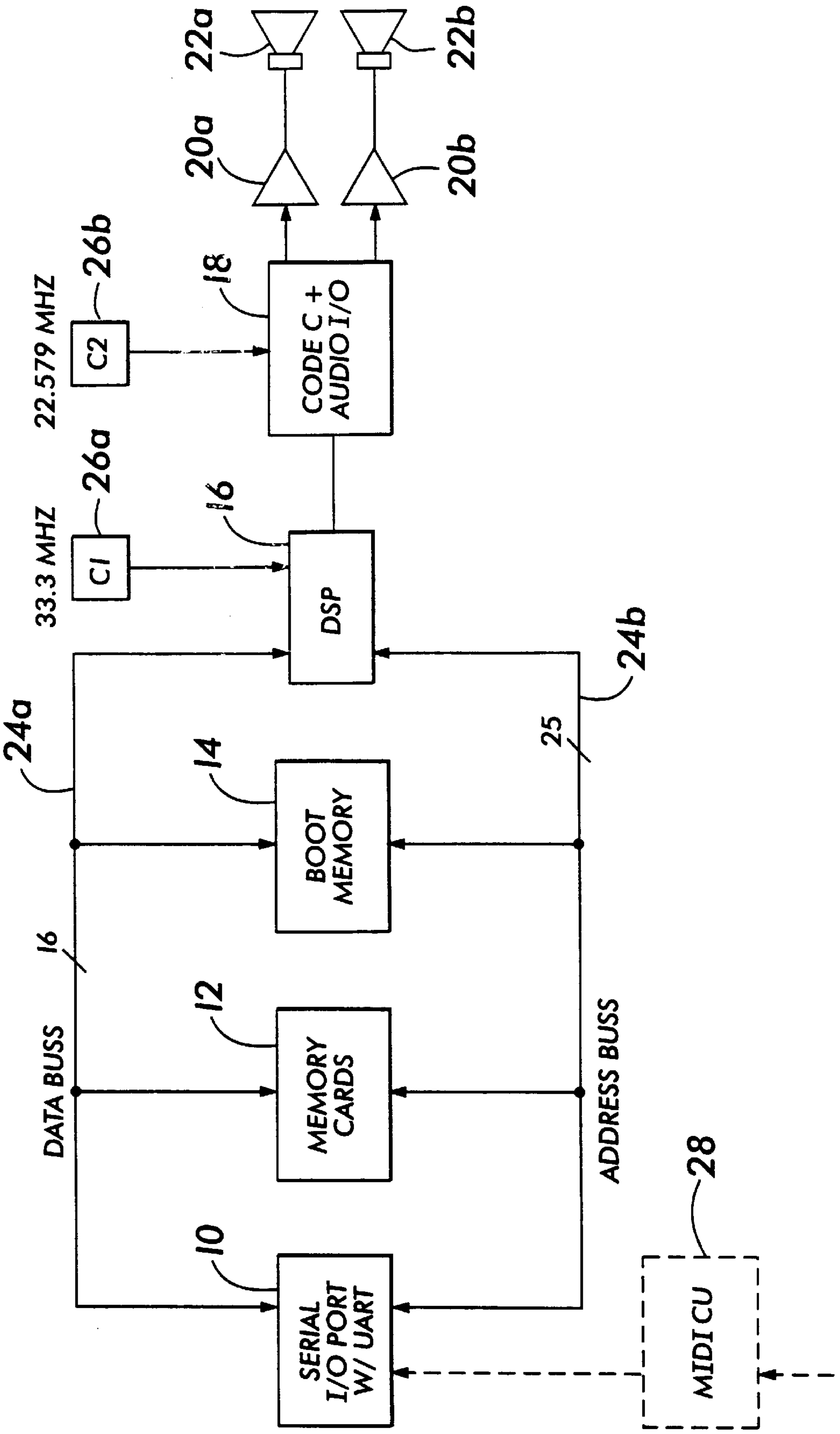
FIG. 1 is a block diagram of a preferred embodiment of an electronic carillon system in accordance with the present invention.

FIG. 1 is a block diagram of a presently preferred embodiment of a DSP-based electronic carillon system in accordance with the present invention. This embodiment of the invention comprises the following components: a serial input/output circuit, or I/O port, 10, which includes a universal asynchronous receiver transmitter (UART, not shown); one or more memory cards 12; a boot memory 14; a DSP 16 (e.g., a model ADSP21062 digital signal processor, available from Analog Devices, Inc.); a codec (coder-decoder) (e.g., model AD1847-PLCC) and audio I/O circuitry 18 (in practice, the codec may be separate from the audio I/O circuitry); an inside amplifier 20*a* and outside amplifier 20*b*, and an inside loudspeaker 22*a* and outside loudspeaker 22*b* (see the above-cited U.S. Pat. No. 5,471,006 for further information about the use of "inside" and "outside" speakers); a data buss 24*a* and an address buss 24*b*, each of which is connected to the serial I/O port 10, memory cards 12, boot memory 14 and DSP 16; a first clock 26 (33.3 MHZ) and a second clock 26*b* (22.579 MHZ) coupled to the DSP and codec, respectively; and an optional MIDI input circuit 28, which may be connected to the UART (not shown) of the serial I/O port 10.

A principal difference between the presently preferred, DSP-based system and the tone generator-based system described in detail in U.S. Pat. No. 5,471,006 is the use of a DSP and its associated algorithms instead of the tone generator (block 12 of FIG. 1A of the '006 patent) of the earlier embodiment. It has been discovered that the DSP can be exploited to create unexpectedly improved sound quality and versatility. Therefore, the DSP algorithms will be the primary focus of this disclosure.

The main job of the DSP is to generate digital audio output signals on the basis of memorized (stored) samples of sounds emitted by bells, rods, or the like, or real-time samples, and commands fed to the DSP via the address and data busses 24*a*, 24*b*. The DSP utilizes interpolation to construct discrete sound (e.g., bell strike) samples on the basis of a limited number of samples.

In the preferred embodiment, the DSP uses interpolation to generate up to five octaves of bell notes based on the limited number of samples.

In addition, the sample data may be scaled such that the "volume" of the output data, i.e., the audio output of the speakers 22*a*, 22*b*, is loudest for the longest and shortest rods, or biggest and smallest bells (or the ends of a keyboard coupled to the serial input port). Further, the audio output of the outside loudspeaker can be made louder than that of the inside loudspeaker, although in the preferred embodiment, the inside and tower volumes are totally adjustable (the perceived loudness of either is based on the installed amplifier and speaker complement, hence no difference exists between the two circuits as viewed from the DSP itself). The data can also be scaled for velocity, such that, if a keyboard is employed to provide input commands, the output data will be adjusted in accordance with the velocity of the struck key. Such data scaling may be implemented by storing appropriate information in a header file associated with the sample data.

The overall DSP operation can be summarized as follows: (1) receive input data from memory or serial I/O port; (2) calculate and accumulate audio output data based on up to 24 simultaneous active (ringing) bell notes; and (3) pass the output data and any volume change or mute commands to the codec. Note that velocity is relevant only at the start or assignment of a particular tolling note—it is basically a starting volume.

The codec 18 performs several functions: it operates as a stereo D/A converter and A/D converter; it allows the user to attenuate individually the left and right (tower and inside) outputs; it provides internal circuitry to digitally control gain attenuation on the analog audio inputs; and it provides internal circuitry to digitally mix these audio inputs with the digital output.

A feature of the DSP-based system is the "Interpolated Fractional Address" algorithm. A scenario to illustrate this algorithm is as follows: a 1 kHz sine wave is digitally recorded at a 44.1 kHz sampling rate. The sampling period is 1/44.1 k, or 22.6 $\mu$sec. To play back this sample at its original frequency of 1 kHz, one could output consecutive samples once every 22.6 $\mu$sec. To play back the same sample at twice its audio frequency, one could output consecutive samples every 11.3 $\mu$sec or output only alternate samples every 22.6 $\mu$sec. To play back the sample at a frequency between 1 and 2 kHz, one could output consecutive samples at a periodic interval between 11.3 and 22.6 $\mu$sec, or interpolate between corresponding points of the 1 and 2 kHz waveforms and output the result every 22.6 $\mu$sec (i.e., at the original 44.1 kHz sample rate).

To explain how this is done, we will consider one active bell channel. Every 22.6 $\mu$s, this channel is updated to output data at the 44.1 kHz sampling rate. Each channel is comprised of several parameters, which are initialized at note start time, that pertain directly to this explanation.

These parameters include:

Integer address: current location in sample data;

Fractional address: current fractional value—used to interpolate between two read data values;

Integer increment: value added to integer address each update period;

Fractional increment: value added to fractional address each update period;

Volume: scale factor to scale interpolated output data to be mixed with remaining channels;

Data 1 and Data 2: two consecutive digital audio data points at current integer address;

Decay: scaling factor which scales volume every time a loop end is reached;

Loop end address: address at which integer address is reset to loop start address;

Loop start address: address at which loop starts.

Assume that the note to play is a G2, and that the raw sample to be used to generate this note is a C2. Based on the table below, the channel's new integer increment will be 1 and the new fractional increment will be the 12th root of 2 to the power of 7 (i.e., $2^{7/12}$). At the start, the channel's integer address is initialized to the C2 sample start address and the fractional address is initialized to 0. During each sample update, the following occurs: the current fractional address is multiplied by the difference between the two data values, Data 1 and Data 2; this result is then added to the Data 1 value, hence interpolating between Data 1 and Data 2 based on the current fractional address; the interpolated output is scaled by the channel's volume and accumulated with the other channels' data; the channel's integer and fractional addresses are updated with their respective integer and fractional increments; the channel's current address is compared to the loop end address—if past, the current integer address is reset to the loop start address and the volume is scaled down by the decay value; if the channel's volume falls below a minimum, the channel is disabled; means for getting the next update period Data 1 and Data 2 values are employed. It should be noted that this is the scheme used for sounding tolling bells, and these operations and more are performed for swinging bells.

| Note | Ratio of frequencies |
|---|---|
| C | 1 |
| $C_{\#}$ | (12th root of 2) |
| D | (12th root of 2) to power of 2 |
| D# | (12th root of 2) to power of 3 |
| E | (12th root of 2) to power of 4 |
| F | (12th root of 2) to power of 5 |
| F# | (12th root of 2) to power of 6 |
| G | (12th root of 2) to power of 7 |
| G# | (12th root of 2) to power of 8 |
| A | (12th root of 2) to power of 9 |
| A# | (12th root of 2) to power of 10 |
| B | (12th root of 2) to power of 11 |
| $C^1$ | (12th root of 2) to power of 12 |

From this we separate the ratios into integer and fractional values. The following lookup table is used at channel assignment time. The lookup values are based upon the interval or musical distance between the note to be played and the raw sample this note uses. It provides the integer and fractional values to be used by the channel to update the integer and fractional address values each update period:

| # Semi-tones From Raw Sample | Integer Increment | Fractional Increment |
|---|---|---|
| 0 | 1 | 0 |
| 1 | 1 | (.05946) to power of 1 |
| 2 | 1 | (.05946) to power of 2 |
| 3 | 1 | (.05946) to power of 3 |
| 4 | 1 | (.05946) to power of 4 |
| 5 | 1 | (.05946) to power of 5 |
| 6 | 1 | (.05946) to power of 6 |
| 7 | 1 | (.05946) to power of 7 |
| 8 | 1 | (.05946) to power of 8 |
| 9 | 1 | (.05946) to power of 9 |
| 10 | 1 | (.05946) to power of 10 |
| 11 | 1 | (.05946) to power of 11 |
| 12 | 2 | 0 |

The following program descriptions and accompanying flowcharts will enable a person of ordinary skill in the art of programming electronic carillon systems to make and use the present invention.

Internal Memory Structure and Access

The memory of the DSP 16 is divided into program and data memory. Program memory is divided into three spaces: a 4 k×48-bit interrupt and initialization segment, a 12 k×48-bit code segment, and an 8k×32-bit program memory data segment. This last data segment is used in combination with the data memory for parallel data accesses in updating channel routines. The 32 k×32-bit data memory space is divided into 24 k data memory, 4 k of heap, and 4 k of runtime stack. The 24 k chunk holds C and assembly language variables and headers of existing bell voice PC cards.

External Memory Structure and Access

The DSP 16 accesses four external memory areas: PCMCIA card slots 1 and 2 (i.e., memory cards 12 in FIG. 1), the UART of I/O circuit 10, and the 128 k×8-bit boot flash memory 14. The first three are chip selected via memory bank select pins and the last by the DSP's boot memory select pin. Memory banks 1 and 2 access the two 16-bit cartridge slots and are 32 Mbytes in length. They are set up to read memory with 4 internally generated wait states. Bank 0 is used to access the UART, with an address range of 8×8-bit words. Wait states are set at 6. The boot memory 14 is used only for booting at power-up or reset. In the present embodiment, all bell data saved on the memory cards 12 is 16-bit signed 2's complement data, whereas real-time samples are 8-bit samples.

Other DSP I/O

The DSP 16 has three other modes of external communication: the codec 18, flag lines which are part of the data buss 24*a,* and a JTAG port (not shown). The JTAG port is used for board testing and emulation purposes. It is a serial test access port corresponding to the IEEE 1149.1 specification. This treats all I/O pins as one large shift register giving access via the serial scan path to read or write to any pin of the DSP. The codec to DSP interface comprises a serial port of the DSP 16. The DSP acts as the slave in this dual line operation with separate Tx (transmit) and Rx (receive) lines. The codec 18 generates clock and frame sync for the serial port timing. Two flag lines are used to sense the existence of the memory cards. Another flag line is used to signal running status to a state code input of a watchdog timer (not shown).

Initialization

At power-up, the DSP 16 first boots from boot memory 14, and configures and initializes itself, the UART (in I/O circuit 10), and the coded 18. It also evaluates its playing capabilities based on the available voices stored in the memory cards 12.

In an idle operating mode (audio output muted), the system sits in a short C loop waiting for the UART flag bit. This main loop is interrupted by a serial port transmit completion flag. The subroutine __spt0__asserted (FIG. 4) updates any active mode channels and signals UART interrupts to the main loop via the UART flag bit. The UART servicing routine is called, and it empties the UART hold register (hr) contents to a circular buffer, __uart__buf. If an FF is received, the MSG__DONE flag is set. This flag signals the main C loop to parse the UART message via the subroutine parse__Rx (FIG. 5), which acts on the received message by either processing a control code or engaging a particular mode: TOLL, SWING, or REAL__TIME. Active channels are initialized via the subroutines assign__toll__note (FIG. 7), assign swing__note (FIG. 8), and assign__rt__voice (FIG. 9).

The parse__Rx routine returns to the main loop when all messages are processed. At this time, the C code jumps to the assembly transmit routine, __uart__transmit (FIG. 14), if a flag bit (TXTIME) is set by parse__Rx. If there is no error, the subroutine misc__funcs (FIG. 11) is called, and it arbitrates card status changes, sends new codec commands, if any, and disables active mode when all appropriate channels modes are 0. The subroutine __error__handler (FIG. 6) is called if the code fails or reset related commands arrive. The flag output for the watchdog timer is toggled every loop iteration. The main loop and all other code execution terminate if an error remains unresolved at loop bottom.

The initialization routines are "init__21k", "init__uart", and "setup__audio". These subroutines are not described in detail in this specification.

main() subroutine

FIGS. 2A–2B depict the main() subroutine. The functions performed by this subroutine are described below.

Initialization: Steps 200–209 are directed to the performance of various initialization procedures.

Step 200: initializes tx__buf[3] to zero.

Step 201: initializes uart__ptr to start of uart__buf and clears uart__buf.

Steps 202–206: clear channel__tablea, ch__tableb, sw__tablea, and sw__tableb.

Step 207: enable spt0 (serial port 0 to codec) interrupt.

Step 208: set MUTE and VOL__CHANGE flag bits.

Step 209: initialize error to zero.

Main loop operation, executed while no errors exist (see While step 210):

Step 212: toggle state code FLAG1 output to watchdog timer.

Steps 213–214: if UART flag bit, call irq2__asserted.

Steps 215–216: if MSG__DONE flag bit, call parse__Rx.

Steps 217–218: if TXTIME flag-bit set, call uart__transmit.

Steps 219–220: if no error call misc__funcs.

Steps 221–222: if error, call error__handler.

Step 211: if error not resolved terminate loop and execution, otherwise loop.

__irq2__asserted() interrupt routine

The irq2__asserted() subroutine is summarized below with reference to FIG. 3. This routine is flagged in the spt0__asserted subroutine, and can be interrupted if necessary. It reads the UART status register and checks whether the read value is data or an address. If it is an address, the UART receiver is enabled or disabled, depending on the address received as indicated in the flowchart.

If the read value is not an address, it is added to the circular buffer, __uart__buf, which is indexed by the i0, m0, l0, b0 primary index register set. If FF is read, the UART receiver is placed in "sleep" mode (disabled), and the MSG__DONE flag is set. If data is read, the __ubuf__tail pointer is advanced and the UART flag is cleared.

spt0__asserted() interrupt routine

FIG. 4 depicts the spt0__asserted() subroutine, which is an interrupt routine used to transmit information through the serial port. In normal operation, this is the only real-time enabled interrupt in the system besides the external reset. When playing bells, the DSP 16 spends most of its time here. This routine uses the DSP's alternate sets of working and index registers. It uses the "flags" variable to determine which mode is active, by checking which mode bit, TOLL, SWING, or REAL__TIME, is set. It then executes the appropriate channel updating code. When complete, the interrupt routine polls the irptl register for the UART to determine whether the UART interrupt is asserted. If an interrupt is present, it sets the UART flag-bit.

parse__Rx() subroutine

Figure 5:
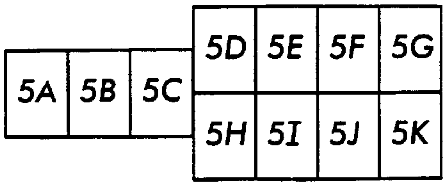

FIGS. 5A–5K depict the parse__Rx() subroutine. FIG. 5 illustrates how FIGS. 5A–5P may be arranged to form a complete flowchart.

Figure 5A:
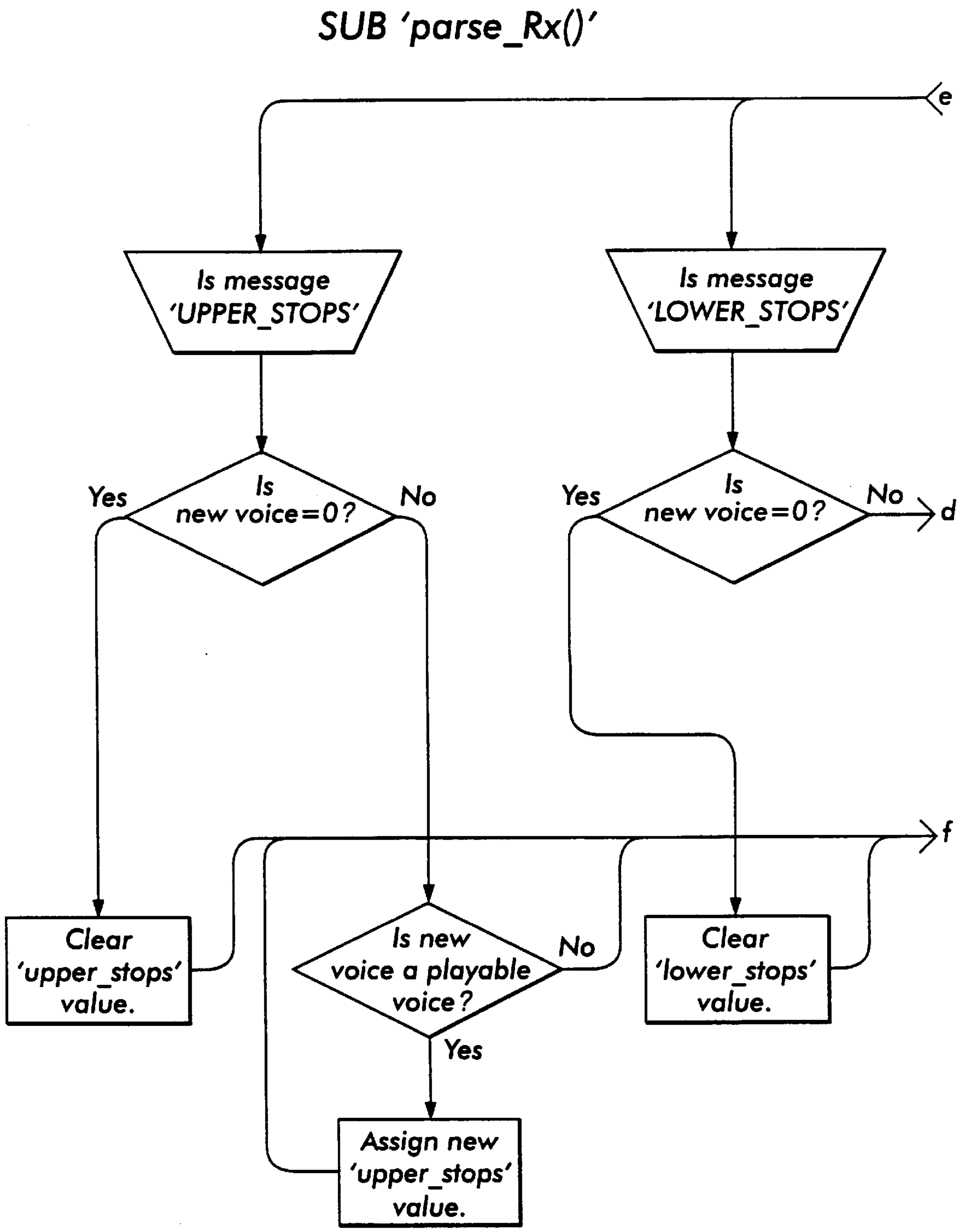
Figure 5B:
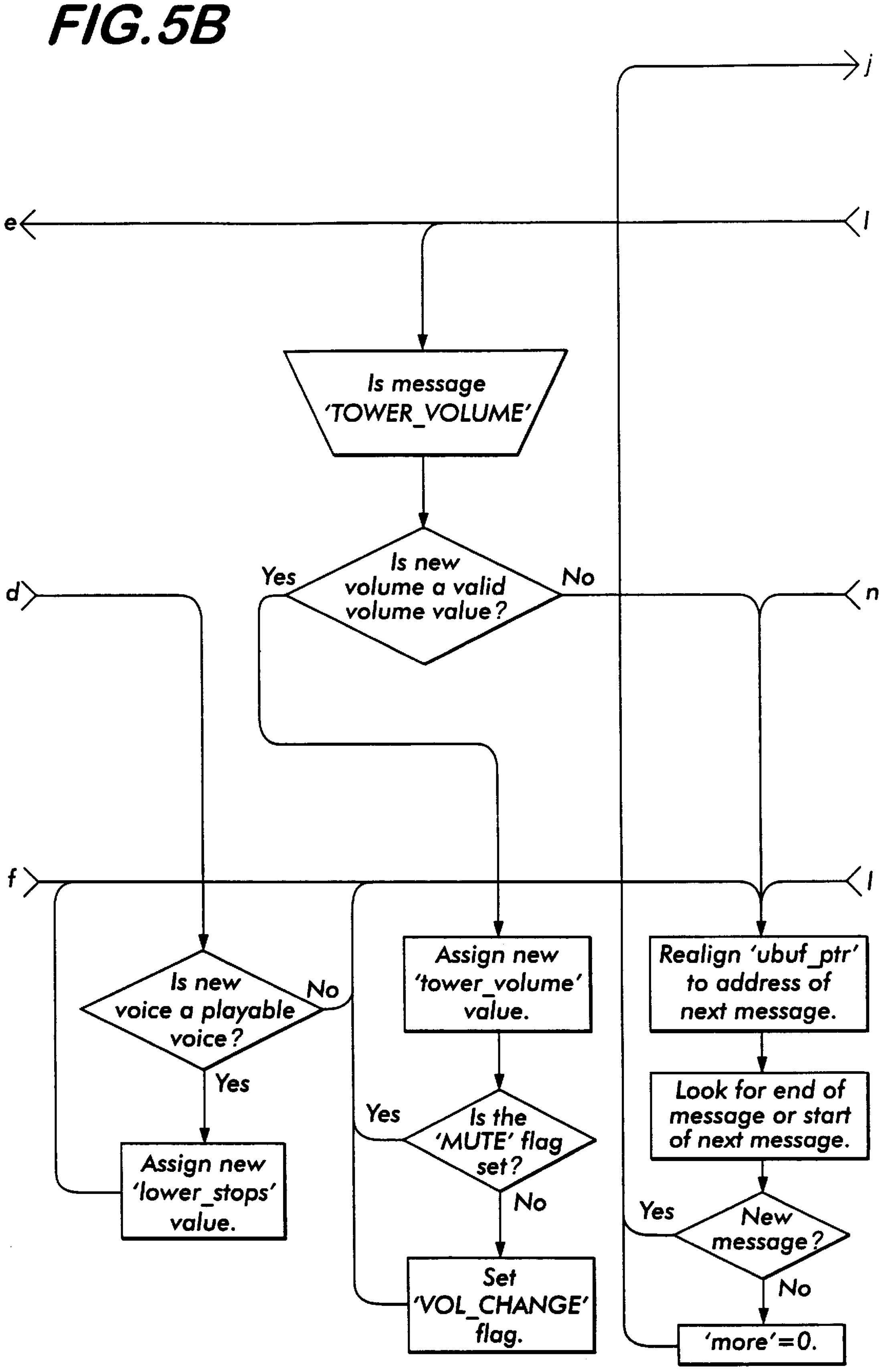
Figure 5C:
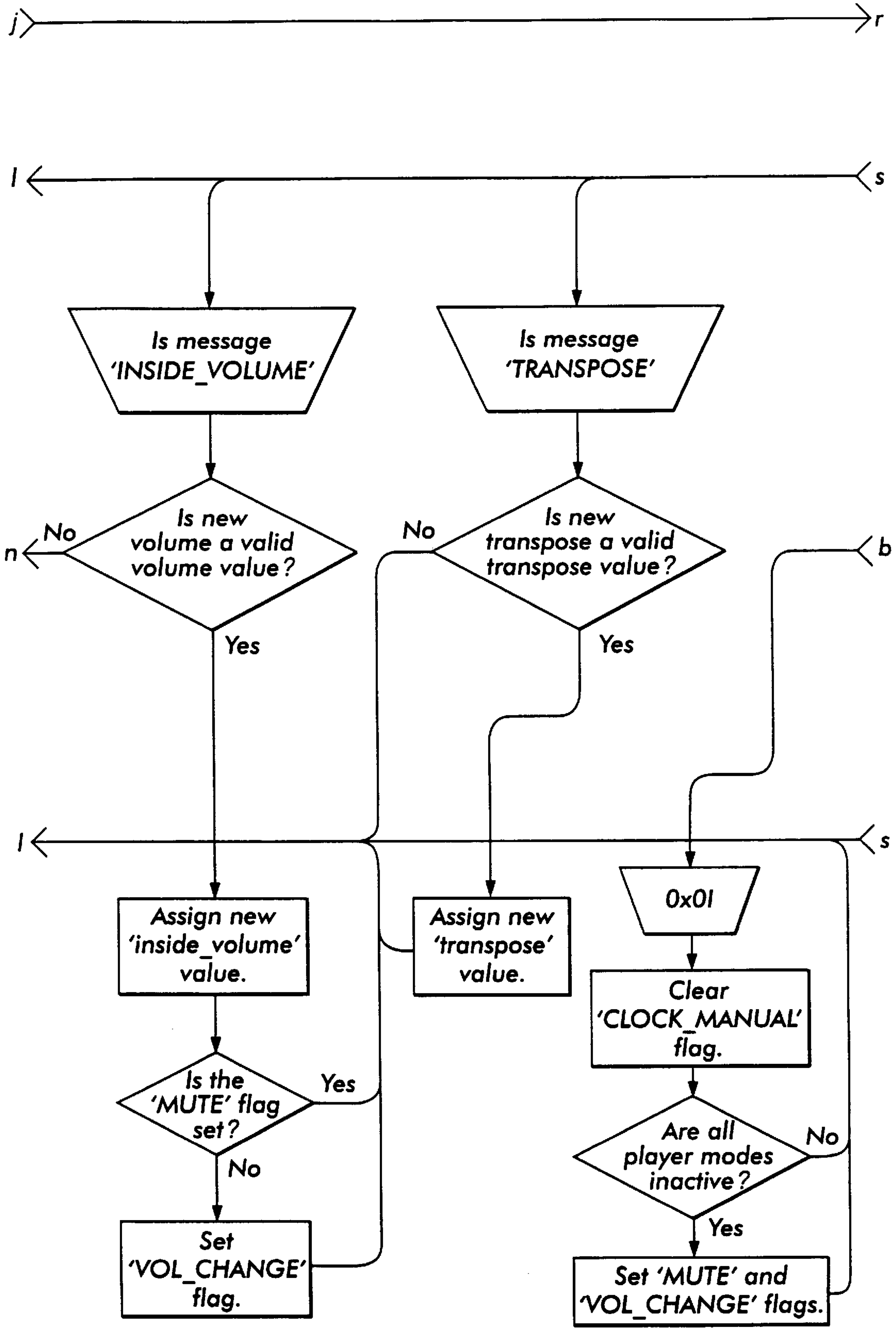
Figure 5D:
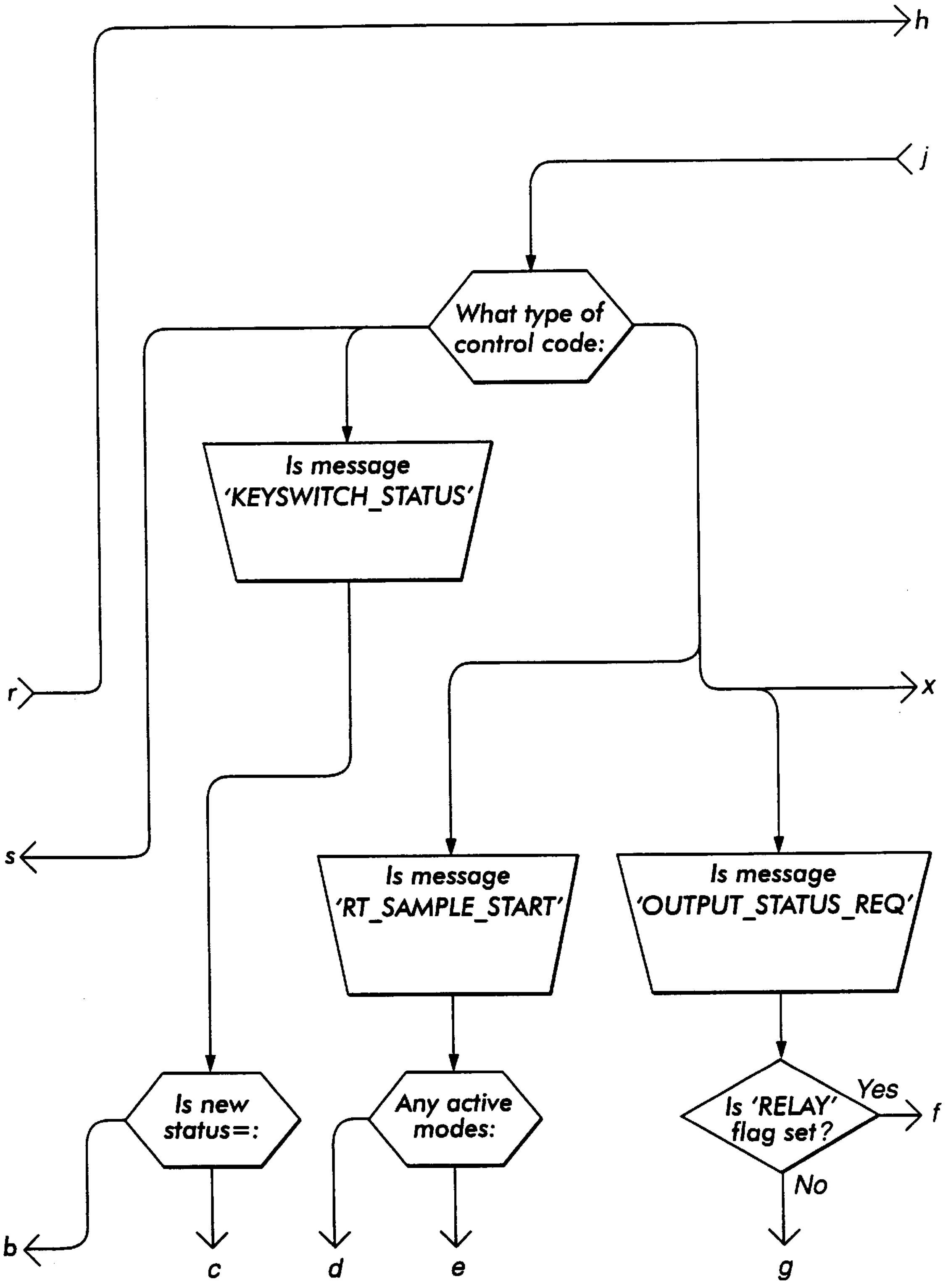
Figure 5E:
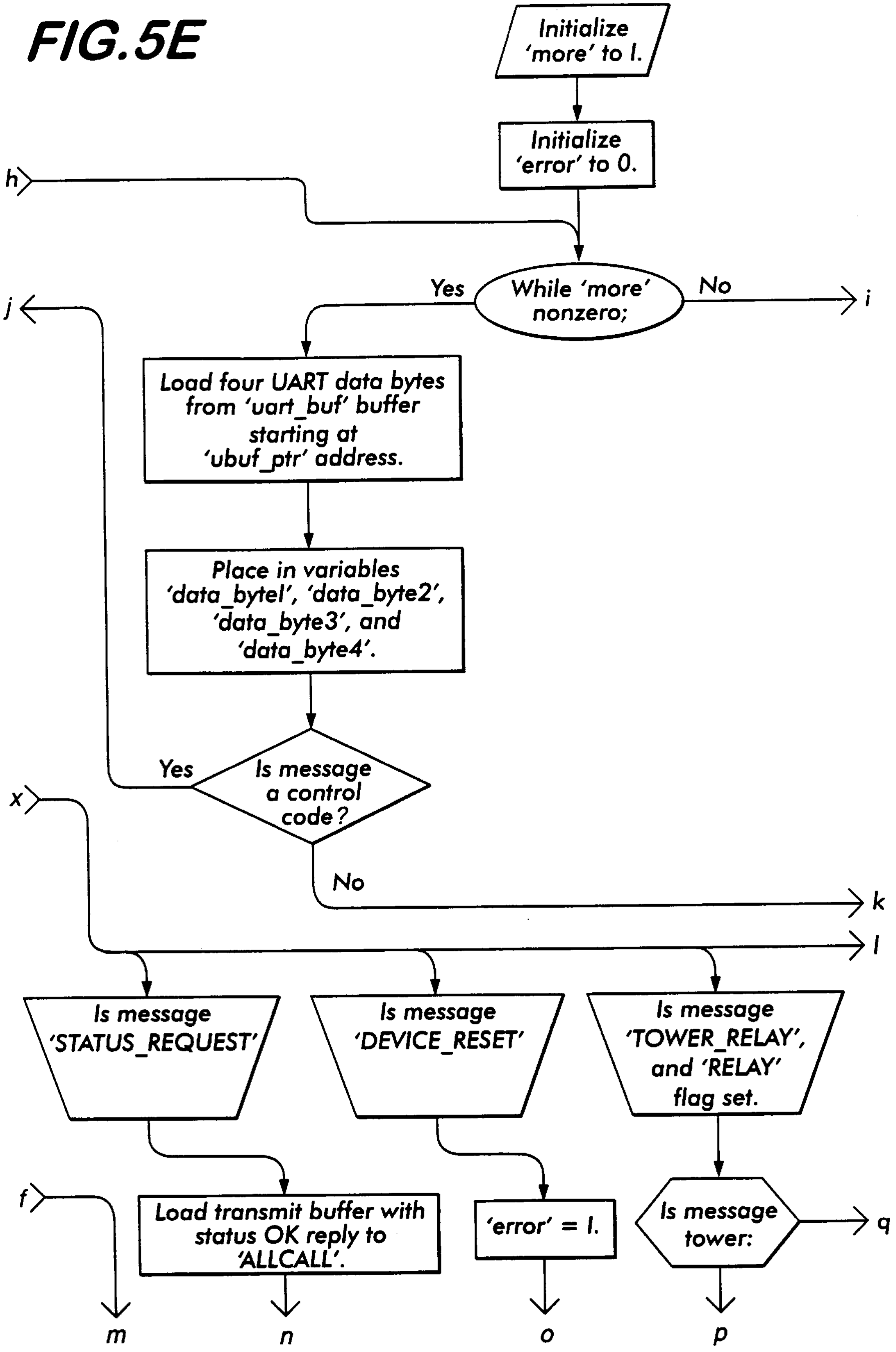
Figure 5F:
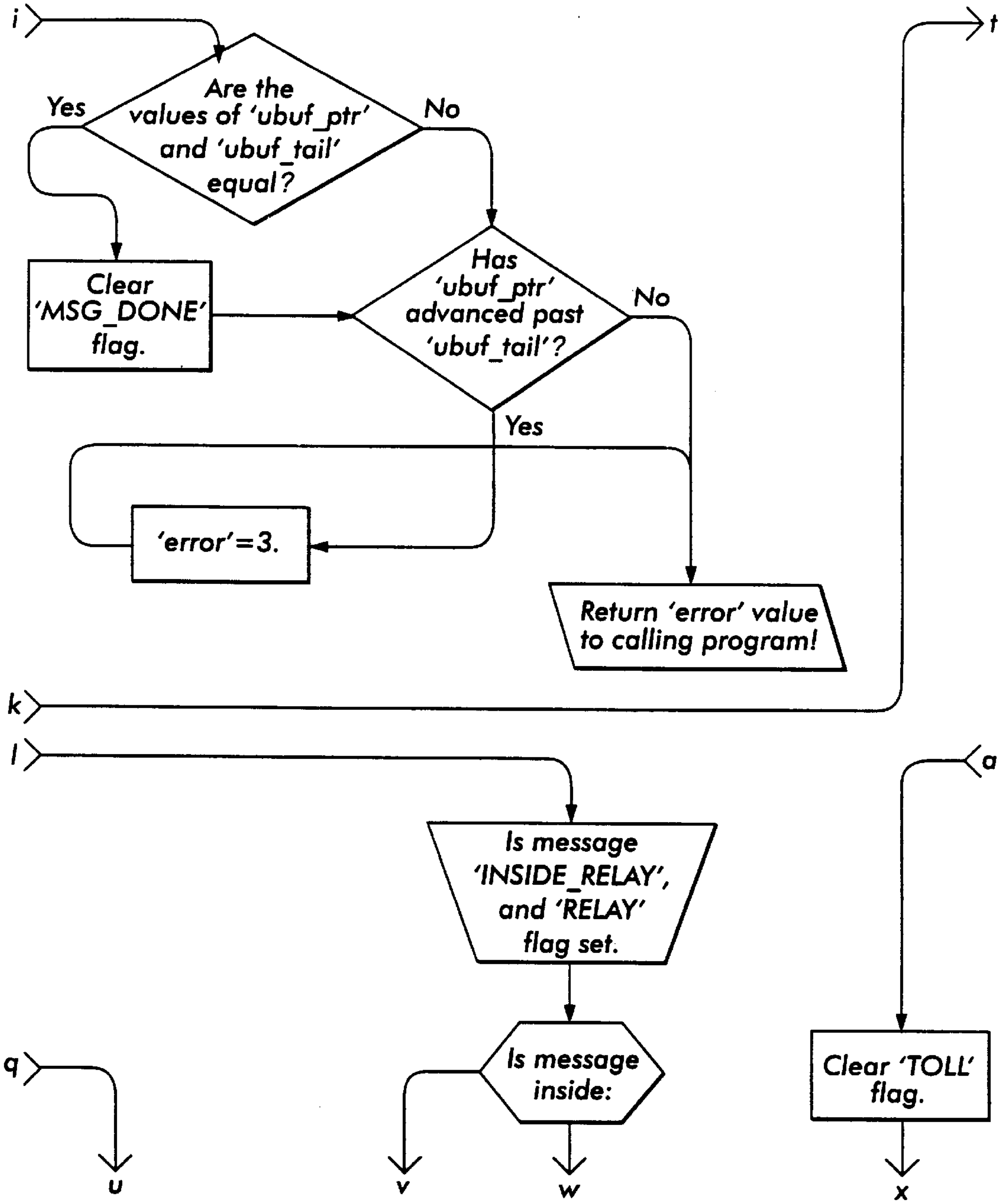
Figure 5G:
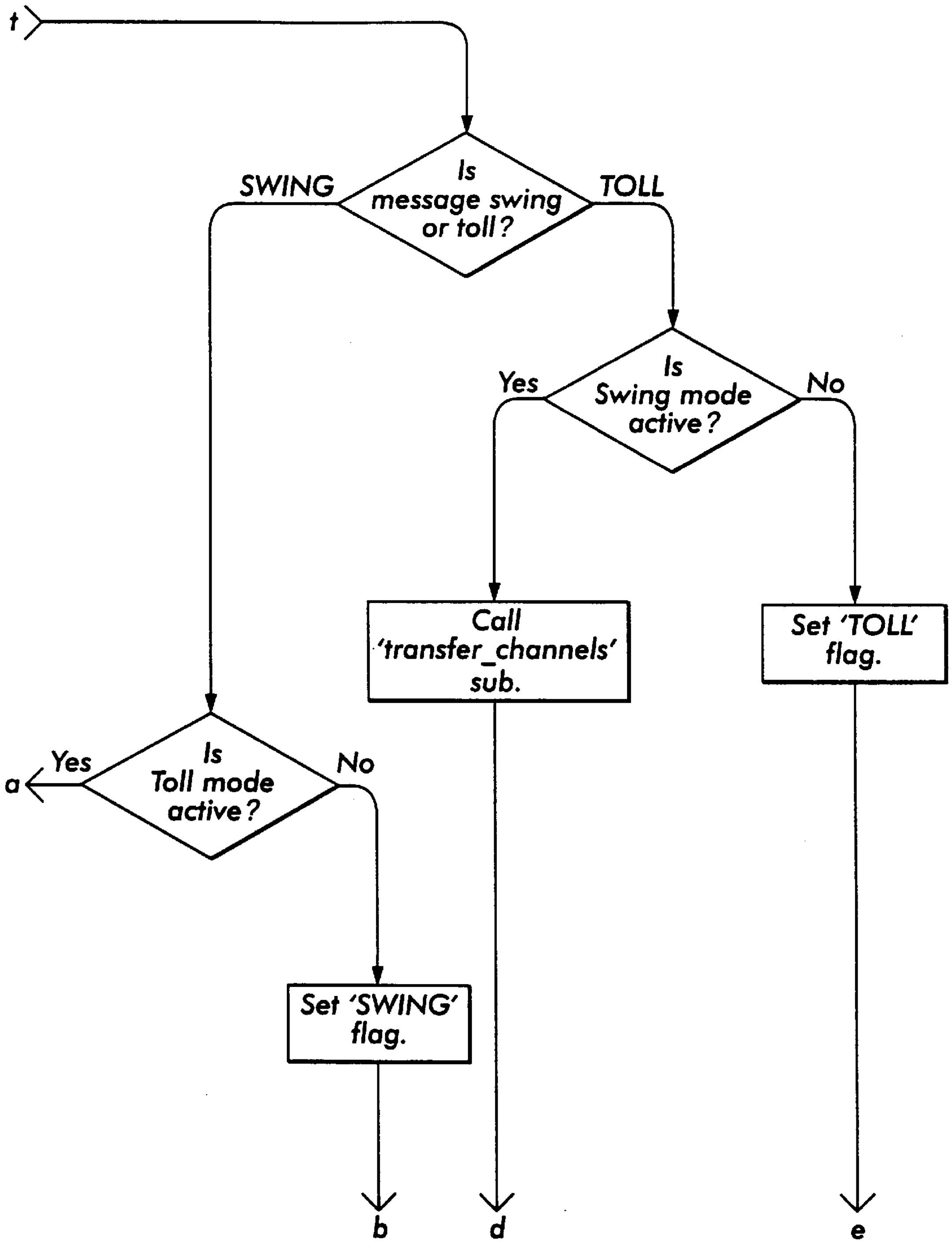
Figure 5H:
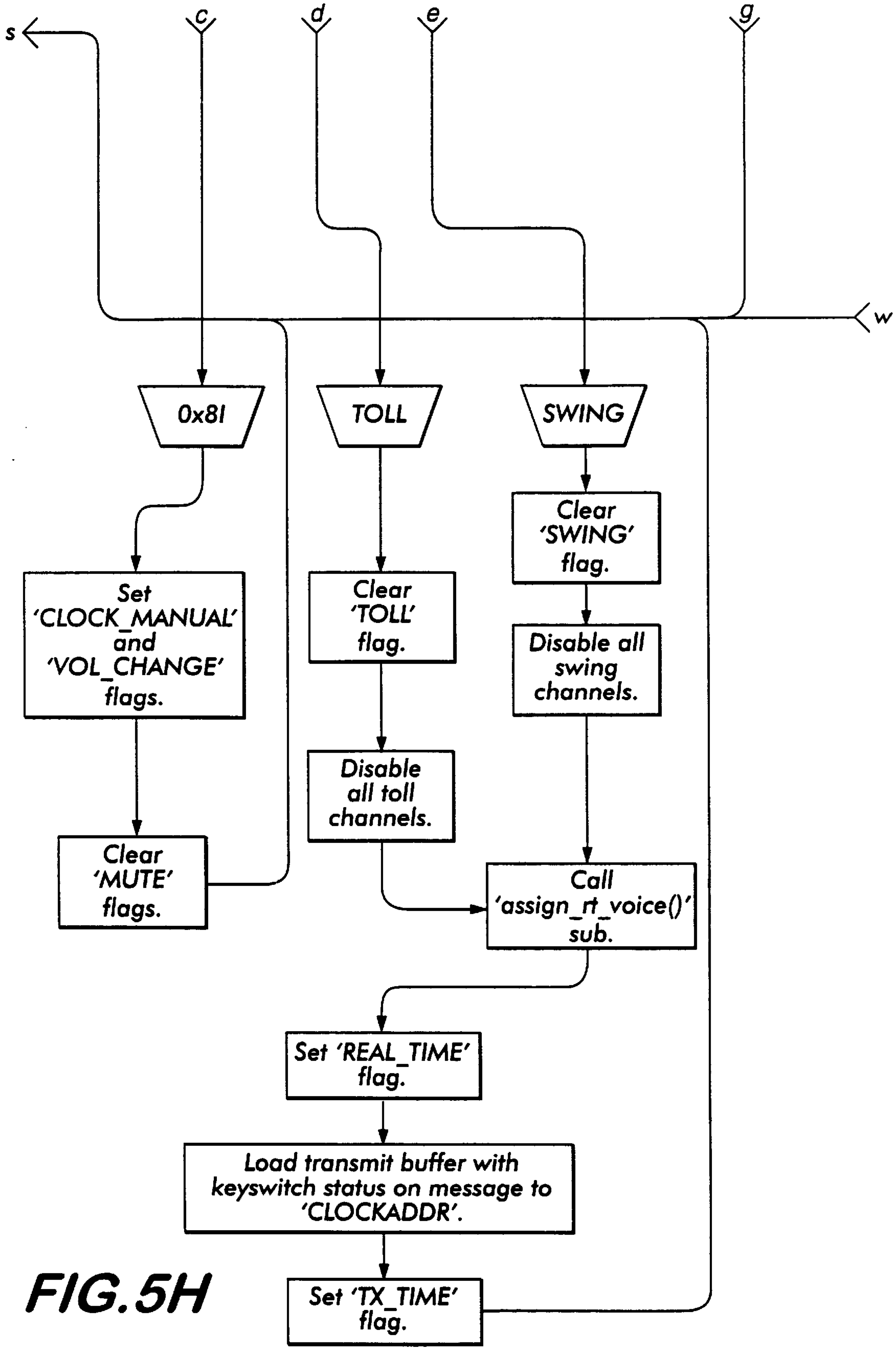
Figure 5I:
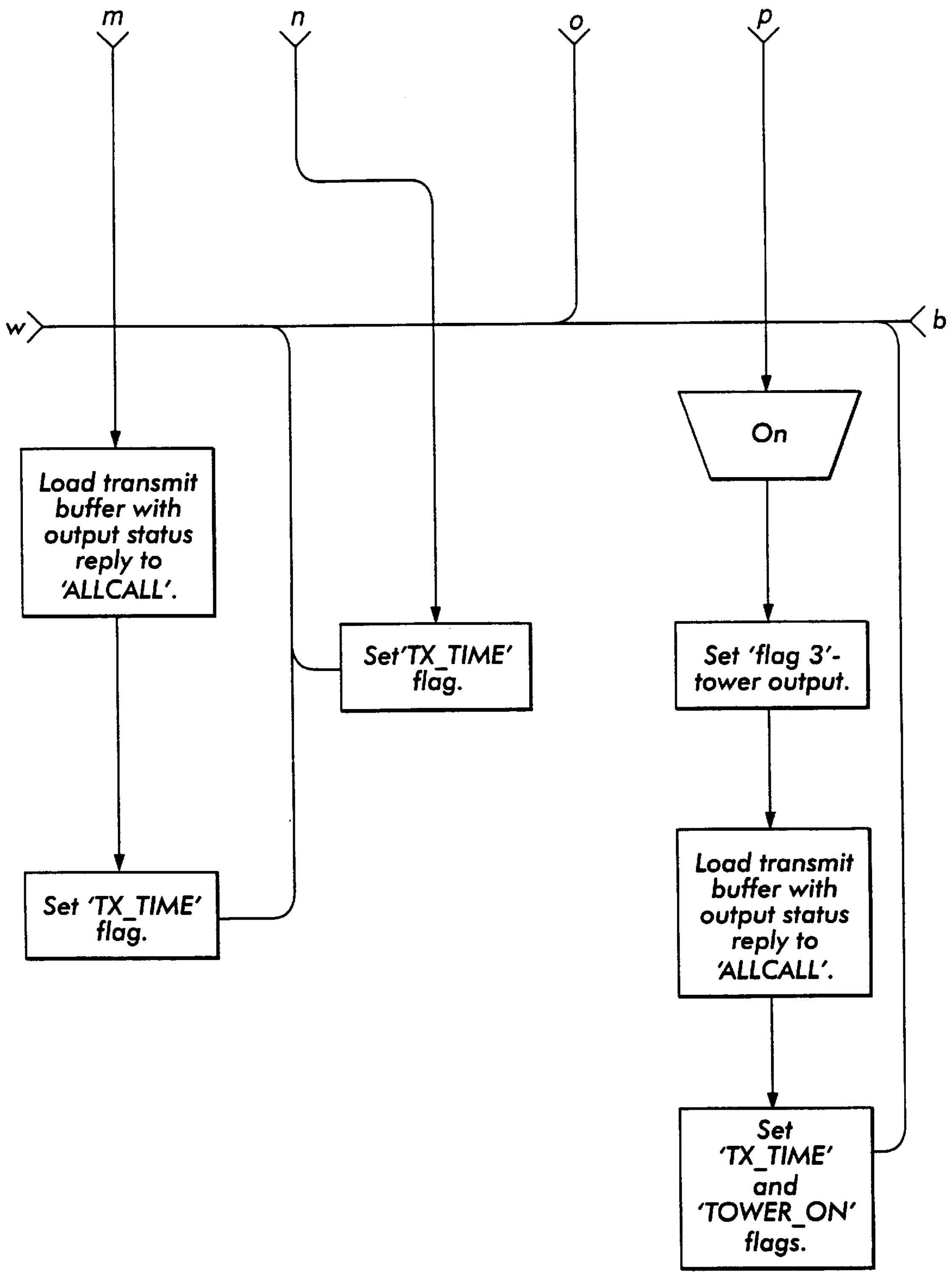
Figure 5J:
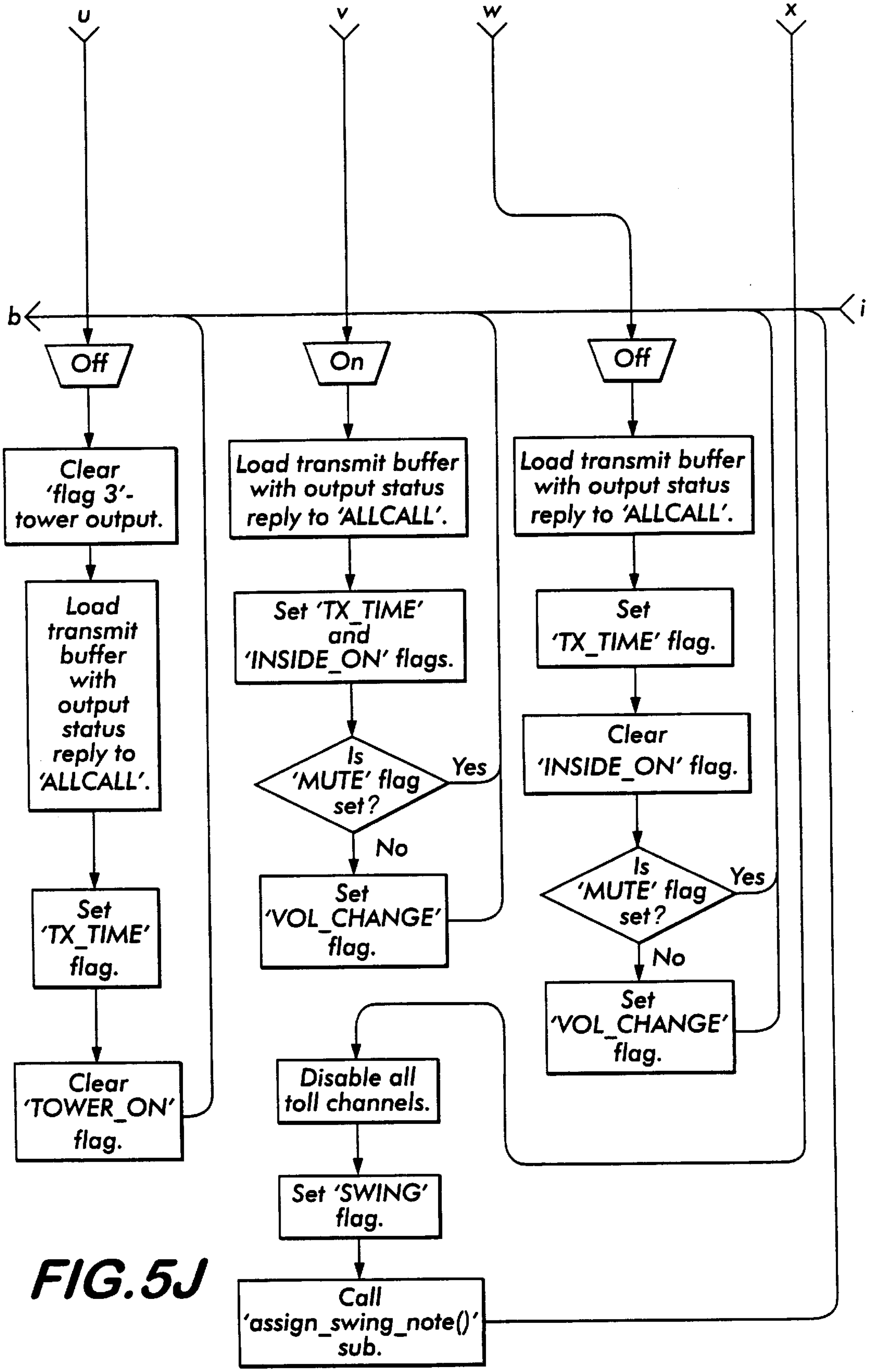
Figure 5K:
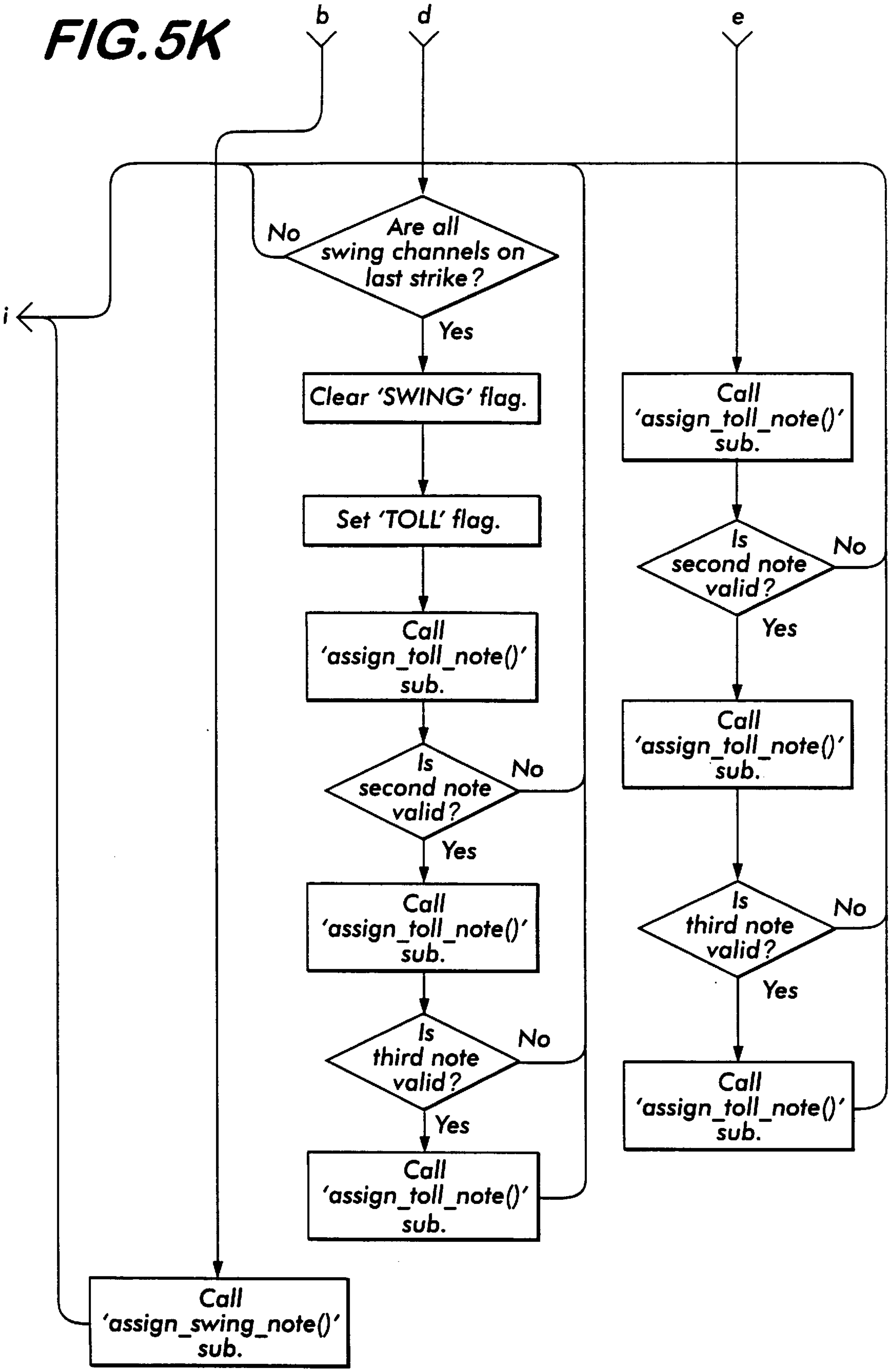

The parse__Rx routine is called from the main loop if the MSG__DONE flag-bit is set by the irq2__asserted subroutine. As shown in FIG. 5F, and returns an integer error value (0 if no error) as shown in FIG. 5F.

In operation, this subroutine reads the first four UART data values in uart__buf starting from the __ubuf__ptr address (in this embodiment, no message should ever be longer than 4 bytes). The subroutine then checks byte1 to see whether the message is a control code. If so, the control code is processed (see FIG. 5E).

Control Code Processing

If the control code message relates to the upper or lower stops, the received stop is ANDed with __current__voices to determine whether it is a playable voice. If so, the upper__voice or lower__voice values are set.

If the message relates to tower or inside volume, the indicated volume change is checked for validity and the volume value is used with the lookup table, volume__table [100], to determine the actual volume value to send to the codec 18. The inside__volume or tower__volume value is loaded and the CVOL__CHANGE flag bit is set.

If the control code message is TRANSPOSE, the new transpose value is checked for validity and, if valid, centered around zero and then saved to the transpose variable. "Transpose" is a feature of some keyboard systems which allows the user to shift the keyboard's outputted note value up or down by up to six notes. For example, if the transpose knob on the console is in the +1 position, and the C2 key is pressed, the C#2 note will play.

If the message is KEYSWITCH__STATUS, the following occurs: if the message is keyswitch "ON", then the CCLOCK__MANUAL and CVOL__CHANGE flags are set and the CMUTE flag is cleared; if the message is keyswitch "OFF", then the CCLOCK__MANUAL flag is cleared. In addition, if all active modes are disabled, then the CVOL__CHANGE and CMUTE flags are set.

If the message is RT__SAMPLE__START (real time sample start), the corresponding channel and mode flags are cleared, the subroutine assign__rt__voice (assign real time voice) is called, the REAL__TIME flag bit is set, and the transmit buffer is loaded and the transmit flag is set.

If the message is OUTPUT__STATUS__REQ and the RELAY flag-bit is set, then the subroutine responds with the tower status based on the TOWER__ON flag bit. If the message is STATUS__REQUEST, the subroutine responds with a status OK message.

If the message is DEVICE__RESET, an error=1 (all function stop) is returned.

If the message is TOWER__RELAY and the RELAY flag-bit is set, the tower relay command is completed and the TOWER__ON bit is updated.

All command parsing is followed by flushing of the uart__buf.

Note Processing

If the control code comprises note data, the note value is checked to determine whether it is between 1 and 122 (1<=note<=122(61*2)). The next byte is then checked to ascertain whether the message is swing or toll. If the message is swing, the active mode is checked. If TOLL mode is active, all toll channels are disabled. The SWING flag is set and the assign__swing__note subroutine is called. If the message is toll, the mode is checked; if it is not swing, the TOLL flag is enabled and the assign__toll__note subroutine is called. The next two bytes are checked to determine whether the notes are valid and, if so, the assign__toll__note subroutine is called. If the swing mode is active, the transfer__channels subroutine is used to determine if all swing channels are on last strike, i.e., the SW__STRIKE__INH flag-bit is set. If still ringing, the subroutine ignores the new toll note; otherwise, the TOLL flag is enabled and assign__toll__note is called. The next two bytes are checked to determine whether the notes are valid and, if so, the assign__toll__note subroutine is called.

All command parsing is followed by flushing of the UART buffer (uart__buf).

error__handler() subroutine

FIG. 6 depicts the error__handler() subroutine. This subroutine is called only from the main routine; it accepts an error as input and returns an error=0 if the error is resolved.

assign__toll__note() subroutine

Figure 7:
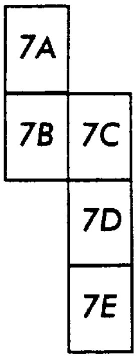
Figure 8:
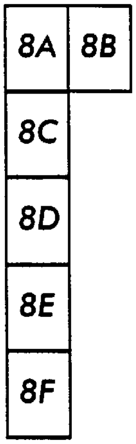

FIGS. 7A–7E depict the assign__toll__note() subroutine. FIG. 7 shows how the flowchart sections depicted in FIGS. 7A–7E may be arranged to form the complete flowchart.

The assign__toll__note subroutine is called only by the parse__Rx subroutine. It accepts an input note and velocity, and operates as follows: First, it determines whether the input note is upper or lower manual, and then it adds the transpose value and determines whether the note is still in a playable range. An appropriate upper/lower__voice is assigned to new__voice. The subroutine returns if new__voice is zero. It advances into the voice table to find the voice ID and address of the voice header in memory for each available voice. All new note parameters from the header table are obtained by incrementing into the header by new__voicebase+(new__note*16). Each note header is 16 bytes long, and all fractional note parameters are shifted up to left justify them in a 32-bit data value (values on card are 24-bit values). Next, the subroutine looks for the same note and voice already playing in the channel tables. This routine will allow up to two channels to have the same note and voice. If a channel is not selected according to the above rules, the code looks for an open channel (MODE=0) and grabs the open channel if one is found. If no open channel is found, the channel which has been running the longest is selected. The subroutine gives less weight to the lower octave channels, to keep the low bells ringing (since it sounds unnatural when low notes are cut off).

assign__swing__note() subroutine

FIGS. 8 and 8A–8F depict the assign__swing__note() subroutine. This subroutine is called by parse__Rx, and accepts an input note and swing command. All active swing note values are stored in the swing__notes array.

The subroutine first checks the new note against existing notes in swing__notes. If a match is found, then this is a command for an existing bell. The MODE of the existing bell is then checked.

If the command is swing down and the mode is SW__DOWN__UP, the SW__DOWN__UP flag is cleared for that channel, causing the bell to fully swing down. If the command is swing down and the mode is SW__UP, SW__UP__DOWN is set. Otherwise, the bell is swinging and SW__DOWN and SW__MODE__CHANGE are set.

If the command is swing up and the bell is on its last strike, the channel is reassigned. If the command is swing up and the mode is SW__UP__DOWN, the SW__UP__DOWN flag is cleared for that channel, causing the bell to fully swing up and not swing down afterward. If mode is SW__DOWN, SWDOWN__UP is set and the subroutine returns.

If no match is found for the new note, the subroutine looks for open channels (SW__MODE=0). If none is found, it returns and no channel is assigned. If an open channel is found, that channel is used. The new note is assigned to a correct spot in the voice table. All new__ parameters are loaded, as are swing__notes with the new note value. If the MUTE flag-bit is set, MUTE is cleared and VOL__CHANGE is set to enact. The new parameters are assigned to sw__tablea and sw__tableb, and the channel is enabled by setting the proper channel MODE values. The subroutine then returns.

assign__rt__voice() subroutine

FIG. 9 depicts the assign__rt__voice() subroutine. This subroutine is called by parse__Rx and accepts an input voice. In operation, it searches through rt__table VOICE values to see if there is a match. If not, it returns. If the MUTE flag-bit is set, MUTE is cleared and VOL__CHANGE is set to enact. All new parameters are assigned to rt__table.

transfer__channels subroutine

FIG. 10 depicts the transfer__channels subroutine. This subroutine is called only by parse__Rx. It takes no input but returns status as follows:

0: all swing channel had SW__STRIKE__INH-bit in mode set=>all swing channels are on last strike;

1: some bells still swinging—normal DOWN or UP.

If it finds a last struck bell, it transfers the parameters to an open toll channel. If all channels are off or transferred, 0 is returned. Otherwise, 1 is returned.

misc__funcs subroutine

FIGS. 11 and 11A–11K depict the misc__funcs subroutine. This subroutine is called by the main loop and takes no inputs but returns an error, if found. It performs three tasks: (1) check card status change; (2) check for volume change; and (3) check for all active mode channels off.

Check Card Status Change

This function uses FLAG0 and FLAG2 external pins, and CARD1 and CARD2 flag bits to determine a change in card status. If a card has been removed, it clears that card's voice from the voice table and current__voices. If upper voice was on that card, it zeros the MODE flag for the toll and swing channels using the upper voice. If lower voice was on that card, it zeros MODE for the toll and swing channels using the lower voice. If operating in real-time mode, that card's voice is cleared from rt__table and MODE is cleared.

If a card has been added, error=2 is returned.

Check for Volume Change

Volume changes are passed to the codec 18 via the array tx__buf. Muting is accomplished via the high-bit of the volume byte sent to the codec. The codec output is muted (with the MUTE flag) whenever no channels are active and the clock is not in manual mode (the CLOCK__MANUAL flag bit is not set). This code only executes when the VOL__CHANGE flag-bit is set. In operation, it loads cmds__1847 with 0×8600+tower__volume+MUTE-bit. It loads cmds__1847 with 0×8700+inside__volume+MUTE bit. If the MUTE flag is set, it sits idle until spt0__asserted interrupts and returns. The first volume command is copied to the control__out variable. It then sits idle until spt0__asserted interrupts and returns again. It then copies the second volume command to the control__out variable. The VOL__CHANGE flag bit is disabled.

Check For All Active Mode Channels Off

This routine is used to disable an active mode flag (TOLL, SWING or REAL__TIME) if all channels in that mode have their MODE register equal to 0. The CVOL__CHANGE and MUTE flags are set if the active mode has been disabled and the CCLOCKMANUAL flag bit is not set.

czero__cross() subroutine

FIG. 12 depicts the czero__cross() subroutine. This subroutine is called by the assign__toll__channel subroutine if the channel to be assigned over has a non-zero MODE parameter (it is running). This routine searches for a zero-crossing in the channel's digital audio data, and will execute until a zero-crossing is found. In addition, it gets rid of clicks and pops which are created when a channels output dramatically changes in value. It accepts a channel number and returns nothing.

init__card() assembly subroutine

FIGS. 13A and 13B depict the init__card() subroutine. This subroutine uses alternate working and index registers. It is called from the error__handler subroutine. It uses i0 as a voice table index, i1 as internal header index, i3 as a real-time voice table index, r1 as an index to the start of cart, and r0 as a scratch register. In addition, it uses DMA channel 7 to obtain card header information. The flag flag0 is employed to sense the existence of card 1, and flag2 is used to sense the existence of card 2. Appropriate CARD1__EXIST and CARD2__EXIST flag bits are set in the __flags register.

In operation, the subroutine first loads 16 32-bit words (voice id and the next voice address and swing parameters). A voice id greater than 0×80 indicates a real-time sample. A next voice address equal to zero indicates that this is the last voice header on this card. Bell voice id words are ORed with the variable __current__voices, and the bell voice id and internal header start pointer are saved in the array__voice. Voice note header information is loaded into the internal memory array __header. A voice's id word has its high-bit set to indicate that it is located in the second card slot. Real-time voice parameters are directly loaded into the array __rt__table. When this is all complete, the DSP 16 is fully aware of the number and type of voices that it can play.

__uart__transmit() assembly subroutine

FIG. 14 depicts the __uart__transmit() subroutine. This subroutine is called from the main loop when the CTXTIME flag-bit is set. In operation, it checks for buss availability via UARTimr. If the buss is unavailable, the routine exits. If the buss is available, it follows standard UART transmit routines. Address and data are read from the array __tx__message [5]. When 0×FF is stored in __tx__message, this signals an end of message. The UART is then set for receive, and the TXTIME flag-bit in the __flags register is reset.

update__toll__chans() interrupt routine

FIGS. 15A and 15B depict the update__toll__chans() subroutine. This subroutine can process 24 simultaneous channels in one 44.1 μsec update period. It uses one index register for each table parameter—each index gets post modified at read time by the length of a channel table so that it is pointing to the next channel's set of parameters. Two channel tables (ch__tablea and ch__tableb) in separate memory areas are utilized to allow dual memory accesses during updating. The previous interrupt calculations saved in __dataout are passed to the serial port output array tx__buf. A channel with a non-zero MODE is active, and a linear interpolation between DATA1 and DATA2 is performed based on the value of the fractional address FADDR. This value multiplied by VOLUME is accumulated in MRF. New integer (IADDR) and fractional (FADDR) addresses are calculated, by adding increments IINC and FINC to them, respectively, and then saved. The current address is checked to see if it is past the loop end address LEADDR. If so, the current address IADDR is set equal to the loopstart address LSADDR. Additionally, the volume is multiplied by the factor DECAY and saved. A DMA chain, toll__tcb, is added to for each active channel's data acquisition for the next iteration. When all channels are updated, the DMA chain for card data is terminated and the DMA channel 6 chain pointer register,CP6, is loaded with the last address of the first tcb in toll__tcb. This starts fetching data from an external card to the active channel tables' data registers. This DMA chain is still running even when the next update's interrupt occurs.

update__swing__chans interrupt routine

FIGS. 16 and 16A–16H depict the update__swing__chans subroutine. This subroutine currently processes up to 12 simultaneous channels (6 swinging bells) in one 44.1 μsec update period. It uses the same structure as the toll update routine (update __toll__chans) but adds inner loop control processing. This routine stores values in sw__tablea and sw__tableb. Each swinging bell is made up of two active channels: (1) a main channel, which controls the overall operation of both channels, and (2) a doppler channel, which adds processing to create a doppler shifting effect on the bell. The MODE register of each channel not only signals activity but completely defines the running status of the channel:

| | |
|---|---|
| CSW__STATUS | = channel active |
| CSW__DIRECTION forward/backward | = swinging |
| CSW__DOPPLER | = main/doppler channel |
| CSW__ZERO__CROSS crossing | = time to find zero |
| CSW__UP | = swinging up |
| CSW__DOWN | = swinging down |
| CSW__STRIKE__INH | = swung down - last toll |
| CSW__COUNT up and down | = count-bit for swinging |
| CSW__WOW doppler channel is modified | = signals when FINC of |
| CSW__MODE__CHANGE | = time to change swing mode |
| CSW__UP__DOWN | = swinging up - have to swing down when done |
| CSW__DOWN__UP | = swinging down - have to swing up when done |

Main channel controls include: enable/disable WOW-bit of doppler channel; check for end of swing, if so, set ZERO__CROSS; check for zero crossing of main channel (minimum value); when minimum found, look for MODE__CHANGE; if none perform normal channel reassign "swingin"; only perform mode change on front strike—else "swingin"; if SWING__UP or SWING__DOWN set, use "swingin up" and "swingin down" reassign routines; each swing up/down is made up of two sets of front and back strikes, each time the doppler value, swing length and volume is changed to simulate the up/down swinging.

The doppler channel only has to generate its own effect, which is made by modifying the finc only during the WOW period. On the front swing, the doppler channel rises in pitch, and on the back swing drops in pitch. The WOW period is active from the ¼ point to the ¾ point in the swing period. This varying finc causes the bell to sound as if it is changing velocity.

update__real__time interrupt routine

FIG. 17A–17C depict the update__real__time subroutine. In the present embodiment, this subroutine is able to accommodate 2 sample formats: 22050 8 bit and 11025 8-bit. It does not change codec sample rates. The subroutine numerically calculates the values. 8-bit data is unsigned, and only one real time sample is active at a time. The active position in __rt__table is determined by __rt__table__ptr, which is assigned in the assign__rt__voice subroutine. Voice parameters are read from rt__table; each sample reserves 16 bytes for initialization and run-time data. The sample rate is determined by the parameter RT__MAX__COUNT:

2=>44100

4=>22050

8=>11025

This implies how many steps the code must go thru to process one full 16-bit data value. These particular values apply only for 8-bit data, i.e., 22050 implies that it will (1) use the first 8-bit data value, (2) interpolate between first and second values, (3) use the second 8-bit data value, or (4) interpolate between the second value and the next word's first value. Thus, a four step process is performed for one 16-bit word (the DSP 16 only reads 16-bit words from the cards). Both swing and toll updates look for channel minimum volumes. If found, the channel is disabled by zeroing CH__MODE or SW__MODE.

In sum, the present invention as presently implemented is controlled by an Analog Devices ADSP21062 running at 33 MHz. Program code is loaded at power-up and reset from a 128 k×8 Flash memory, the 28F010. The DSP receives commands via an RS-485 serial interface which is arbitrated by a programmable UART, the Intersil 26C91. Bell and real-time sample data are stored on up to two PMCCIA 68 pin Flash memory cards for DSP access. Audio data is passed in the digital domain via a bi-directional serial link to an Analog Devices AD1847 Stereo Codec which digitizes analog audio, converts digital data into the analog domain, and performs input and output mixing and volume control. Analog Devices OP213's and SSM2142 op-amps are used for audio input and output mixing and buffering. The current version supplies two line-level audio outputs to external mixing or amplification.

The current version has the following capabilities and characteristics:

1) Up to 24 channels of sample data can be played simultaneously.

2) Up to 6 channels of a swinging realism effect on samples can be produced simultaneously.

3) other audio playback program such as File volley followed by "Taps", or horns, whistles and other sound effects are stored as real-time (no pitch shifting) samples and can be in the following sample formats: 8 bit unsigned 11025 kHz and 8 bit unsigned 22050 kHz.

4) A tower control circuit is available to actuate a tower relay.

5) A MIDI input port is available providing access from an external MIDI controller such as a keyboard or sequencer.

It should be noted that the true scope of the present invention is not limited to the specific hardware and software elements described above, and thus many variations of the examples described above will fall within the scope of protection of the following claims. For example, modifications of the presently preferred embodiment include but are not limited to:

1) Using some different type of either DSP or microprocessor.

2) Implementing D/A and/or A/D conversion and audio attenuation and mixing via some other available audio codec or discrete component set.

3) Interface to any other type of serial buss with or without different protocols.

4) Implementing storage of either program or sample data in combination or separate in any other type of static or dynamic memory device.

5) Any number of simultaneous channels of either normal or swinging sample playing can be implemented.

6) Any other real-time samples of any existing standard digital audio sample formats can be implemented.

7) The tower control can be used as a general purpose I/O pin.

8) The codec which also digitizes audio can be used to process in real-time external audio signals and either store or output them.

We claim:

1. An electronic carillon system, comprising:

(A) a digital signal processor (DSP);

(B) memory means, operatively coupled to said DSP, for memorizing program code for controlling the operation of the DSP in carrying out pre-programmed algorithms; and (C) output means, operatively coupled to said DSP, for converting the output of the DSP into audible sound;

wherein said system is programmed, via said DSP and program code, to construct bell sounds spanning all notes within a prescribed number of octaves on the basis of a limited number of pre-recorded samples of notes within a single octave.

2. An electronic carillon system as recited in claim 1, wherein said output means comprises a codec coupled to said DSP and at least one loudspeaker operatively coupled to said codec.

3. An electronic carillon system as recited in claim 1, wherein said memory means further memorizes input data, and said DSP operates, in accordance with the preprogrammed algorithms, so as to perform the functions of receiving said input data from said memory means and calculating pitch-shifted output data on the basis of said input data, wherein said input data includes said pre-recorded samples of bell sounds.

4. An electronic carillon system as recited in claim 3, wherein said system comprises means for scaling the output data for volume.

5. An electronic carillon system as recited in claim 3, wherein said system further comprises means for scaling the output data to reflect the velocity of a bell whose sound is being constructed.

6. An electronic carillon system as recited in claim 2, wherein said codec performs digital-to-analog conversion.

7. A method performed by an electronic carillon system, comprising the steps of:

(A) utilizing a digital signal processor (DSP) and program code for controlling the operation of the DSP in carrying out pre-programmed algorithms to receive input data and calculate pitch-shifted output data on the basis of said input data, wherein said input data includes pre-recorded samples of bell sounds and said DSP is employed to construct bell sounds spanning all notes within a prescribed number of octaves on the basis of a limited number of pre-recorded samples of notes within a single octave; and (B) converting the output of the DSP into audible sound.

8. A method as recited in claim 7, further comprising scaling the output data for volume.

9. A method as recited in claim 8, further comprising scaling the output data to reflect the velocity of a bell whose sound is being constructed.

10. An electronic carillon system, comprising:

(A) a digital signal processor (DSP); and (B) a memory, operatively coupled to said DSP, containing program code and samples of bell sounds for controlling the operation of the DSP in carrying out preprogrammed algorithms using pre-recorded samples of bell sounds;

wherein outputs of said DSP are convertible into audible sounds, and said DSP operates, in accordance with the pre-programmed algorithms, so as to perform the functions of receiving said pre-recorded samples from said memory and calculating pitch-shifted output data, and wherein said DSP is operative to construct bell sounds spanning all notes within a prescribed number of octaves on the basis of a limited number of pre-recorded samples of notes within a single octave.

11. An electronic carillon system as recited in claim 10, further comprising an output circuit, operatively coupled to said DSP, for converting digital data received from said DSP into audio signals representative of bell sounds.

12. An electronic carillon system as recited in claim 11, wherein said output circuit is coupled to a speaker that converts the outputs of the DSP into audible sound.

* * * * *